United States Patent
Yamamoto

(10) Patent No.: US 9,084,193 B2
(45) Date of Patent: Jul. 14, 2015

(54) BASE STATION DEVICE

(75) Inventor: Takashi Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 581 days.

(21) Appl. No.: 13/498,449

(22) PCT Filed: Oct. 5, 2010

(86) PCT No.: PCT/JP2010/067457
§ 371 (c)(1),
(2), (4) Date: Mar. 27, 2012

(87) PCT Pub. No.: WO2011/043341
PCT Pub. Date: Apr. 14, 2011

(65) Prior Publication Data
US 2012/0182909 A1    Jul. 19, 2012

(30) Foreign Application Priority Data

| Oct. 5, 2009 | (JP) | 2009-231756 |
| Oct. 7, 2009 | (JP) | 2009-233829 |
| Oct. 7, 2009 | (JP) | 2009-233881 |
| Oct. 16, 2009 | (JP) | 2009-238964 |
| Sep. 13, 2010 | (JP) | 2010-204814 |

(51) Int. Cl.
H04J 1/00    (2006.01)
H04W 56/00    (2009.01)
(Continued)

(52) U.S. Cl.
CPC .......... *H04W 56/002* (2013.01); *H04W 84/045* (2013.01); *H04W 92/20* (2013.01)

(58) Field of Classification Search
CPC ..................................................... H04W 56/00
USPC .......................................................... 370/281
See application file for complete search history.

(56) References Cited

U.S. PATENT DOCUMENTS 6,480,483 B2 * 11/2002 Yahata et al. ................. 370/350
8,488,528 B2 * 7/2013 Nagata et al. ................. 370/328
(Continued)

FOREIGN PATENT DOCUMENTS

| JP | 2009-177532 | 8/2009 |
| WO | WO 2010/087172 A1 | 8/2010 |

OTHER PUBLICATIONS

CMCC, "Considerations on the synchronization of relay nodes," 3GPP TSG-RAN WG1 #58 R1-093272, Shenzhen, China, Aug. 24-28, 2009, [online] Retrieved from the internet<URL:http://www.3gpp.org/ftp/tsg_ran/WG1_RL1/TSGR1_58/Docs/R1-093272.zip>.

(Continued)

*Primary Examiner* — Man Phan
*Assistant Examiner* — Nourali Mansoury
(74) *Attorney, Agent, or Firm* — Drinker Biddle & Reath LLP

(57) ABSTRACT

A base station device of the present invention includes a downlink signal reception unit 12 that receives a downlink signal from another base station device, and a synchronization processing unit 5b that obtains a known signal contained in the downlink signal from the another base station device and that performs inter-base-station synchronization with the another base station device based on the known signal. The synchronization processing unit 5b performs inter-base-station synchronization such that the transmission timing of the known signal in its own downlink signal is different from the transmission timing of the known signal in the downlink signal of the another base station device.

16 Claims, 41 Drawing Sheets

(51) Int. Cl.
*H04W 84/04* (2009.01)
*H04W 92/20* (2009.01)

(56) References Cited

U.S. PATENT DOCUMENTS

2008/0152059 A1* 6/2008 Suemitsu et al. ............. 375/356
2009/0122782 A1* 5/2009 Horn et al. .................... 370/350
2010/0216479 A1* 8/2010 Kato et al. ..................... 455/450

OTHER PUBLICATIONS

ZTE, CMCC, "Synchronization in Backhaul Link," TSG-RAN WG1 #58bis Miyazaki, JP, Oct. 12-Oct. 16, 2009 [online]. Retrieved from the Internet:<URL:http://www.3gpp.org/ftp/tsg_ran/WG1_RL1/TSGR1_58b/Docs/R1-093815.zip>.

CMCC, "Considerations on the synchronization of relay nodes," 3GPP TSG-RAN WG1 #58bis R1-094040, Miyazaki, Japan, Oct. 12-16, 2009, [online], Retrieved from the internet:<URL:http://www.3gpp.org/ftp/tsg_ran/WG1_RL1/TSGR1_58b/Docs/R1-094040.zip>.

* cited by examiner

BASE STATION DEVICE

TECHNICAL FIELD

The present invention relates to a base station device that performs wireless communication with terminal devices.

BACKGROUND ART

A number of base station devices, each performing communication with terminal devices, are provided to cover a wide area. At this time, inter-base-station synchronization may be performed to achieve synchronization of communication frame timings or the like among a plurality of base station devices.

For example, Patent Literature 1 discloses inter-base-station synchronization performed by a base station device by using a transmission signal from another base station device that is a synchronization source.

CITATION LIST

Patent Literature

[PTL 1] Japanese Laid-Open Patent Publication No. 2009-177532

SUMMARY OF THE INVENTION

Problems to be Solved by the Invention

Patent Literature 1 discloses a case where communication between a base station device and a terminal device is performed in time division duplex (TDD). If a base station device that performs communication with a terminal device in frequency division duplex (FDD) is caused to achieve inter-base-station synchronization, it is conceivable that the inter-base-station synchronization is performed in the following manner.

That is, as shown in FIG. 16, in a communication frame of a downlink signal in a frequency division duplex system, a primary synchronization channel and a secondary synchronization channel used by a terminal device to scan a base station device, to identify the base station device, and the like, are arranged in a constant cycle. Since these synchronization signals are known signals, it is conceivable to cause a base station device attempting to achieve inter-base-station synchronization with another base station device that will serve as a synchronization source to utilize both synchronization signals contained in a downlink signal transmitted by the another base station device, thereby achieving the inter-base-station synchronization.

Here, for example, when a base station device adopting the FDD system attempts to achieve synchronization with another base station device, the base station device needs to receive a downlink signal transmitted by the another base station device, in order to obtain the synchronization signals. At this time, since an operating frequency band of the downlink signal from the another base station device and an operating frequency band of a downlink signal of the base station device are identical with each other, the base station device cannot transmit its own downlink signal during a time period when it is receiving the downlink signal from the another base station device. Therefore, the base station device needs to suspend transmission of the own downlink signal at least during the time period when it is receiving the synchronization signals contained the downlink signal from the another base station device.

For this reason, for example, when the base station device suspends, in order to receive the synchronization signals from the another base station device, transmission of a portion of the own downlink signal where the synchronization signals are located, there arises a problem that communication with a terminal device connected to the own base station device is influenced.

That is, since each of subframes forming a communication frame of a downlink signal includes control information and a reference signal necessary for communication between the base station device and a terminal device connected thereto, if the terminal device cannot receive the control signal and the reference signal, there arises a problem, for example, that it becomes difficult for the terminal device to maintain the communication connection to the base station device.

Such problems may occur also in the case of a base station device that adopts the TDD system using a head signal, as a known signal, located at the beginning of a frame.

Moreover, in a communication frame of a downlink signal in the frequency division duplex system, as shown in FIG. 23, a primary synchronization channel and a secondary synchronization channel used by a terminal device to scan a base station device, to identify the base station device, to achieve synchronization with the base station device, and the like, are arranged in a constant cycle. Since these synchronization signals are known signals, it is conceivable to cause a base station device attempting to achieve inter-base-station synchronization with another base station device that will serve as a synchronization source to utilize both synchronization signals contained in a downlink signal transmitted by the another base station device, thereby achieving the inter-base-station synchronization.

Here, when the base station device achieves the inter-base-station synchronization with the another base station device, a terminal device connected to the base station device receives a downlink signal without recognizing that the transmission timing of the downlink signal transmitted by the base station device has been changed as a result of the base station device having performed the inter-base-station synchronization.

Then, there also arises a problem that the communication between the base station device and terminal device connected thereto is influenced, such as in the case where the terminal device may not appropriately receive the downlink signal from the base station device.

Such a problem may also occur in the case of the base station device that adopts the TDD system using a head signal, as a known signal, arranged at the beginning of a frame.

In view of the above, an object of the present invention is to provide a base station device that can achieve inter-base-station synchronization while suppressing influence on communication performed by a terminal device.

Solution to the Problems (1) The present invention is directed to a base station device that performs communication using a downlink signal composed of a plurality of communication unit areas arranged along a time axis, each communication unit area having a certain time length, the plurality of communication unit areas including a communication unit area containing a specification signal used for communication control and a communication unit area not containing the specification signal, the base station device including: a reception unit that receives a downlink signal from another base station device; and a synchronization processing unit that performs inter-base-station synchronization, by obtaining the downlink signal from the another base station device received by the reception unit and by causing a transmission timing of a communication unit area in a downlink signal of the base station device to coincide with that of the another base station device, wherein the synchronization processing unit performs the inter-base-station synchronization such that a transmission timing of the specification signal in the downlink signal of the base station device is different from a transmission timing of the specification signal in the downlink signal of the another base station device.

According to the base station device of the present invention, it is possible to perform the inter-base-station synchronization while suppressing influence on communication performed by the terminal device.

(2) More specifically, it is preferable that the downlink signal includes a base frame composed of a plurality of subframes, and the communication unit area is the subframe.

In this case, the synchronization processing unit can perform the inter-base-station synchronization, by adjusting the position in the time axis direction of the base frame in its own downlink signal, thereby causing the transmission timing of the specification signal in the own downlink signal to be different from that of the another base station device and concurrently causing the transmission timing of the own subframe to coincide with the transmission timing of the subframe of the another base station device.

(3) Moreover, it is preferable that the specification signal includes a known signal for synchronization, and the synchronization processing unit obtains the known signal contained in the downlink signal from the another base station device received by the reception unit, and performs the inter-base-station synchronization based on the known signal.

According to the base station device having the above configuration, the synchronization processing unit performs the inter-base-station synchronization such that the transmission timing of the subframe containing the known signal serving as the specification signal in the own downlink signal is different from the transmission timing of the subframe containing the known signal in the downlink signal of the another base station device. Therefore, the base station device can suspend transmission of a portion other than the portion containing the known signal in the own downlink signal and can obtain the known signal contained in the downlink signal from the another base station device. Accordingly, the base station device can obtain the known signal of the another base station device without suspending transmission of the known signal directed to the terminal device connected to the base station device. As a result, the base station device can perform the inter-base-station synchronization while suppressing influence on the communication of the terminal device.

(4) Moreover, the specification signal further may include a physical broadcast channel (PBCH), and the synchronization processing unit may perforin the inter-base-station synchronization such that a transmission timing of the known signal in the downlink signal of the another base station device is different from a transmission timing of the physical broadcast channel in the-downlink signal of the base station device.

In this case, the synchronization processing unit performs the inter-base-station synchronization such that the transmission timing of the subframe containing the physical broadcast channel in the own downlink signal is different from the transmission timing of the subframe containing the known signal in the downlink signal of the another base station device. Accordingly, it is possible to suspend transmission of a portion other than the portion containing the physical broadcast channel in the own downlink signal, and to obtain the known signal contained in the downlink signal from the another base station device. Therefore, it is possible to obtain the known signal of the another base station device without suspending the transmission of the physical broadcast channel directed to the terminal device connected to the own base station device. As a result, it is possible to perform the inter-base-station synchronization while suppressing influence on communication performed by the terminal device.

(5) Moreover, in the above base station device, the communication unit area may be a modulation symbol. In this case, the synchronization processing unit can set, in units of modulation symbols constituting the own downlink signal, an obtainment section for obtaining the downlink signal from the another base station device for obtaining the known signal of the another base station device. Therefore, it is possible to enhance the degree of freedom when setting the obtainment section.

(6) In the base station device of (5), the specification signal may include a known signal for synchronization, and the synchronization processing unit may obtain the known signal contained in the downlink signal from the another base station device received by the reception unit, and may perform the inter-base-station synchronization based on the known signal.

In this case, the synchronization processing unit performs the inter-base-station synchronization such that the transmission timing of the modulation symbol containing the known signal, which is the specification signal, in the own downlink signal is different from the transmission timing of the modulation symbol containing the known signal in the downlink signal of the another base station device. Therefore, it is possible to suspend transmission of a portion other than the portion containing the known signal in the own downlink signal and to obtain the known signal contained in the downlink signal from the another base station device. Accordingly, it is possible to obtain the known signal of the another base station device without suspending the transmission of the known signal directed to the terminal device connected to the own base station device. As a result, it is possible to perform the inter-base-station synchronization while suppressing influence on communication performed by the terminal device.

(7) and (8) In the base station device of (6), the specification signal may further include a control signal for communication control, and the synchronization processing unit may perform the inter-base-station synchronization such that a transmission timing of the known signal in the downlink signal of the another base station device is different from a transmission timing of the control signal in the downlink signal of the base station device, and the specification signal may further include a reference signal for estimating a transmission path characteristic of the downlink signal, and the synchronization processing unit may perform the inter-base-station synchronization such that a transmission timing of the known signal in the downlink signal of the another base station device is different from a transmission timing of the reference signal in the downlink signal of the base station device.

In this case, even when the synchronization processing unit performs the inter-base-station synchronization by obtaining the known signal, which is the specification signal, contained in the downlink signal from the another base station device, it is possible to suspend transmission of a portion other than the portion containing the control signal or the reference signal, and to obtain the known signal contained in the downlink signal from the another base station device. Therefore, it is possible to obtain the known signal of the another base station device without suspending the transmission of the control signal or the reference signal directed to the terminal device connected to the own base station device, and thus it is possible to perform the inter-base-station synchronization while suppressing influence on communication performed by the terminal device.

(9) In the base station device of (6), it is preferable that the specification signal further includes a control signal for communication control, the downlink signal is composed of control signal areas each composed of a communication unit area containing the control signal, the control signal areas being arranged in the time axis direction with a predetermined interval therebetween, and intermediate areas each composed of a plurality of communication unit areas located between adjacent control signal areas, the intermediate area includes a first intermediate area containing the known signal and a second intermediate area not containing the known signal, and the synchronization processing unit performs the inter-base-station synchronization by adjusting a position in the time axis direction of the downlink signal of the base station device such that a transmission timing of the known signal contained in the first intermediate area of the another base station device is located in a range of the second intermediate area in the downlink signal of the base station device.

In this case, the inter-base-station synchronization is performed by adjusting the position in the time axis direction of the own downlink signal such that the transmission timing of the known signal in the downlink signal of the another base station device is located in a range of the second intermediate area of the own downlink signal. Accordingly, it is possible to reliably cause the transmission timing of the known signal in the own downlink signal to be different from the transmission timing of the known signal in the downlink signal of the another base station device.

(10) The synchronization processing unit may set, within the range of the second intermediate area, an obtainment section in which to obtain the downlink signal of the another base station device for obtaining the known signal of the another base station device. In this case, it is possible to obtain the known signal of the another base station device without suspending the transmission of the control signal directed to the terminal device connected to the own base station device, whereby it is possible to perform the inter-base-station synchronization while suppressing influence on communication performed by the terminal device.

(11) In order to obtain the known signal of the another base station device, the base station device needs to suspend transmission of the own downlink signal at the beginning of the obtainment section and concurrently to start reception of the downlink signal of the another base station device, and further, at the end of the obtainment section, needs to stop the reception and to restart transmission of the own downlink signal. Thus, the base station device needs to switch reception/transmission before and after the reception of the known signal within a relatively short time period.

In this respect, the synchronization processing unit may adjust a position in the time axis direction of the obtainment section and the position in the time axis direction of the downlink signal of the base station device such that a predetermined time period necessary for processing for obtaining the downlink signal from the another base station device is secured before and after the transmission timing of the known signal contained in the first intermediate area of the another base station device.

In this case, it is possible to secure a time margin during which processing for obtaining the downlink signal from the another base station device is performed, such as switching reception/transmission, before and after the timing at which the known signal is received. Accordingly, it is possible to reliably obtain the known signal even when reception/transmission is switched before and after the reception of the known signal.

(12) Further, it is preferable that the synchronization processing unit adjusts the positions in the time axis direction of the obtainment section and of the downlink signal of the base station device such that the transmission timing of the known signal contained in the first intermediate area of the another base station device is located substantially in the middle of the obtainment section. In this case, it is possible to appropriately secure the time margin for the processing for obtaining the downlink signal, within a limited period of the obtainment section.

(13) In the base station device of (6), it is preferable that the specification signal further includes a reference signal for estimating a transmission path characteristic of the downlink signal, the communication unit area not containing the known signal includes a communication unit area containing the reference signal and a communication unit area not containing the reference signal, and the synchronization processing unit sets an obtainment section in which to obtain the downlink signal from the another base station device for obtaining the known signal of the another base station device, in a range that does not include the communication unit area containing the reference signal in the downlink signal of the base station device.

In this case, the obtainment section is set in a range that does not include the communication unit area containing the reference signal in the own downlink signal. Accordingly, it is possible to obtain the known signal of the another base station device without suspending the transmission of the reference signal directed to the terminal device connected to the own base station device. Therefore, it is possible to perform the inter-base-station synchronization while suppressing influence on communication performed by the terminal device.

(14) Furthermore, the present invention is directed to a base station device that performs communication using a downlink signal composed of a plurality of communication unit areas arranged along a time axis, each communication unit area having a certain time length, the plurality of communication unit areas including a communication unit area containing a known signal for synchronization and a communication unit area not containing the known signal, the base station device including: a reception unit that receives a downlink signal from another base station device; a synchronization processing unit that performs inter-base-station synchronization, by obtaining the known signal contained in the downlink signal from the another base station device received by the reception unit and by causing, based on the known signal, a transmission timing of a communication unit area in the downlink signal of the base station device to coincide with that of the another base station device, wherein the synchronization processing unit performs the inter-base-station synchronization such that a transmission timing of the known signal in the downlink signal of the base station device is different from a transmission timing of the known signal in the downlink signal of the another base station device.

According to the base station device having the above configuration, the synchronization processing unit performs the inter-base-station synchronization such that the transmission timing of the known signal in the own downlink signal is different from the transmission timing of the known signal in the downlink signal of the another base station device. Accordingly, it is possible to suspend transmission of a portion other than the portion containing the known signal in the own downlink signal and to obtain the known signal contained in the downlink signal from the another base station device. Thus, it is possible to obtain the known signal of the another base station device without suspending the transmission of the known signal directed to the terminal device connected to the own base station device. Therefore, it is possible to perform the inter-base-station synchronization while suppressing influence on communication performed by the terminal device.

(15) More specifically, it is preferable that in a case where the downlink signal includes a base frame composed of a plurality of subframes, the communication unit area is the subframe, and the base frame includes a subframe containing the known signal and a subframe not containing the known signal, the synchronization processing unit performs the inter-base-station synchronization by adjusting a position in the time axis direction of the base frame in the downlink signal of the base station device such that a transmission timing of a subframe containing the known signal in the downlink signal of the base station device coincides with a transmission timing of a subframe other than a subframe containing the known signal in the downlink signal of the another base station device.

In this case, the synchronization processing unit can perform the inter-base-station synchronization, by adjusting the position in the time axis direction of the base frame in the own downlink signal, thereby causing the transmission timing of the known signal in the own downlink signal to be different from that of the another base station device and concurrently causing the transmission timing of the own subframe to coincide with the transmission timing of the subframe of the another base station device.

(16) In a case where the base station device of the present invention performs communication in frequency division duplex, the inter-base-station synchronization can be performed more appropriately.

(17) Furthermore, the present invention is directed to a base station device that performs communication with a terminal device using a downlink signal composed of a plurality of communication unit areas arranged along a time axis, each communication unit area having a certain time length, the plurality of communication unit areas including a communication unit area containing a known signal for synchronization and a communication unit area not containing the known signal, the base station device including: a reception unit that receives a downlink signal from another base station device; and a synchronization processing unit that performs inter-base-station synchronization, by obtaining the known signal contained in the downlink signal from the another base station device received by the reception unit and by correcting, based on the known signal, a transmission timing of a communication unit area in the downlink signal of the base station device so as to coincide with that of the another base station device, wherein the synchronization processing unit corrects the transmission timing, in the communication unit area containing the known signal.

According to the base station device having the above configuration, since the synchronization processing unit corrects the transmission timing in the communication unit area containing the known signal, the communication unit area whose transmission timing has been corrected by the inter-base-station synchronization always contains the known signal. Therefore, even if the transmission timing of the own downlink signal is corrected and the transmission timing has been changed as a result of the inter-base-station synchronization, it is possible to allow the terminal device connected to the own base station device to promptly receive the known signal and to allow the terminal device to achieve synchronization with the own base station device. As a result, it is possible to prevent the terminal device from misidentifying the own base station device, or from becoming unable to appropriately receive the downlink signal as a result of the shift of the transmission timing of the downlink signal of the base station device. Therefore, it is possible to perform the inter-base-station synchronization while suppressing influence on communication between the own base station device and the terminal device.

In this manner, according to the base station device of the present invention, it is possible to perform the inter-base-station synchronization while suppressing influence on communication performed by the terminal device.

(18) In the above base station device, it is preferable that after obtaining the known signal and determining a synchronization error between a transmission timing of a communication unit area in the downlink signal of the another base station device and the transmission timing of the communication unit area in the downlink signal of the base station device, the synchronization processing unit corrects the transmission timing of the communication unit area in the downlink signal of the base station device in a communication unit area containing the known signal, the communication unit area coming first after the determination.

In this case, the transmission timing is promptly corrected in the communication unit area containing the known signal after the synchronization error has been determined. Therefore, it is possible to perform the inter-base-station synchronization more accurately.

(19) It is preferable that in a case where the downlink signal includes a base frame composed of a plurality of subframes, the communication unit area is the subframe, and the base frame includes a subframe containing the known signal and a subframe not containing the known signal, the synchronization processing unit corrects the transmission timing, in the subframe containing the known signal.

(20) There may be a case where a subframe, among the subframes containing the known signals, that is located at a most front position in the base frame, contains control information for the terminal device in addition to the known signal.

Therefore, it is preferable that the synchronization processing unit corrects the transmission timing in a subframe, among the subframes containing the known signals, that is located at a most front position in the base frame.

(21) Moreover, in a case where a base station device achieves synchronization with another base station device as a synchronization source, the base station device needs to adjust the transmission timing of the own downlink signal to cause it to coincide with that of the another base station device. When the amount of the synchronization error between the transmission timing of the base station device and the transmission timing of the another base station device is relatively large, if the base station device attempts to cancel the error, interference between symbols and the like may occur in the own downlink signal. Thus, the inter-base-station synchronization may not be appropriately performed depending on the amount of the synchronization error.

In view of the above, the present invention is directed to a base station device that performs communication with a terminal device in frequency division duplex, using a downlink signal composed of a plurality of communication unit areas arranged along a time axis, each communication unit area having a certain time length, the base station device including: a reception unit that receives a downlink signal from another base station device; a synchronization error detection unit that detects, based on the downlink signal from the another base station device received by the reception unit, a synchronization error between a communication unit area of the downlink signal of the another base station device and a communication unit area of the downlink signal of the base station device; a correction unit that corrects the downlink signal of the base station device based on the synchronization error and thereby causes the downlink signal of the base station device to be synchronized with the downlink signal of the another base station device; and a correction control unit that selects, in accordance with an amount of the synchronization error, a correction method performed by the correction unit from a plurality of types of correction methods.

According to the base station device having the above configuration, the correction unit corrects the own downlink signal based on the synchronization error detected by the synchronization error detection unit to achieve synchronization with the downlink signal of the another base station device, whereby the base station device can perform the inter-base-station synchronization with the another base station device.

Moreover, according to the base station device, the correction control unit selects a correction method performed by the correction unit, in accordance with the amount of the synchronization error. Thus, the base station device can correct the communication unit area of the own downlink signal by an appropriate correction method that suits the situation. Accordingly, for example, even when a correction method may cause influence of interference between symbols due to a large overlap between adjacent communication unit areas because the error amount is large, it is possible to select a correction method that can avoid influence of interference between symbols. As a result, it is possible to avoid influence of interference between symbols irrespective of the magnitude of the amount of the synchronization error, and to perform the inter-base-station synchronization appropriately.

As described above, according to the base station device of the present invention, it is possible to perform the inter-base-station synchronization appropriately in accordance with the amount of the synchronization error.

(22) It is preferable that the plurality of types of correction methods include a first method in which the amount of the synchronization error is divided into a plurality of amounts and correction is performed for the divided amounts the plurality of times. In this case, since an error amount is divided into a plurality of amounts and correction is performed for the divided amount the plurality of times, it is possible to reduce the correction amount at each correction, and thus it is possible to prevent adjacent communication unit areas from greatly overlapping each other.

(23) Specifically, it is preferable that when the downlink signal includes a base frame composed of a plurality of subframes and the communication unit area is the subframe, correction is performed, in the first method, on each of the plurality of subframes to correct the amount of the synchronization error.

(24) The base station device may further include a resource allocation control unit that controls allocation of resource for the terminal device to the communication unit area, and the plurality of types correction methods may include a second method in which the resource allocation control unit restricts the resource allocation to a communication unit area located before a correction-target communication unit area to be corrected and then correction is performed on the correction-target communication unit area.

In this case, in the second method, the resource allocation to the communication unit area located before the correction-target communication unit area is restricted. Therefore, for example, even if interference between symbols occurs due to a large overlap between the correction-target communication unit area and the communication unit area located therebefore, it is possible to prevent the influence from occurring.

(25) Moreover, in the second method, transmission of the downlink signal of the base station device in the communication unit area located before the correction-target communication unit area may be suspended.

In this case, even when the correction-target communication unit area is corrected in the range of the section corresponding to the time length of the communication unit area located before the correction-target communication unit area, the transmission of the downlink signal is suspended in that section. Therefore, interference between symbols does not occur.

(26) Since the second method allows correction of the own communication unit area in the range of the communication unit area for which resource allocation is restricted, the communication unit area being located before the correction-target communication unit area, it is possible to secure a relatively large correction width when the correction is performed. Accordingly, it is preferable that when the amount of the synchronization error is greater than a predetermined threshold, the correction control unit selects the second method.

(27) It is preferable that the threshold is set in accordance with a time length of a guard interval section interposed between adjacent communication unit areas.

In this case, for example, it is possible to set the threshold to an error amount that allows determination that it is necessary to perform correction for the time length of the guard interval section or more. It may be configured such that when it is determined that it is necessary to perform correction for the time length of the guard interval section or more, the second method is selected that can secure a relatively large correction width. Accordingly, it is possible to select an appropriate correction method in accordance with the error amount.

(28) Moreover, for example, even in a case where the amount of the synchronization error is relatively large, when the amount of data is relatively small, if interference between symbols occurs, its influence on the terminal device is small. Therefore, the above base station device may further include a detection unit that detects an amount of data to be transmitted to the terminal device by means of the downlink signal of the base station device, and the correction control unit may determine whether to select the second method in accordance with the amount of the synchronization error and a detection result by the detection unit.

In this case, for example, in a case where the amount of the synchronization error is relatively large and the amount of data is relatively large, the correction control unit can prevent the influence of interference between symbols on the terminal device, by selecting the second method and restricting the resource allocation. On the other hand, even in a case where the amount of the synchronization error is relatively large, when the amount of data is relatively small, even if interference between symbols occurs, influence on the terminal device is small. Therefore, the correction control unit may select a method, which is a method other than the second method.

As described above, by the correction control unit determining whether to select the second method in accordance with the amount of data to be transmitted to the terminal device, which amount is the detection result by the detection unit, and in accordance with the amount of the synchronization error, it is possible to perform the inter-base-station synchronization more appropriately while taking into consideration the influence of interference between symbols on the terminal device.

(29) Specifically, it is preferable that when the downlink signal includes a base frame composed of a plurality of subframes and the communication unit area is the subframe, the resource allocation is restricted for each subframe in the second method.

(30) In a case where a base station device achieves synchronization with another base station device as a synchronization source, even when the synchronization has been achieved in terms of the transmission timings of the communication frames, if the positions in the time axis direction of the communication frames containing the synchronization signals are shifted from each other, the transmission timings of the synchronization signals may be shifted between the base station devices. In such a case, there arises a problem that a series of processes for cooperative transmission become troublesome.

In view of this, the present invention is directed to a base station device that performs communication with a terminal device in frequency division duplex by using a downlink signal composed of a plurality of communication unit areas arranged along a time axis, each communication unit area having a certain time length, the plurality of communication unit areas including a communication unit area containing a known signal for synchronization and a communication unit area not containing the known signal, the base station device including: a reception unit that receives a downlink signal from another base station device; and a synchronization processing unit that performs inter-base-station synchronization, by obtaining the known signal contained in the downlink signal from the another base station device received by the reception unit and by causing, based on the known signal, a transmission timing of a communication unit area in the downlink signal of the base station device to coincide with that of the another base station device, wherein the synchronization processing unit performs the inter-base-station synchronization such that a transmission timing of the known signal in the downlink signal of the base station device coincides with a transmission timing of the known signal in the downlink signal of the another base station device.

According to the base station device having the above configuration, the synchronization processing unit performs the synchronization process with the another base station device such that the transmission timing of the known signal in the own downlink signal coincides with the transmission timing of the known signal in the downlink signal of the another base station device. Therefore, even in a case where the cooperative transmission is performed with the another base station device, it becomes easy for each base station device to allocate, to a communication frame at an identical timing, information that should be transmitted simultaneously.

As a result, according to the above base station device, it is possible to perform the inter-base-station synchronization while making the cooperative transmission easily available.

(31) Specifically, it is preferable that in a case where the downlink signal includes a base frame composed of a plurality of subframes, the communication unit area is the subframe, and the base frame includes a subframe containing the known signal and a subframe not containing the known signal, the synchronization processing unit performs the inter-base-station synchronization by adjusting a position in the time axis direction of the base frame in the downlink signal of the base station device such that a transmission timing of a subframe containing the known signal in the downlink signal of the base station device coincides with a transmission timing of a subframe containing the known signal in the downlink signal of the another base station device.

In this case, the synchronization processing unit can perform the inter-base-station synchronization, by adjusting the position in the time axis direction of the base frame in the own downlink signal, thereby causing the transmission timing of the known signal in the own downlink signal to coincide with that of the another base station device and concurrently causing the transmission timing of the own subframe to coincide with the transmission timing of the subframe of the another base station device.

DESCRIPTION OF EMBODIMENTS

Hereinafter, preferred embodiments will be described with reference to accompanying drawings.

1. First Embodiment 1.1 Configuration of Communication System

Figure 1:
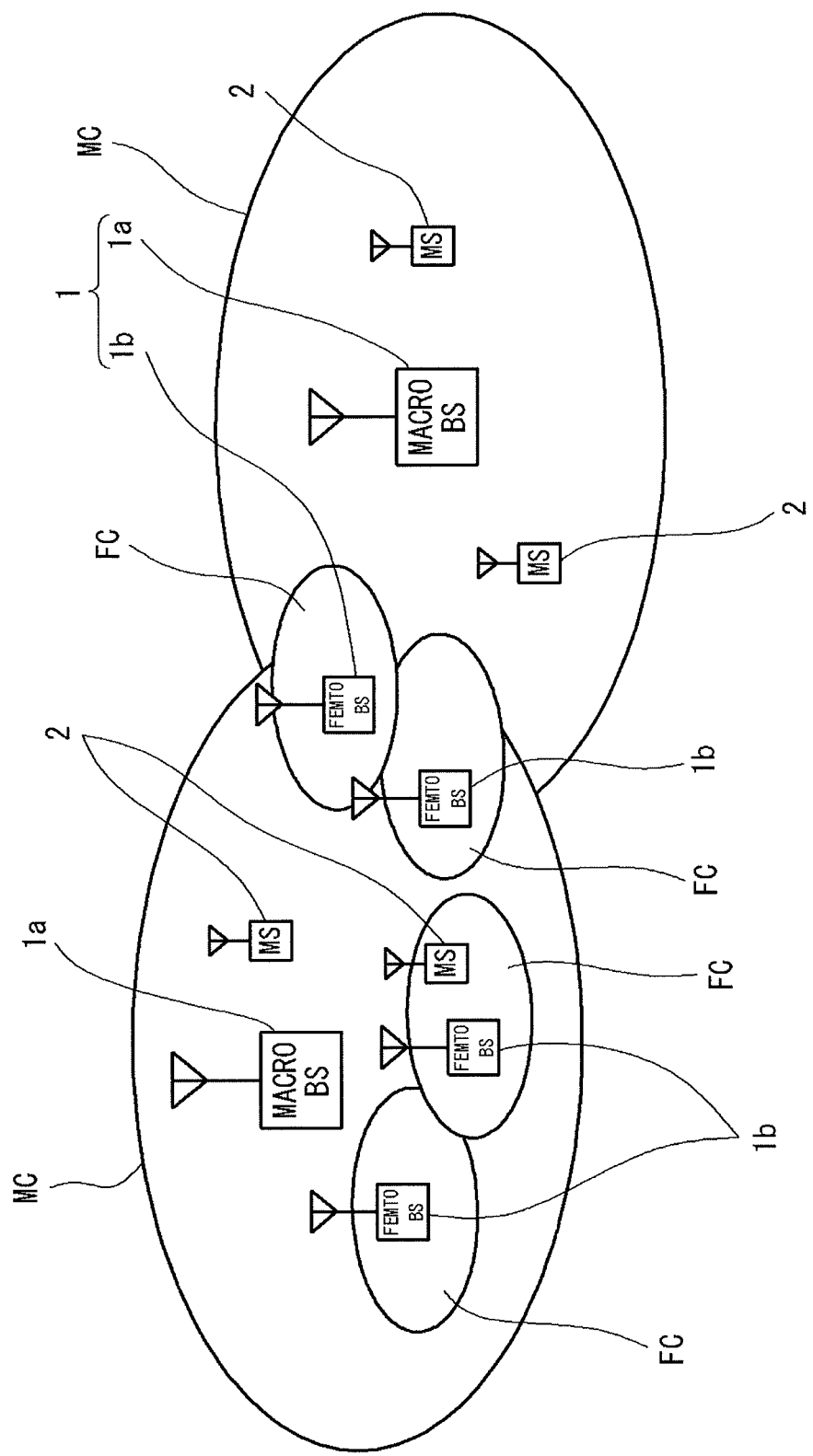
FIG. 1 is a schematic diagram showing a configuration of a wireless communication system according to a first embodiment.

FIG. 1 is a schematic diagram showing a configuration of a wireless communication system according to a first embodiment.

The wireless communication system includes a plurality of base station devices 1, and a plurality of terminal devices 2 (mobile station) that can perform wireless communication with the base station devices 1.

The plurality of base station devices 1 includes a plurality of macro base station devices 1a which forms a communication area (macro cell) MC having a size of, for example, several kilometers, and a plurality of femto base station devices 1b which are installed in each macro cell MC and forms a relatively small femto cell FC having a size of several tens of meters.

Each macro base station device 1a (hereinafter also referred to as a macro BS1a) can perform wireless communication with a terminal device 2 that is present in a macro cell MC formed by the macro base station device 1a.

Each femto base station device 1b (hereinafter also referred to as femto BS1b) is located in a place where a radio wave from a macro BS1a is difficult to be received, such as indoors, and forms a femto cell FC. The femto BS1b can perform wireless communication with a terminal device 2 (hereinafter also referred to as MS 2) that is present in a femto cell FC that the femto BS1b forms. In this system, a femto BS1b which forms a relatively small femto cell FC is installed in a place where a radio wave from a macro BS1a is difficult to be received or the like, thereby enabling provision of service with a sufficient throughput to the MS 2.

In the above wireless communication system, after a macro BS1a has been installed, a femto BS1b is installed within a macro cell MC formed by the macro BS1a, and forms a femto cell FC within the macro cell MC. Therefore, interference and the like may occur between the femto BS1b and the macro BS1a or an MS 2 communicating with this macro BS1a.

Therefore, the femto BS1b has a function of monitoring (measurement process) a transmission state, such as the transmission power and the operating frequency of another base station device, e.g., the macro BS1a and a femto BS1b other than the femto BS1b itself, and a function of adjusting, based on the result, the transmission state such as the transmission power and the operating frequency, so as not to influence the communication performed by the macro cell MC.

By these functions, the femto BS1b can form a femto cell FC in the macro cell MC without influencing the communication performed by the another base station device.

In the communication system of the present embodiment, inter-base-station synchronization in which synchronization of timings of communication frames is achieved among a plurality of base station devices including a macro BS 1a and a femto BS1b is performed.

The inter-base-station synchronization is performed by "over-the-air synchronization" where synchronization is achieved such that a signal transmitted from a base station device serving as a master station (synchronization source) to an MS 2 in its cell is received by another base station device.

The base station device serving as a master station (synchronization source) may further achieve over-the-air synchronization with another base station device, or may autonomously determine frame timing by any other method than over-the-air synchronization, e.g., determining frame timing using GPS signals.

Note that a macro BS1*a* can have another macro BS1*a* as a master station, but cannot have a femto BS1*b* as a master station. A femto BS can have a macro BS1*a* as a master station or can have another femto BS as a master station.

The wireless communication system of the present embodiment is, for example, a mobile phone system to which LTE (Long Term Evolution) is applied, and in which communication that complies with LTE is performed between each base station device and a terminal device. In LTE, frequency division duplex (FDD) can be adopted. In the present embodiment, the communication system is described assuming that FDD is adopted. Note that the communication system is not limited to LTE, or FDD, and, for example, TDD (Time Division Duplex) may be adopted.

1.2. Frame Structure for LTE

In FDD that can be adopted in LTE with which the communication system of the present embodiment complies, uplink communication and downlink communication are simultaneously performed by allocating different operating frequencies between an uplink signal (a transmission signal from a terminal device to a base station device) and a downlink signal (a transmission signal from the base station device to the terminal device).

Figure 2:
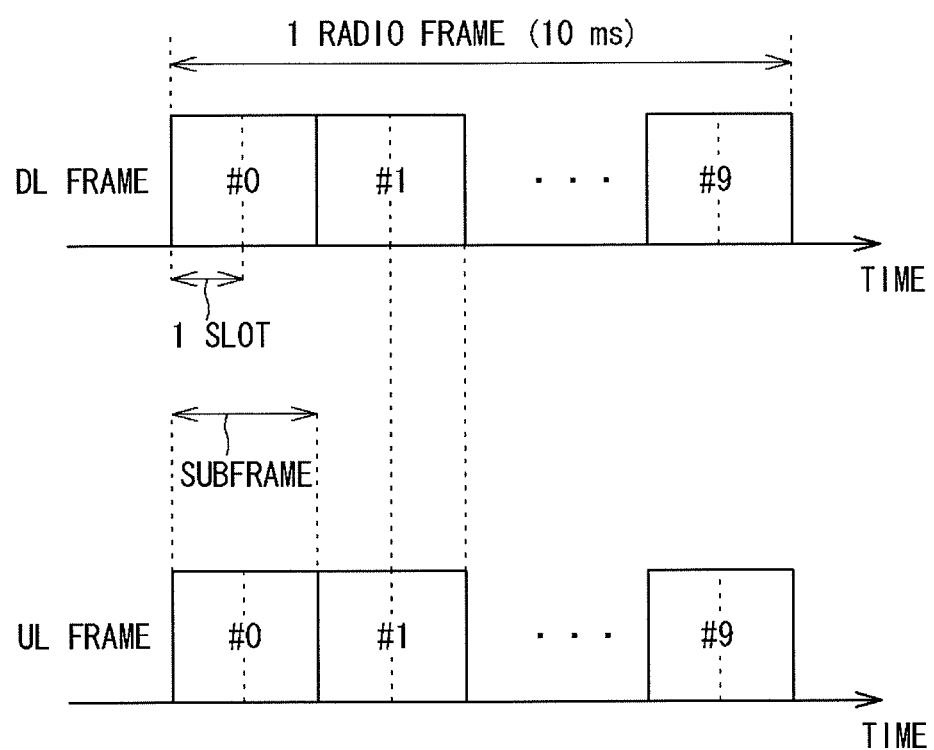
FIG. 2 is a diagram showing uplink and downlink communication frame structures for LTE.

FIG. 2 shows uplink and downlink radio frame structures for LTE. A downlink radio frame (DL frame), which is a downlink base frame for LTE, and an uplink radio frame (UL frame), which is a uplink base frame for LTE, each have a time length of 10 milliseconds, and each consist of ten subframes (communication unit areas each having a certain time length), #0 to #9. These DL frames and UL frames are arranged in the time axis direction with their timings coinciding with each other.

Figure 3:
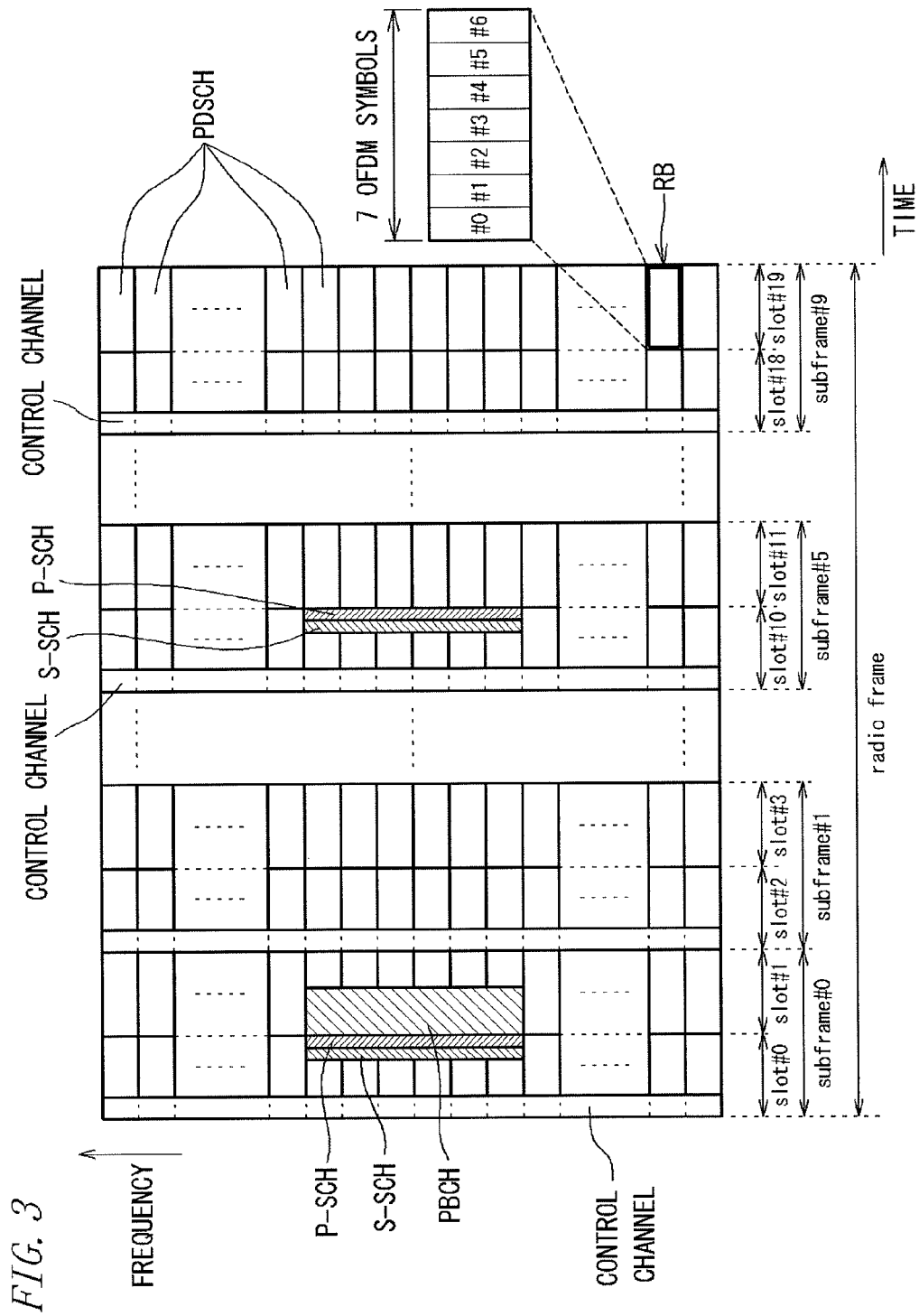
FIG. 3 is a diagram showing in detail a DL frame structure.

FIG. 3 shows in detail a DL frame structure. In FIG. 3, the vertical axis represents frequency and the horizontal axis represents time.

Each subframe forming the DL frame consists of two slots (for example, slots #0 to #1). Each slot consists of seven (#0 to #6) OFDM symbols (in the case of normal cyclic prefix).

In FIG. 3, a resource block (RB) which is a basic unit (minimum unit) used in transmission of data is defined by 12 subcarriers in the frequency axis direction and 7 OFDM symbols (1 slot) in the time axis direction. Therefore, for example, when the frequency band width of the DL frame is set to 5 MHz, 300 subcarriers are arranged, and thus, 25 resource blocks are arranged in the frequency axis direction.

As shown in FIG. 3, at the beginning of each subframe, a control channel is allocated which is used by a base station device in order to transmit, to a terminal device, information necessary for downlink communication. The control channel is allocated to the symbols #0 to #2 (three symbols at the maximum) in the slot #0 of each subframe (slot located at the beginning of each subframe). DL control information, resource allocation information of the subframe, acknowledgement (ACK) and negative acknowledgement (NACK) in response to a hybrid automatic repeat request (HARD), and the like are stored in the control channel.

In a DL frame, the first subframe #0 is allocated with a physical broadcast channel (PBCH) for notifying a terminal device of the band width and the like of the system by broadcast transmission. The physical broadcast channel is located, in the time axis direction, at the positions of the symbols #0 to #3 in the second slot #1 (rear-side slot) of the first subframe #0, that is, by a width of four symbols, and allocated, in the frequency axis direction, in the middle of the band width of the DL frame by a width of six resource blocks (72 subcarriers). The physical broadcast channel is configured to be updated every 40 milliseconds, by identical information being transmitted over four frames.

Main system information such as a communication band width, the number of transmission antennas, and a control information structure are stored in the physical broadcast channel.

Of the ten subframes forming a DL frame, each of the first (#0) and the sixth (#5) subframes is allocated with a primary synchronization channel (P-SCH) and a secondary synchronization channel (S-SCH), which are signals for identifying a base station device and a cell.

The primary synchronization channel is located in the time axis direction at the position of the last OFDM symbol, which is the symbol #6, in the first (#0) slot (front-side slot) of each of the subframe #0 and the subframe #5, by a width of one symbol, and located, in the frequency axis direction, in the middle of the band width of the DL frame by a width of six resource blocks (72 subcarriers). The primary synchronization channel is information used by a terminal device to identify each of a plurality of (three) sectors into which a cell of a base station device is divided, and is defined in three patterns.

The secondary synchronization channel is located in the time axis direction at the position of the second last OFDM symbol, which is the symbol #5, in the slot #0 (front-side slot) in each of the subframe #0 and the subframe #5, by a width of one symbol, and located, in the frequency axis direction, in the middle of the band width of the DL frame by a width of six resource blocks (72 subcarriers). The secondary synchronization channel is information used by a terminal device to identify each of communication areas (cells) of a plurality of base station devices, and is defined in 168 patterns.

By combining the primary synchronization channel and the secondary synchronization channel, 504 (168×3) types of patterns are defined. By receiving the primary synchronization channel and the secondary synchronization channel transmitted from a base station device, a terminal device can recognize in which sector of which base station device the terminal device is present.

A plurality of patterns that the primary synchronization channel and the secondary synchronization channel can take are defined in advance in communication standards and are known by each base station device and each terminal device. That is, each of the primary synchronization channel and the secondary synchronization channel is a known signal that can take a plurality of patterns.

As described above, each downlink signal is formed by arranging a plurality of subframes, and each of the plurality of subframes forming the downlink signal includes subframes that includes the primary synchronization channel and the secondary synchronization channel and subframes that do not include these signals.

The subframes that include the primary synchronization channel and the secondary synchronization channel (#0 and #5) are arranged with a space therebetween, when the downlink signal is viewed in terms of units of subframes. By being arranged in the DL frame as described above, the primary synchronization channel and the secondary synchronization channel are periodically arranged in the downlink signal, in a cycle corresponding to five subframes.

The primary synchronization channel and the secondary synchronization channel are used not only for the case in which a terminal device achieves synchronization with a base station device but also for inter-base-station synchronization in which synchronization of communication timing and/or frequency is achieved among base station devices, which will be described later.

Resource blocks in other areas in which the above described channels are not allocated (unhatched area in the drawing) are used as physical downlink shared channels (PD-SCH) for storing user data and the like. Each physical downlink shared channel is an area shared by a plurality of terminal devices to communicate with each other. Control information and the like specific to each terminal device as well as the user data are stored in the physical downlink shared channel.

The allocation of user data to be stored in the physical downlink shared channel is specified by the resource allocation information in the above control channel which is allocated at the beginning of each subframe. By using the resource allocation information, a terminal device can determine whether data relating to itself is stored in the subframe.

1.3 Configuration of Femto Base Station Device

Figure 4:
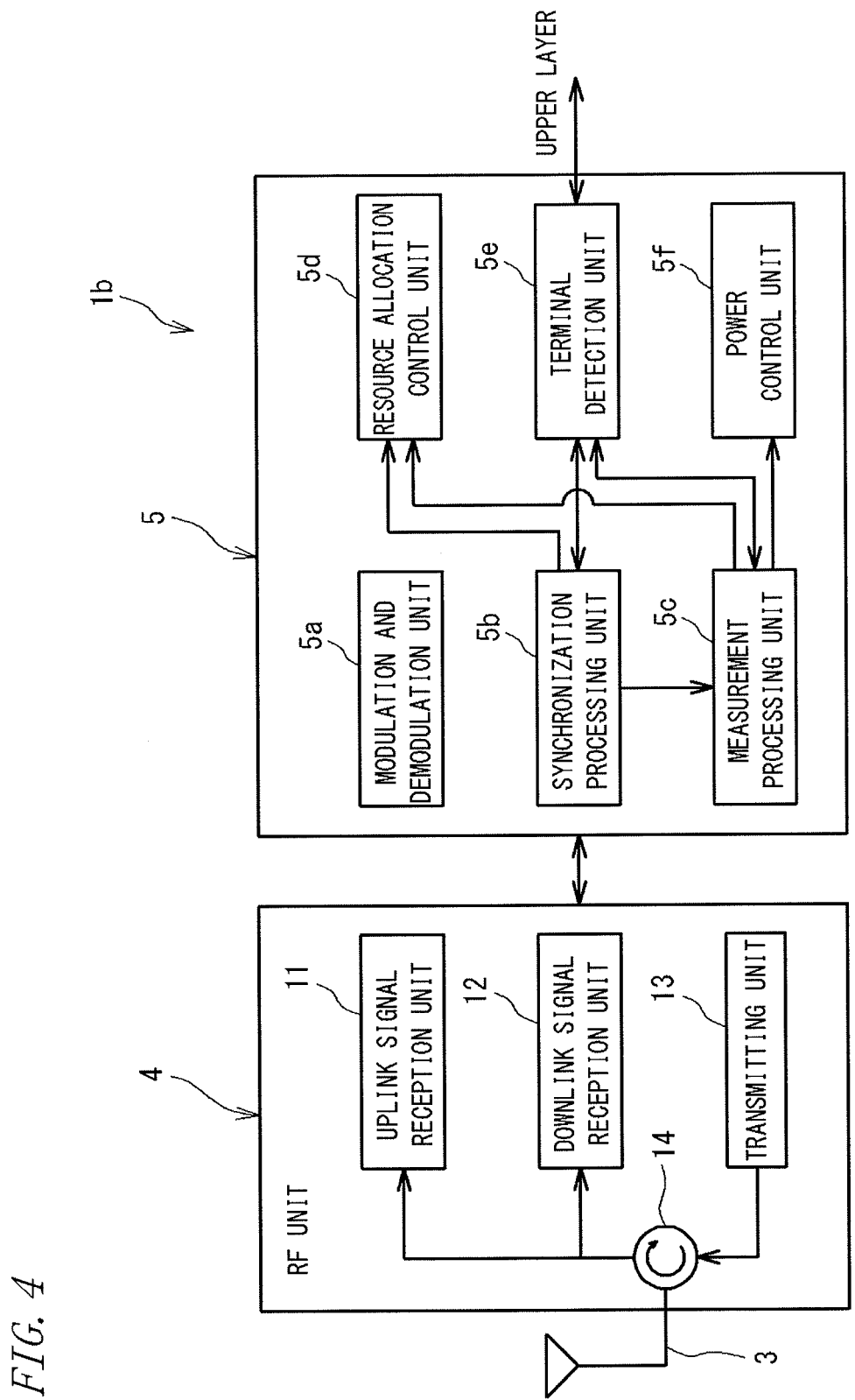
FIG. 4 is a block diagram showing a configuration of a femto base station device.

FIG. 4 is a block diagram showing a configuration of a femto base station device shown in FIG. 1. Note that although the configuration of a femto BS1$b$ will be described here, the configuration of a macro BS1$a$ is almost the same as that of the femto BS1$b$.

The femto BS1$b$1 includes an antenna 3, a transmission/reception unit (RF unit) to which the antenna 3 is connected, a signal processing unit 5 which performs processing regarding inter-base-station synchronization, measurement and the like, in addition to signal processing of transmission and reception signals transmitted to and received from the RF unit 4.

[1.3.1 RF Unit]

Figure 5:
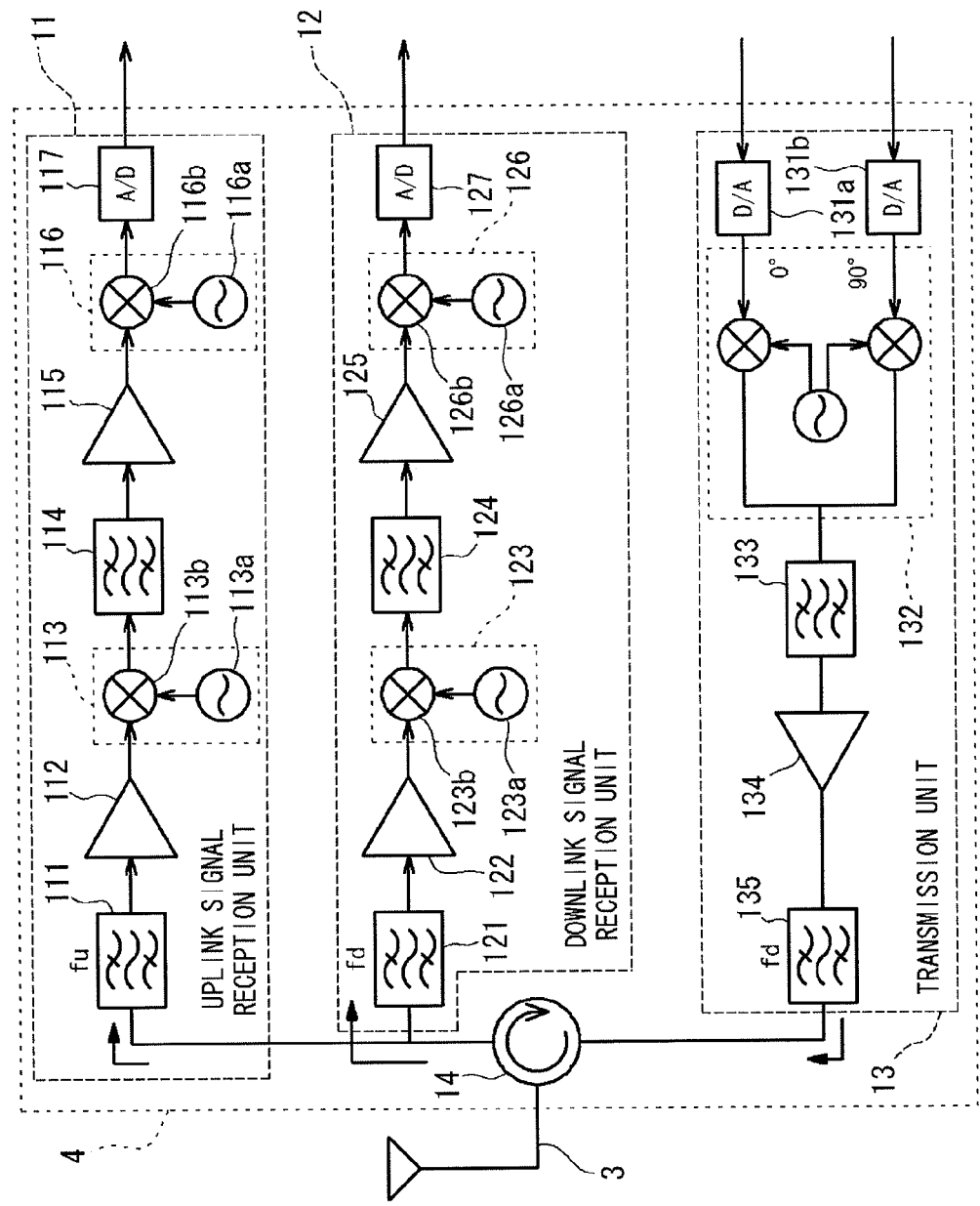
FIG. 5 is a block diagram showing in detail an RF unit.

FIG. 5 is a block diagram showing in detail the RF unit 4. The RF unit 4 includes an uplink signal reception unit 11, a downlink signal reception unit 12, and a transmission unit 13. The uplink signal reception unit 11 receives an uplink signal from a terminal device 2, and the downlink signal reception unit 12 receives a downlink signal from another macro BS1$a$ or another femto BS1$b$. The transmission unit 13 transmits a downlink signal to the terminal device 2.

The RF unit 4 further includes a circulator 14. The circulator 14 provides a reception signal from the antenna 3 to the uplink signal reception unit 11 and the downlink signal reception unit 12, and provides a transmission signal outputted from the transmission unit 13 to the antenna 3. The circulator 14 and a fourth filter 135 in the transmission unit 13 prevent the reception signal from the antenna 3 from being transmitted to the transmission unit 13.

Further, the circulator 14 and a first filter 111 in the uplink signal reception unit prevent the transmission signal outputted from the transmission unit 13 from being transmitted to the uplink signal reception unit 11. Furthermore, the circulator 14 and a fifth filter 121 prevent the transmission signal outputted from the transmission unit 13 to be transmitted to the downlink signal reception unit 12.

The uplink signal reception unit 11 is configured as a superheterodyne receiver so as to perform IF (intermediate frequency) sampling. More specifically, the uplink signal reception unit 11 includes the first filter 111, a first amplifier 112, a first frequency converter 113, a second filter 114, a second amplifier 115, a second frequency converter 116, and an A/D converter 117.

The first filter 111 allows only the uplink signal from the terminal device 2 to pass therethrough, and is implemented by a band-pass filter that allows only the frequency $f_u$ of the uplink signal to pass therethrough. The reception signal having passed through the first filter 111 is amplified by the first amplifier (high-frequency amplifier) 112, and then subjected to frequency conversion from the frequency $f_u$ to a first intermediate frequency by the first frequency converter 113. Note that the first frequency converter 113 includes an oscillator 113$a$ and a mixer 113$b$.

The output from the first frequency converter 113 passes through the second filter 114 that allows only the first intermediate frequency to pass therethrough, and is again amplified by the second amplifier (intermediate frequency amplifier) 115. The output from the second amplifier 115 is subjected to frequency conversion from the first intermediate frequency to a second intermediate frequency by the second frequency converter 116, and is converted to a digital signal by the A/D converter 117. Note that the second frequency converter 116 also includes an oscillator 116$a$ and a mixer 116$b$.

The output from the A/D converter 117 (the output from the first reception unit 11) is provided to the signal processing unit 5 that also functions as a demodulation circuit, and a demodulation process for the reception signal from the terminal device 2 is performed.

Thus, the uplink signal reception unit 11 is a reception unit configured to comply with the uplink signal frequency $f_u$ so as to receive the uplink signal from the terminal device, and is a reception unit that the base station device essentially requires.

The transmission unit 13 receives an in-phase signal I and a quadrature signal Q outputted from the signal processing unit 5, and causes the antenna 3 to transmit the signals. Thus, the transmission unit 13 is configured as a direct conversion transmitter. The transmission unit 13 includes D/A converters 131$a$ and 131$b$, an orthogonal modulator 132, a third filter 133, a third amplifier (high power amplifier; HPA) 134, and the fourth filter 135.

The D/A converters 131$a$ and 131$b$ perform D/A conversion on each of the in-phase signal I and the quadrature signal Q provided by the signal processing unit 5. The outputs from the D/A converters 131$a$ and 131$b$ are provided to the orthogonal modulator 132, and the orthogonal modulator 132 generates a transmission signal having a carrier wave frequency $f_d$ (downlink signal frequency). The output from the orthogonal modulator 132 passes through the third filter 133 that allows only the frequency $f_d$ to pass therethrough, and is amplified by the third amplifier 134. The output from the third amplifier 134 passes through the fourth filter 135 that allows only the frequency $f_d$ to pass therethrough, and is transmitted from the antenna 3 as a downlink signal to the terminal device.

As described above, while the uplink signal reception unit 11 and the transmission unit 13 are functions necessary for performing essential communication with the terminal device, the base station device 1 of the present embodiment further includes the downlink signal reception unit 12. The downlink signal reception unit 12 receives a downlink signal transmitted by another base station device.

In the present embodiment, a downlink signal from another base station device, which has been received by the downlink signal reception unit 12, is used for an inter-base-station synchronization process and measurement of transmission state such as a transmission power of the another base station device.

The frequency of the downlink signal transmitted by the another base station device is $f_d$ which is different from the frequency $f_u$ of the uplink signal. Therefore, a common base station device having only the uplink signal processing unit 11 cannot receive the downlink signal transmitted by the another base station device.

That is, in contrast to TDD, in FDD, an uplink signal and a downlink signal simultaneously exist on a transmission path. Therefore, the uplink signal reception unit 11 is configured so that only a signal of the uplink signal frequency $f_u$ is allowed to pass therethrough while a signal of the downlink signal frequency $f_d$ is not allowed to pass therethrough. Specifically, the uplink signal reception unit 11 includes the first filter 111 that allows only a signal of the uplink signal frequency $f_u$ to pass therethrough, and the second filter 114 that allows only the first intermediate frequency into which the frequency $f_u$ is converted to pass therethrough. Therefore, if a signal of a frequency (the downlink signal frequency $f_d$) other than the frequency $f_u$ is provided to the first reception unit 11, the signal is not allowed to pass through the uplink signal reception unit 11.

That is, the uplink signal reception unit 11, including the filters 111 and 114, complies with reception of a signal of the uplink signal frequency $f_u$, and therefore, cannot receive signals of other frequencies (particularly, the downlink signal).

Accordingly, the RF unit 4 of the present embodiment includes, separately from the uplink signal reception unit 11, the downlink signal reception unit 12 for receiving a downlink signal of the frequency $f_d$ transmitted by another base station device.

The downlink signal reception unit 12 includes a fifth filter 121, a fourth amplifier (high-frequency amplifier) 122, a third frequency converter 123, a sixth filter 124, a fifth amplifier (intermediate frequency amplifier) 125, a fourth frequency converter 126, and an A/D converter 127.

The fifth filter 121 allows only a downlink signal from another base station device to pass therethrough, and is implemented by a band-pass filter that allows only the frequency $f_d$ of the downlink signal to pass therethrough. A reception signal having passed through the fifth filter 121 is amplified by the fourth amplifier (high-frequency amplifier) 122. The output from the fourth amplifier 122 is subjected to frequency conversion from the downlink signal frequency $f_d$ to the first intermediate frequency by the third frequency converter 123. Note that the third frequency converter 123 includes an oscillator 123a and a mixer 123b.

The output from the third frequency converter 123 passes through the sixth filter 124 that allows only the first intermediate frequency outputted from the third frequency converter 123 to pass therethrough, and is again amplified by the fifth amplifier (intermediate frequency amplifier) 125. The output from the fifth amplifier 125 is subjected to frequency conversion from the first intermediate frequency to the second intermediate frequency by the fourth frequency converter 126, and is further converted into a digital signal by the A/D converter 127. Note that the fourth frequency converter 126 also includes an oscillator 126a and a mixer 126b.

The signal outputted from the A/D converter 127 is provided to a synchronization processing unit 5b and a measurement processing unit 5c described below included in the signal processing unit 5.

Note that each of the uplink signal reception unit 11 and the downlink signal reception unit 12 may be configured as a direct conversion receiver.

It is preferable that symmetry of uplink and downlink signals in the downlink signal reception unit 12 and the transmission unit 13 is secured by antenna calibration. Such antenna calibration is realized by providing the downlink signal reception unit 12 and/or the transmission unit 13 with a gain/phase adjuster (not shown).

[1.3.2 Signal Processing Unit]

The signal processing unit 5 has a function of performing signal processing on transmission and reception signals transmitted to and received from the RF unit 4, and includes a modulation/demodulation unit 5a that modulates various transmission data provided by an upper layer of the signal processing unit 5 into a transmission signal and demodulates a reception signal provided by the RF unit 4 into reception data. The modulation/demodulation unit 5a performs processes of modulation and demodulation with a synchronization error corrected, based on a synchronization error (timing offset, frequency offset) calculated by the synchronization processing unit 5b described below.

Further, the signal processing unit 5 includes a frame counter (not shown) for determining a transmission timing of each radio frame of a transmission signal to be provided to the RF unit 4.

Further, the signal processing unit 5 includes a resource allocation control unit 5d, and a terminal detection unit 5e for detecting a communication state of a terminal device connected to the own base station device and to another base station device, in addition to the synchronization processing unit 5b for performing a synchronization process in which inter-base-station synchronization is achieved with another base station device, and the measurement processing unit 5c for performing measurement.

Hereinafter, a configuration of the synchronization processing unit 5b will be described.

[1.3.3 Synchronization Processing Unit]

[1.3.3.1 Function of Synchronization Processing Unit]

Figure 6:
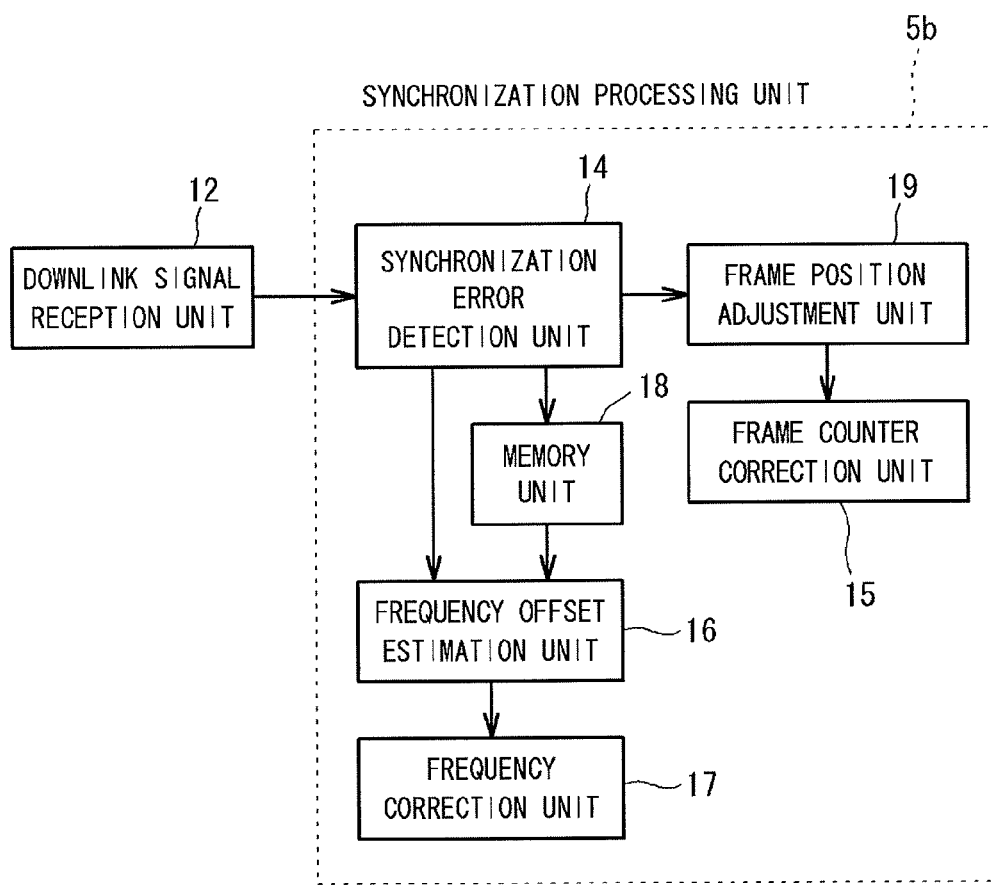
FIG. 6 is a block diagram showing a configuration of a synchronization processing unit for performing a synchronization process in which inter-base-station synchronization is achieved with another base station device.

FIG. 6 is a block diagram showing a configuration of the synchronization processing unit 5b for performing a synchronization process in which inter-base-station synchronization is achieved with another base station device.

Such inter-base-station synchronization may be performed by providing each of the base station devices with a GPS receiver so that the base station device can achieve synchronization by using GPS signals, or by connecting the base station devices via a cable. However, the present embodiment adopts inter-base-station synchronization based on "over-the-air synchronization" in which synchronization is achieved by using radio signals (downlink signals).

Specifically, the synchronization processing unit 5b obtains a downlink signal from another base station device received by the downlink signal reception unit 12, and performs a synchronization process of synchronizing the communication timing and the communication frequency of the own base station device 1 with those of another base station device, based on a primary synchronization channel (P-SCH) and a secondary synchronization channel (S-SCH) which are known signals included in a radio frame of the downlink signal.

The synchronization processing unit 5b sets, in units of subframes, a timing to obtain a downlink signal from another base station device provided by the downlink signal reception unit 12 such that the above synchronization process is performed in a predetermined cycle.

Moreover, the synchronization processing unit 5b has a function of adjusting the timing to perform a synchronization process, by adjusting the cycle of the timing to obtain the downlink signal for the synchronization process, in accordance with a detection result from the terminal detection unit 5e.

The synchronization processing unit 5b starts the synchronization process by causing the transmission unit 13 to suspend transmission of a transmission signal, in a section of a subframe corresponding to the timing to obtain a downlink signal (synchronization process start timing), which timing has been set by the synchronization processing unit 5b itself. While the transmission of the transmission signal is suspended, the synchronization processing unit 5b causes the downlink signal reception unit 12 to receive a downlink signal of another base station device, and obtains the received downlink signal. Then, using the downlink signal, the synchronization processing unit 5b corrects its own frame timing (e.g., transmission timings of subframes) and communication frequency, and ends the synchronization process. Note that the section for which the transmission of the transmission signal is suspended may be set to a subframe corresponding to the timing to obtain the downlink signal for performing the synchronization process and to subsequent one or more subframes.

In addition to the suspension of the transmission of the transmission signal described above, suspension of reception of an uplink signal from a terminal device may be performed.

The synchronization processing unit 5b outputs, to the resource allocation control unit 5d and the measurement processing unit 5c, synchronization timing information for specifying a subframe corresponding to the section for which transmission of the transmission signal is suspended.

[1.3.3.2 Configuration of Synchronization Processing Unit]

The synchronization processing unit 5b includes a synchronization error detection unit 14, a frame counter correction unit 15, a frequency offset estimation unit 16, a frequency correction unit 17, a memory unit 18, and a frame position adjustment unit 19, and has a function of performing synchronization of frame transmission timings and correcting a carrier frequency.

The synchronization error detection unit 14 detects a frame transmission timing of another base station device by using the known signals included in a downlink signal, and detects an error (frame synchronization error; communication timing offset) between the detected frame transmission timing and a frame transmission timing of the own base station device 1.

Note that detection of a transmission timing can be performed by detecting timings of the primary synchronization channel and the secondary synchronization channel, which are known signals (waveforms thereof are also known) each existing in a predetermined position in the frame of the received downlink signal.

The synchronization error detection unit 14 provides the detected frame synchronization error to the frame position adjustment unit 19 and further to the memory unit 18 each time a frame synchronization error is detected. These detected frame synchronization errors are accumulated in the memory unit 18.

Upon receiving the frame synchronization error from the synchronization error detection unit 14, the frame position adjustment unit 19 generates control information regarding a frame timing for correcting the frame synchronization error and for adjusting the position of the own radio frame in the time axis direction, and provides the generated control information to the frame counter correction unit 15.

The frame counter correction unit 15 adjusts the value of the frame counter in accordance with the control information regarding the frame timing provided by the frame position adjustment unit 19, and corrects the frame timing in accordance with the synchronization error.

The frame position adjustment unit 19 can know (the transmission timing of) the subframe containing the primary synchronization channel and the secondary synchronization channel of the downlink signal from the another base station device, based on the synchronization error detected by the synchronization error detection unit 14.

The frame position adjustment unit 19 causes the frame counter correction unit 15 to perform correction such that the timings of the own synchronization signals are offset by a time period of a certain number of subframes from the timings coinciding with the timings of the primary and the secondary synchronization channels of the another base station device, and thereby performs adjustment such that transmission timings of the first subframe #0 and the sixth subframe #5, in the own radio frame, to each of which subframes the primary and the secondary synchronization channels are allocated, coincide with transmission timings of subframes other than the first subframe #0 and the sixth subframe #5, in the radio frame of the downlink signal from the another base station device serving as a synchronization source, to each of which subframes the primary and the secondary synchronization channels are allocated.

Specifically, the frame position adjustment unit 19 causes the frame counter correction unit 15 to perform correction such that the synchronization error detected by the synchronization error detection unit 14 is canceled, and concurrently, the own frame transmission timing is, for example, delayed by one subframe in the time axis direction relative to the frame transmission timing of the another base station device.

Since the synchronization error detection unit 14 has detected the synchronization error based on the primary and the secondary synchronization channels, the own primary and the secondary synchronization channels are corrected to have transmission timings different from those of the primary and the secondary synchronization channels of the another base station device. In addition, the transmission timings of the first subframe #0 and the sixth subframe #5, in the own radio frame, to each of which subframes the primary and the secondary synchronization channels are allocated, are shifted by one subframe relative to the transmission timings of the first subframe #0 or the sixth subframe #5 in the radio frame of the downlink signal from the another base station device, and thus, are corrected so as to coincide with transmission timings of subframes other than the first subframe #0 or the sixth subframe #5 (the second subframe #1 or the seventh subframe #6).

As described above, the frame position adjustment unit 19 and the frame counter correction unit 15 perform inter-base-station synchronization by causing the transmission timing of a subframe, as a transmission timing of the own downlink signal, to coincide with that of another base station device, such that the transmission timings of both synchronization signals in the own downlink signal are different from the transmission timings of both synchronization signals in a downlink signal of the another base station device.

Further, by controlling the frame counter correction unit 15 as described above, the frame position adjustment unit 19 has a function of adjusting the position of the own radio frame in the time axis direction, relative to a radio frame of the downlink signal from the another base station device.

Further, also at the time of activating the own femto BS1b and starting transmission of the own downlink signal, the frame position adjustment unit 19 causes the frame counter correction unit 15 to perform correction such that: the transmission timings of the first subframe #0 and the sixth subframe #5, in the own radio frame, to each of which subframes the primary and the secondary synchronization channels are allocated, coincide with the transmission timings of subframes other than the first subframe #0 or the sixth subframe #5 in a radio frame of the downlink signal from the another base station device serving as a synchronization source, to each of which subframes the primary and the secondary synchronization channels are allocated, whereby the frame position adjustment unit 19 adjusts the position of the own radio frame.

That is, when a downlink signal of the another base station device is received by the downlink signal reception unit 12 at the activation of the own femto BS1b, the frame position adjustment unit 19 adjusts the position of the own radio frame relative to the radio frame of the downlink signal of the another base station device as described above.

Accordingly, the own femto BS1b can transmit the own downlink signal in the radio frame adjusted in accordance with the radio frame of the downlink signal of the another base station device, from the time of activation of the own femto BS1b and of the start of transmission of the own downlink signal.

[1.3.3.3 Function of Frequency Offset Estimation Unit]

The frequency offset estimation unit 16 estimates, based on the synchronization error detected by the detection unit 14, a difference (clock frequency error) between a clock frequency of a clock generator (not shown) included in the base station device as the receiving side and a clock frequency of a clock generator included in the another base station device as the transmitting side, and estimates a carrier frequency error (carrier frequency offset) from the clock frequency error.

Under the situation where over-the-air synchronization is periodically performed, the frequency offset estimation unit 16 estimates a clock error based on a frame synchronization error t1 detected in the last over-the-air synchronization and a frame synchronization error t2 detected in the current over-the-air synchronization. Note that the last frame synchronization error t1 can be obtained from the memory unit 18.

For example, it is assumed that, when the carrier frequency is 2.6 [GHz], a frame synchronization error T1 has been detected at the timing of the last over-the-air synchronization (synchronization timing=t1), and correction of timing by an amount corresponding to T1 has been performed. The synchronization error (timing offset) after the timing correction is 0 [msec]. Then, it is assumed that also at the timing of the current over-the-air synchronization (synchronization timing=t2) performed T=10 seconds later, a synchronization error (timing offset) is detected again, and the synchronization error (timing offset) is T2=0.1 [msec].

At this time, the synchronization error (timing offset) of 0.1 [msec] having occurred during the 10 seconds is an accumulated value of the error between the clock period of the another base station device and the clock period of the own base station device.

That is, the following equation is established between the synchronization error (timing offset) and the clock period.

the clock period of the synchronization source base station: the clock period of the synchronization target base station=T: (T+T2)=10: (10+0.0001)

Since the clock frequency is the reciprocal of the clock period, (the clock frequency of the synchronization source base station—the clock frequency of the synchronization target base station)

=the clock frequency of the synchronization source base station×T2/(T+T2)

≈the clock frequency of the synchronization source base station×0.00001

Accordingly, in this case, there is an error of 0.00001=10 [ppm] between the clock frequency of the another base station device as the transmitting side and the clock frequency of the own base station device as the receiving side. The frequency offset estimation unit 16 estimates a clock frequency error in the above-described manner.

Since the carrier frequency and the synchronization error (timing offset) are shifted in the same manner, an error of an amount corresponding to 10 [ppm], i.e., an error of 2.6 [GHz]×1×10$^{-5}$=26 [kHz], also occurs in the carrier frequency. Thus, the frequency offset estimation unit 16 can also estimate a carrier frequency error (carrier frequency offset) from the clock frequency error.

The carrier frequency error estimated by the frequency offset estimation unit 16 is provided to the frequency correction unit 17.

The frequency correction unit 17 corrects the carrier frequency based on this carrier frequency error. Note that the frequency correction unit 17 can correct not only the carrier frequency of the uplink signal but also the carrier frequency of the downlink signal.

Next, functions of the measurement processing unit 5c will be described.

[1.3.4 Measurement Processing Unit]

The measurement processing unit 5c has a function for performing measurement (measurement process) of a transmission state of a downlink signal, such as the transmission power and the operating frequency of another base station device. The measurement processing unit 5c obtains a downlink signal of the another base station device received by the downlink signal reception unit 12 and determines the reception power of the downlink signal.

The measurement processing unit 5c sets the timing to obtain a downlink signal for performing the measurement process, in units of subframes. Further, by setting and adjusting, based on a detection result from the terminal detection unit 5e, the timing to obtain a downlink signal for performing the measurement process, the measurement processing unit 5c has a function of adjusting the timing to perform the measurement process.

Note that it is preferable that the measurement process is performed immediately after the synchronization process is performed, as described later. Thus, the measurement processing unit 5c sets the timing to perform the measurement process, in accordance with synchronization timing information provided by the synchronization processing unit 5b.

For example, the measurement processing unit 5c specifies, based on the received synchronization timing information, a subframe at which a synchronization process is started, and sets the measurement process to be performed at a subframe belonging to a radio frame subsequent to the radio frame to which the specified subframe belongs.

The measurement processing unit 5c starts the measurement process by causing the transmission unit 13 to suspend transmission of a transmission signal in the subframe section corresponding to the timing (start timing of the measurement process), which is set by the measurement processing unit 5c itself and at which a downlink signal for the measurement process is obtained. While the transmission of the transmission signal is being suspended, the measurement processing unit 5c causes the downlink signal reception unit 12 to receive a downlink signal from another base station device, and obtains the received downlink signal. Then, the measurement processing unit 5c measures the reception power and the like of the downlink signal, and ends the measurement process. Note that the section for which the transmission of the transmission signal is suspended may be set to a subframe corresponding to the timing to obtain the downlink signal and to subsequent one or more subframes.

In addition to the suspension of the transmission of the transmission signal described above, suspension of reception of an uplink signal from a terminal device may be performed.

The measurement processing unit 5c outputs, to the resource allocation control unit 5d, measurement timing information for specifying a subframe corresponding to a section for which transmission of a transmission signal is suspended.

The measurement processing unit 5c determines an average value of the reception power (average power value) for each resource block, based on the downlink signal obtain from the downlink signal reception unit 12.

The measurement processing unit 5c extracts, from the obtained downlink signal, portions assumed to correspond to resource block units, separately from each other in the time axis direction. Further, from each of the extracted portions, the measurement processing unit 5c extracts a portion corresponding to the frequency width of each resource block, and determines the power of the portion of each frequency width as an average power value of the corresponding resource block.

After determining the average power values, the measurement processing unit 5c outputs measurement result information indicating the average power values to the resource allocation control unit 5d, the terminal detection unit 5e, and a power control unit 5f.

The measurement processing unit 5c obtains the downlink signal, which is a signal having been subjected to orthogonal modulation (before being subjected to demodulation) obtained from the downlink signal reception unit 12, and determines the average power value for each resource block from this signal. Thus, the measurement processing unit 5c extracts, from this signal, the portions assumed to correspond to the resource block units, separately from each other in the time axis direction. Therefore, the measurement processing unit 5c needs to recognize the frame timing of the another base station device that is a transmission source of the downlink signal.

Here, if the frame timing synchronization has been achieved between the another base station device and the own base station device, the measurement processing unit 5c can grasp the frame timing of the another base station device, from the frame timing of the own base station device, and thus, the measurement processing unit 5c can accurately estimate the units of resource blocks in the time axis direction and can accurately determine the average power values. For this reason, it is preferable that the measurement process is performed immediately after the synchronization process is performed.

[1.3.5 Terminal Detection Unit]

The terminal detection unit 5e has a function of detecting communication states of MSs 2 connected to the own base station and to another base station device.

More specifically, the terminal detection unit 5e detects the number of MSs 2 that are currently connected to the own base station device and to another base station device.

Note that the MSs 2 connected to the another base station device, the MSs 2 being the detection targets by the terminal detection unit 5e, are MSs 2 which a downlink signal of the own base station device may reach.

The terminal detection unit 5e obtains information of the number of the MSs 2 connected to the own base station device, from an upper layer of the signal processing unit 5.

Meanwhile, the number of the MSs 2 connected to the another base station device is estimated based on the measurement result information from the measurement processing unit 5c.

The measurement process is performed by receiving a downlink signal from another base station device. The another base station device, being located near the own base station device, is a base station device located within a range in which a downlink signal from the own base station device can reach the another base station device and a downlink signal from the another base station device can reach the own base station device. Accordingly, the downlink signal of the own base station device may reach an MS 2 connected to the another base station device.

Therefore, the terminal detection unit 5e can detect an MS 2 which a downlink signal of the own base station device may reach, based on the measurement result information regarding the downlink signal of the another base station device as described above.

The terminal detection unit 5e determines whether MSs 2 are connected to the another base station device, based on the average power values of the respective resource blocks included in the measurement result information, and estimates the number of MSs 2 connected to the another base station device. That is, if the another base station device is communicating with an MS 2 in its own cell, user data directed to the MS 2 is allocated in its transmission signal, and the power corresponding to the portion to which such data is allocated is relatively increased compared to the power corresponding to the portion to which such data is not allocated. Accordingly, the terminal detection unit 5e can determine whether an MS 2 is connected to the another base station device, based on the reception power of the transmission signal.

When it is determined that an MS 2 is connected, it is possible to determine whether user data is allocated to each of the resource blocks. Therefore, the terminal detection unit 5e can estimate the number of MSs 2 connected to the another base station device, based on the allocation state.

[1.3.6 Resource Allocation Control Unit and Power Control Unit]

The resource allocation control unit 5d has a function of allocating, in a physical downlink shared channel in a radio frame, user data to be transmitted to each terminal device 2.

When receiving the synchronization timing information and the measurement timing information from the synchronization processing unit 5b and the measurement control processing unit 5c, respectively, the resource allocation control unit 5d restricts allocation of user data to subframes specified by these pieces of information. Further, when receiving the measurement result information from the measurement processing unit 5c, the resource allocation control unit 5d determines allocation of user data, based on this information.

The power control unit 5f has a function of controlling transmission power of the transmission unit 13 included in the RF unit 4. When receiving average power values of the another base station device determined by the measurement processing unit 5c, the power control unit 5f adjusts the own transmission power based on the average power values, such that the own transmission signal does not interfere with the another base station device and the MSs 2 connected to the another base station device.

1.4 Synchronization Process

Figure 7:
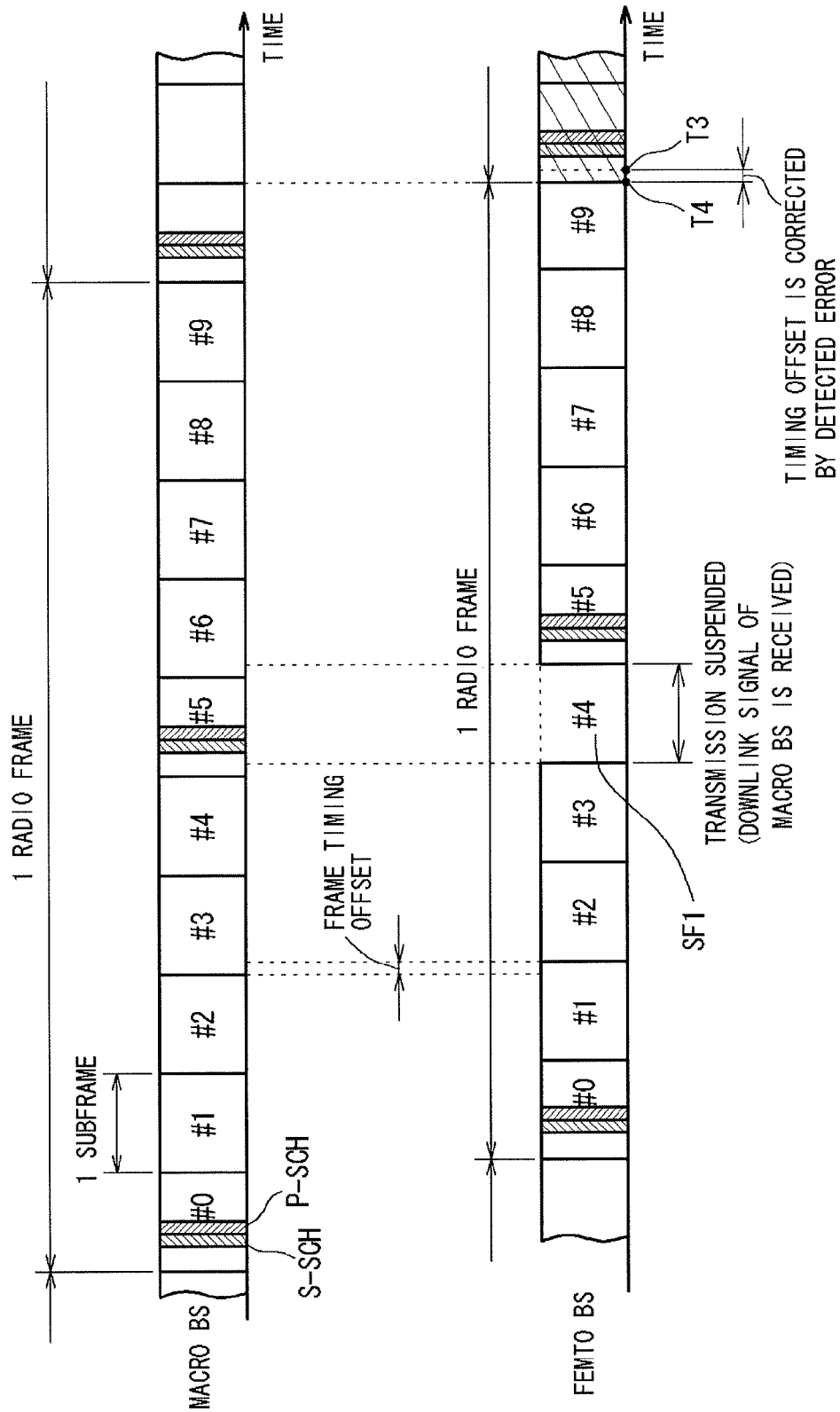
FIG. 7 is a diagram for explaining an example of a synchronization process performed by a synchronization processing unit.

FIG. 7 is a diagram for explaining an example of a synchronization process performed by the synchronization processing unit. FIG. 7 shows a frame transmitted by a macro BS1a serving as another base station device and a frame transmitted by a femto BS serving as the own base station device on the same time axis, and shows an example in which the femto BS1b performs synchronization based on a downlink signal from the macro BS1a serving as a synchronization source.

FIG. 7 shows a state in which an offset in the frame transmission timings has occurred: that is, in each section before a timing T4, the transmission timing of the radio frame of the femto BS1*b* is shifted in the time axis direction by substantially one subframe being delayed relative to the corresponding transmission timing of the radio frame of the macro BS1*a*, and a timing offset has occurred between the beginning of each subframe of the femto BS1*b* and the beginning of a corresponding subframe of the macro BS1*a*.

As described above, the synchronization processing unit 5*b* of the femto BS1*b* of the present embodiment has a function of adjusting the position of the own radio frame when receiving, at the time of activation of the femto BS1*b*, a downlink signal of a macro BS1*a* serving as another base station device, such that: the transmission timings of the first subframe #0 and the sixth subframe #5, in the own radio frame, to each of which subframes the primary and the secondary synchronization channels are allocated, coincide with the transmission timings of subframes other than the first subframe #0 or the sixth subframe #5, in the radio frame of the downlink signal from the another base station device serving as a synchronization source, to each of which subframes the primary and the secondary synchronization channels are allocated.

For example, it is assumed that at the time of activation of the femto BS1*b*, the synchronization processing unit 5*b* has adjusted the position of the own radio frame to be delayed by one subframe, such that the transmission timing of the own radio frame (transmission timing of the first subframe #0) coincides with the transmission timing of the second subframe #1 of the macro BS1*a* which is the another base station device serving as the synchronization source.

Further, also in the synchronization process performed between the base stations as appropriate thereafter, the synchronization processing unit 5*b* performs the synchronization process such that the transmission timing of the own radio frame (transmission timing of the first subframe #0) coincides with the transmission timing of the second subframe #1 of the macro BS1*a* serving as the another base station device.

In this manner, as shown in FIG. 7, the transmission timings of the primary and the secondary synchronization channels in the downlink signal in the own base station device is caused to be different from the transmission timings of the primary and the secondary synchronization channels in the downlink signal of the another base station device, and the transmission timing of the radio frame of the femto BS1*b* is shifted in the time axis direction by substantially one subframe relative to the transmission timing of the corresponding radio frame of the macro BS1*a*.

Here, in a case where the synchronization processing unit 5*b* of the femto BS1*b* has set, to a subframe SF1, a timing to obtain a downlink signal for performing the synchronization process, the synchronization processing unit 5*b* outputs synchronization timing information containing information for specifying the subframe SF1 to the resource allocation control unit 5*d* and the measurement processing unit 5*c*. Note that the example in the drawing shows a case where the section during which transmission of a transmission signal is suspended is set to only the section of the subframe SF1 which corresponds to the timing at which the synchronization process is started.

When the radio frame is transmitted, the synchronization processing unit 5*b* causes, at the transmission timing corresponding to the subframe SF1, the transmission unit 13 to suspend transmission of the transmission signal and the downlink signal reception unit 12 to receive a downlink signal of the macro BS1*a*, and obtains the received downlink signal.

Then, the synchronization processing unit 5*b* detects the frame transmission timing of the macro BS1*a*, using the primary synchronization channel and the secondary synchronization channel contained in the received downlink signal of the macro BS1*a*, and detects a frame synchronization error between the own frame transmission timing and the frame transmission timing of the macro BS1*a*.

Note that the synchronization processing unit 5*b* can grasp, from synchronization errors obtained at previous synchronization processes accumulated in the memory unit 18, the transmission timing of the subframe (#0 or #5) containing the primary synchronization channel and the secondary synchronization channel in the downlink signal of the macro BS1*a* serving as the another base station device. Accordingly, the synchronization processing unit 5*b* can set the transmission signal so as to be suspended in the section of the own subframe that corresponds to that transmission timing.

Meanwhile, the resource allocation control unit 5*d*, provided with the synchronization timing information, restricts allocation of user data of the terminal device 2 to the section of the subframe SF1. Accordingly, even if the terminal device 2 connected to the femto BS1*b* cannot communicate with the femto BS1*b* as a result of the transmission suspension of the transmission signal in this section, the terminal device 2 does not scan a base station in vain or determine that some abnormality has occurred, and thus can maintain smooth communication.

Based on the detected frame synchronization error, the synchronization processing unit 5*b* achieves synchronization by correcting the timing of the beginning of a radio frame subsequent to the radio frame to which the subframe SF1 belongs. For example, if it is assumed that the beginning of the radio frame before synchronization is performed is the timing T3, the synchronization processing unit 5*b* corrects the value of the frame counter such that the beginning of the radio frame coincides with the timing T4, which is a timing shifted from the timing T3 by an amount of the above error. Accordingly, it is possible to cause the frame timing of the own femto BS to coincide with the frame timing of the macro BS1*a*, whereby synchronization can be achieved.

Note that, since the timing of the radio frame of the femto BS1*b* is already delayed by one subframe relative to that of the corresponding radio frame of the macro BS1*a* in the above case, the synchronization processing unit 5*b* achieves synchronization with reference to the current frame position.

Although only the synchronization of the frame timing has been described in the above, correction of the carrier frequency is also performed in a similar manner.

In the above configuration, the synchronization processing unit 5*b* performs inter-base-station synchronization by adjusting the own downlink signal, such that: the transmission timings of the first subframe #0 and the sixth subframe #5 in the own downlink signal, which subframes each contain the primary and the secondary synchronization channels, coincide with the transmission timings of subframes (#1 and #6), in the downlink signal of the another base station device, other than the subframes containing the primary and the secondary synchronization channels. Therefore, the synchronization processing unit 5*b* can cause the transmission timings of the primary and the secondary synchronization channels in the own downlink signal to be different from the transmission timings of those signals in the downlink signal of the another base station device, and can cause transmission of a subframe other than subframes containing the primary and the secondary synchronization channels to be suspended in the own downlink signal and can obtain the primary and the secondary synchronization channels contained in the downlink signal from the another base station device. As a result, the synchronization processing unit 5b can obtain the primary and the secondary synchronization channels of the another base station device, without suspending transmission of the primary and the secondary synchronization channels to an MS 2 connected to the own base station device, and thus can perform inter-base-station synchronization while suppressing influence on the communication performed by the MS 2 connected to the own base station device.

Moreover, as shown in FIG. 3, in the own downlink signal, a physical broadcast channel (PBCH) is allocated to a subframe containing the primary and the secondary synchronization channels. Thus, in the present embodiment, it is possible to obtain the primary and the secondary synchronization channels of the another base station device, also without suspending transmission of this physical broadcast channel to the MS 2 connected to the own base station device. Accordingly, according to the femto BS1b of the present embodiment, it is possible to perform the inter-base-station synchronization, while suppressing influence on the MS 2 caused by suspending transmission of the physical broadcast channel.

In the present embodiment, the adjustment width of the position of the own radio frame relative to that of the radio frame of the downlink signal of the another base station device is set by the synchronization processing unit 5b. For example, at the activation of the own base station device, the adjustment width can be set to the least correction amount of the frame counter values that allows the transmission timings of the first subframe #0 and the sixth subframe #5 in the own downlink signal to coincide with those of subframes not containing the primary and the secondary synchronization channels in the downlink signal of the another base station device.

The synchronization processing unit 5b provides the resource allocation control unit 5d with information indicating the set adjustment width for the position of the radio frame. In a case where the own base station device and the another base station device perform cooperative transmission, the resource allocation control unit 5d allocates resources such that the transmission timing of data regarding to the cooperative transmission coincides with that of the another base station device, in accordance with the set adjustment width for the position of the radio frame.

1.5 Measurement Process

Figure 8:
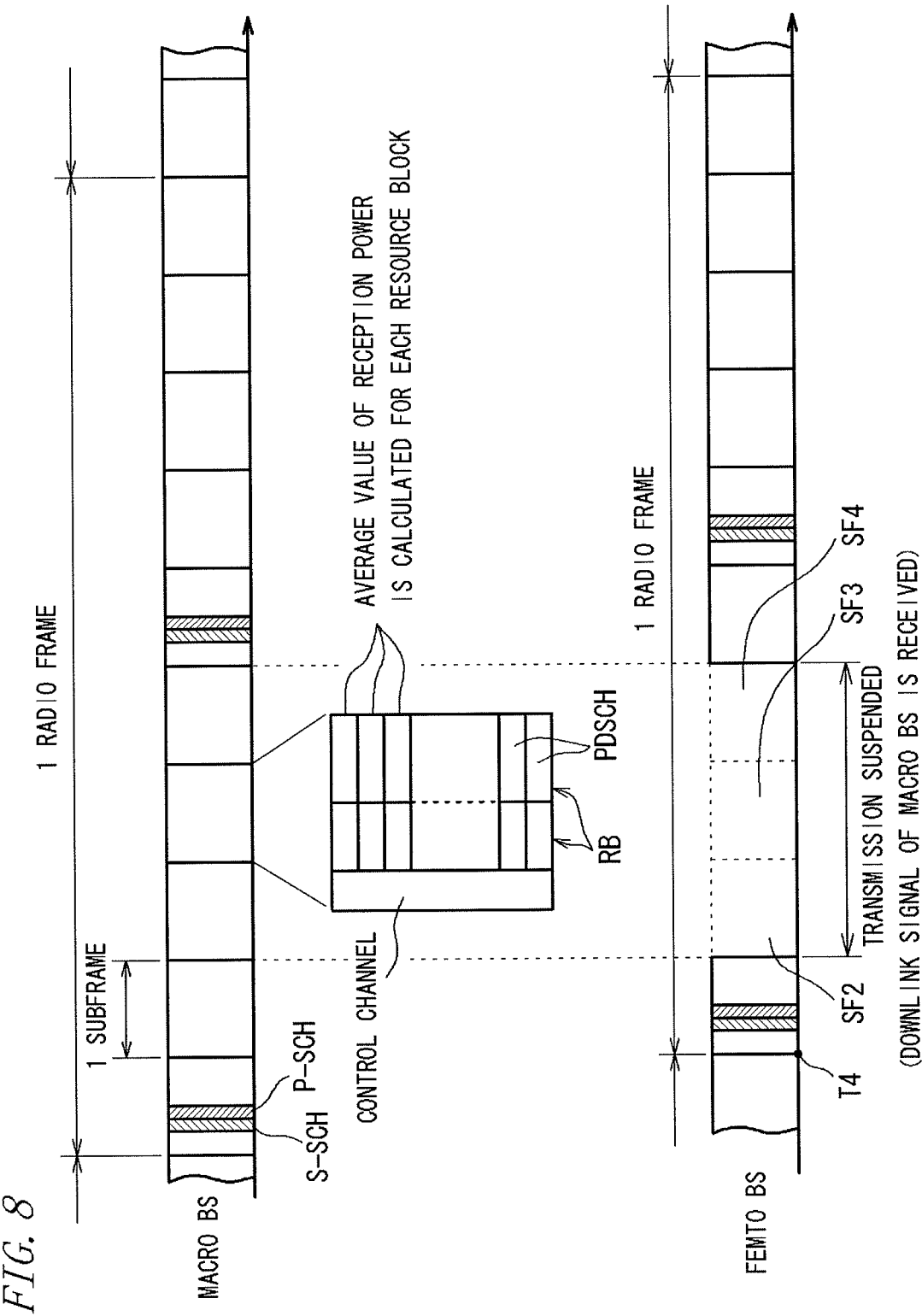
FIG. 8 is a diagram for explaining an example of a measurement process performed by a measurement processing unit.

FIG. 8 is a diagram for explaining an example of the measurement process performed by the measurement processing unit 5c. FIG. 8 shows a frame transmitted by a macro BS1a serving as another base station device and a frame transmitted by a femto BS1b serving as the own base station device on the same time axis, and shows an example in which the femto BS1b performs the measurement process based on the downlink signal of the macro BS1a.

The measurement processing unit 5c can specify a subframe that corresponds to the timing at which the synchronization processing unit 5b starts the synchronization process, based on the synchronization timing information provided by the synchronization processing unit 5b.

The measurement processing unit 5c performs setting such that the measurement process is performed in a radio frame subsequent to the radio frame to which the specified subframe corresponding to the synchronization process start timing belongs. That is, as shown in FIG. 8, the measurement process is performed in a radio frame located immediately after the radio frame where the synchronization has been achieved at the timing T4.

The measurement processing unit 5c sets the start timing of the measurement process to a subframe SF2 in FIG. 8. Then, the measurement processing unit 5c outputs, to the resource allocation control unit 5d, measurement timing information containing information for specifying a subframe that corresponds to a section during which transmission of a transmission signal is to be suspended for performing the measurement process.

In the present embodiment, the measurement processing unit 5c sets the section during which the transmission of the transmission signal is to be suspended for performing the measurement process, to three subframes, that is, the subframe corresponding to the start timing and two subframes that follow the subframe. Accordingly, as shown in FIG. 8, the measurement processing unit 5c causes the transmission unit 13 to suspend transmission of the transmission signal for the section of the subframes SF2, SF3, and SF4.

Thus, the measurement processing unit 5c outputs, to the resource allocation control unit 5d, the measurement timing information containing information for specifying these subframes SF2 to SF4.

When the radio frame is transmitted, the measurement processing unit 5c causes, at the transmission timings corresponding to the subframes SF2 to SF4, the transmission unit 13 to suspend transmission of the transmission signal and the downlink signal reception unit 12 to receive a downlink signal of the macro BS1a, and obtains the received downlink signal.

Then, the measurement processing unit 5c determines the average power value for each resource block, based on the obtained downlink signal.

Figure 9:
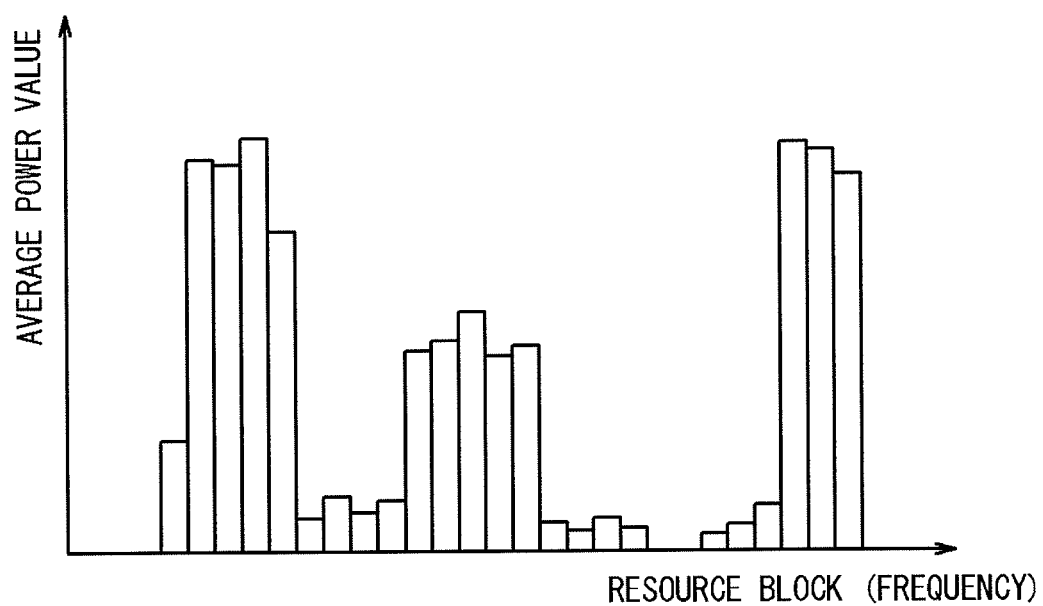
FIG. 9 is a diagram showing an example of a result of determination of an average power value for each resource block obtained by a measurement processing unit 5c.

FIG. 9 is a diagram showing an example of a result of determination of the average power value for each resource block obtained by the measurement processing unit 5c. In FIG. 9, the horizontal axis represents the resource blocks arranged in the frequency direction, and the vertical axis represents the average power value.

As shown in FIG. 9, some resource blocks have high average power values and other resource blocks have low average power values, and it is indicated that user data is allocated to the resource blocks having high average power values.

Based on the obtained downlink signal, the measurement processing unit 5c determines data as shown in FIG. 9 for each time period assumed to correspond to a resource block width in the symbol direction, and obtains an average power value for each resource block contained in the obtained downlink signal.

Meanwhile, the resource allocation control unit 5d, provided with the measurement timing information, restricts allocation of user data of the terminal device 2 to the section corresponding to the subframes SF2 to SF4. Therefore, even if the terminal device 2 cannot communicate with the femto BS1b as a result of the transmission suspension of the transmission signal in this section, the terminal device 2 can maintain smooth communication as in the case of the synchronization process.

After determining the average power value for each resource block, the measurement processing unit 5c outputs measurement result information containing these values to the resource allocation control unit 5d, the terminal detection unit 5e, and the power control unit 5f.

The resource allocation control unit 5d and the power control unit 5f which have been provided with the measurement result information perform, based on the measurement result information, respective processes so as to suppress occurrence of interference with the another base station device suppress.

Specifically, the measurement result information contains the average power value for each resource block in the downlink signal from the another base station device, and thus allows recognition of the main frequency band currently used in the communication with MSs 2 by the another base station device.

For example, as shown in FIG. 9, since user data to an MS 2 is not allocated in a frequency band in which a low average power value appears, it is possible to assume that this frequency band is not currently used by the another base station device.

The resource allocation control unit 5d allocates the own user data so as to preferentially use the frequency band that is assumed not to be used by the another base station device. Accordingly, it is possible to prevent as much as possible, the frequency band used by the own base station device from overlapping the frequency band used by the another base station device, and it is possible to suppress occurrence of interference with the another base station device and with an MS 2 connected to the another base station device.

Moreover, the power control unit 5f estimates the transmission power of the another base station device based on the average power values obtained from the measurement result information, and adjusts the own transmission power based on the transmission power of the another base station device. For example, the power control unit 5f adjusts the own transmission power so as to be reduced, when determining that the own transmission power is relatively greater than the transmission power of the another base station device and that interference will occur.

1.6 Timings of Synchronization Process and Measurement Process

Figure 10:
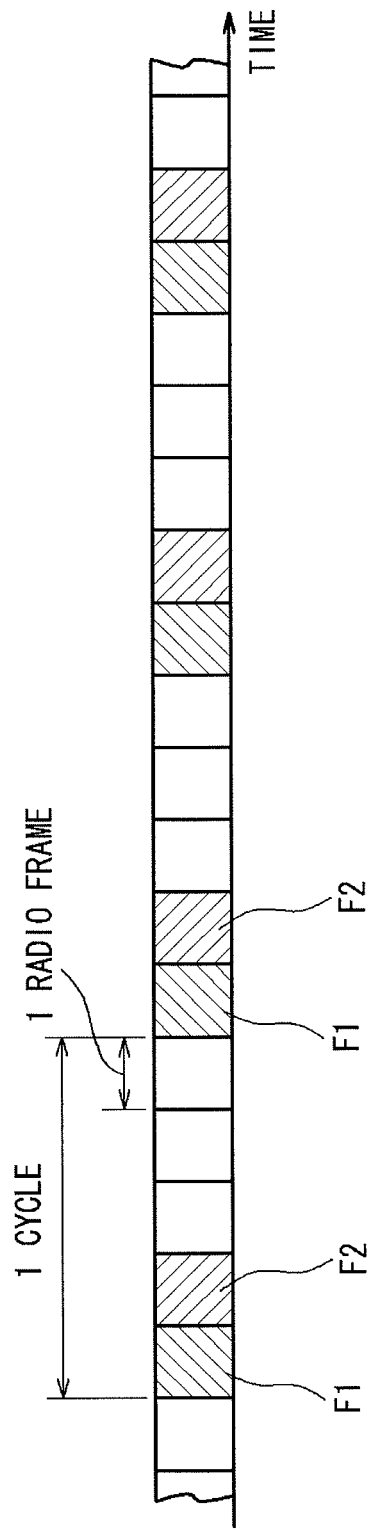
FIG. 10 is a diagram showing timings at which a synchronization process and a measurement process are performed.

FIG. 10 is a diagram showing timings at which the synchronization process and the measurement process are performed. FIG. 10 shows, among a plurality of radio frames arranged in the time axis direction, arrangement of radio frames F1 which each contain a subframe in which the synchronization process is performed and radio frames F2 which each contain a subframe in which the measurement process is performed.

In the present embodiment, the synchronization processing unit 5b sets the timing to perform the synchronization process such that the synchronization process is performed in a constant cycle. Moreover, the measurement processing unit 5c performs setting such that the measurement process is performed in a subframe contained in a radio frame F2 subsequent to a radio frame F1 in which the synchronization processing unit 5b performs the synchronization process.

FIG. 10 shows a case where the synchronization process is set to be performed in a cycle corresponding to five radio frames.

The synchronization processing unit 5b adjusts the timing to perform the synchronization process by adjusting the cycle of the synchronization process start timing in accordance with a detection result by the terminal detection unit 5e.

The terminal detection unit 5e estimates the number of MSs 2 connected to the another base station device, based on measurement result information obtained in the measurement process performed in a radio frame F2 before the synchronization process is performed. The terminal detection unit 5e obtains, from an upper layer, information about the number of MSs 2 connected to the own base station device, during a time period after the measurement process has been performed and before a frame in which the next synchronization process is performed.

The terminal detection unit 5e provides the synchronization processing unit 5b with information of the estimated number of MSs 2 connected to the another base station device and the number of MSs 2 connected to the own base station device, as a detection result.

The synchronization processing unit 5b, provided with these pieces of information, adjusts the cycle of the synchronization process start timing, in accordance with the estimated number of MSs 2 connected to the another base station device and the number of MSs 2 connected to the own base station device. Moreover, after the synchronization processing unit 5b has adjusted the cycle of the synchronization process, the measurement processing unit 5c sets the cycle of the measurement process in accordance with the cycle of the synchronization process.

In the present embodiment, an exemplary case has been described in which the measurement processing unit 5c sets the cycle of the measurement process in accordance with the cycle of the synchronization process adjusted by the synchronization processing unit 5b. However, regardless of the cycle of the synchronization process, the measurement processing unit 5c may autonomously set the timing to perform the measurement process, as necessary. Note that, in this case, the measurement processing unit 5c sets the timing to perform the measurement process, based on a detection result by the terminal detection unit 5e, as in the case of the synchronization processing unit 5b.

1.7 Modification of the First Embodiment

Figure 11:
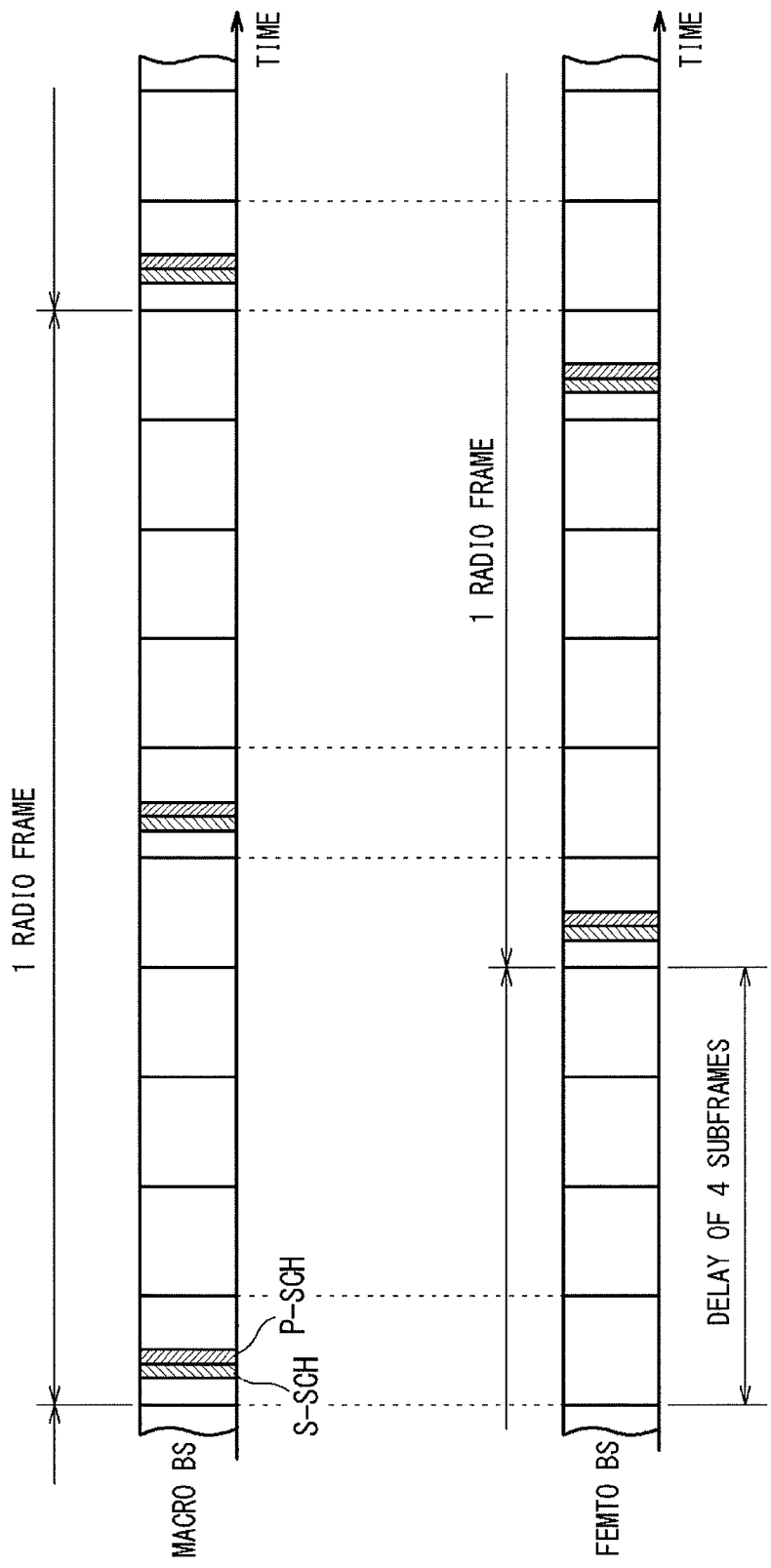
FIG. 11 is a diagram showing another example of inter-base-station synchronization performed between a macro base station device and a femto base station device.

In the above embodiment, an exemplary case has been described in which the position of the own radio frame is adjusted so as to be delayed by one subframe relative to that of the another base station device. However, as shown in FIG. 11, for example, it is possible to cause the synchronization processing unit 5b to perform adjustment such that the position of the own radio frame is delayed by four subframes, relative to that of a macro BS serving as another base station device.

As shown in FIG. 3, there are four subframes between the first subframe #0 and the sixth subframe #5 to each of which the primary and the secondary synchronization channels are allocated. Therefore, in order to cause the timings of the first subframe #0 and the sixth subframe #5 in the own radio frame to coincide with the timings of subframes other than the first subframe #0 or the sixth subframe #5 in the radio frame of the another base station device, those timings of the own radio frame can be delayed within a range of one to four subframes. Alternatively, the position of the own radio frame may be advanced within a range of one to four subframes.

In the above embodiment, a subframe is used as a basic communication unit having a certain time length, which serves as a target of the synchronization process. However, another unit forming a downlink signal, such as a radio frame, a section defined by resource blocks, or a section defined by predetermined symbols, may be used as the basic communication unit.

In the above embodiment, an exemplary case has been described in which the synchronization process is performed periodically. However, the timing of the synchronization process may be set in accordance with a detection result by the terminal detection unit 5e each time the detection result is obtained.

Moreover, in the above embodiment, an exemplary case has been described in which the synchronization processing unit 5b sets the cycle of the synchronization process in accordance with the number of MSs 2 connected to the own base station device and the another base station device. However, the synchronization processing unit 5b may set the cycle in accordance only with the number of MSs 2 connected to the own base station device, or only with the number of MSs 2 connected to the another base station device. Further, taking into consideration only the total number of MSs 2 connected to the own and the another base station devices, the synchronization processing unit 5b may set the cycle of the synchronization process in accordance with the total number.

According to the above embodiment, in the synchronization process, a synchronization offset is corrected at the beginning of a radio frame located immediately after the radio frame in which transmission of a transmission signal has been suspended to receive a downlink signal of another base station device. However, for example, the synchronization offset may be corrected at the beginning of a subframe other than the beginning of a radio frame. Moreover, in the synchronization process and the measurement process, the section during which the transmission signal is suspended may be set as necessary.

2. Second Embodiment

Figure 12:
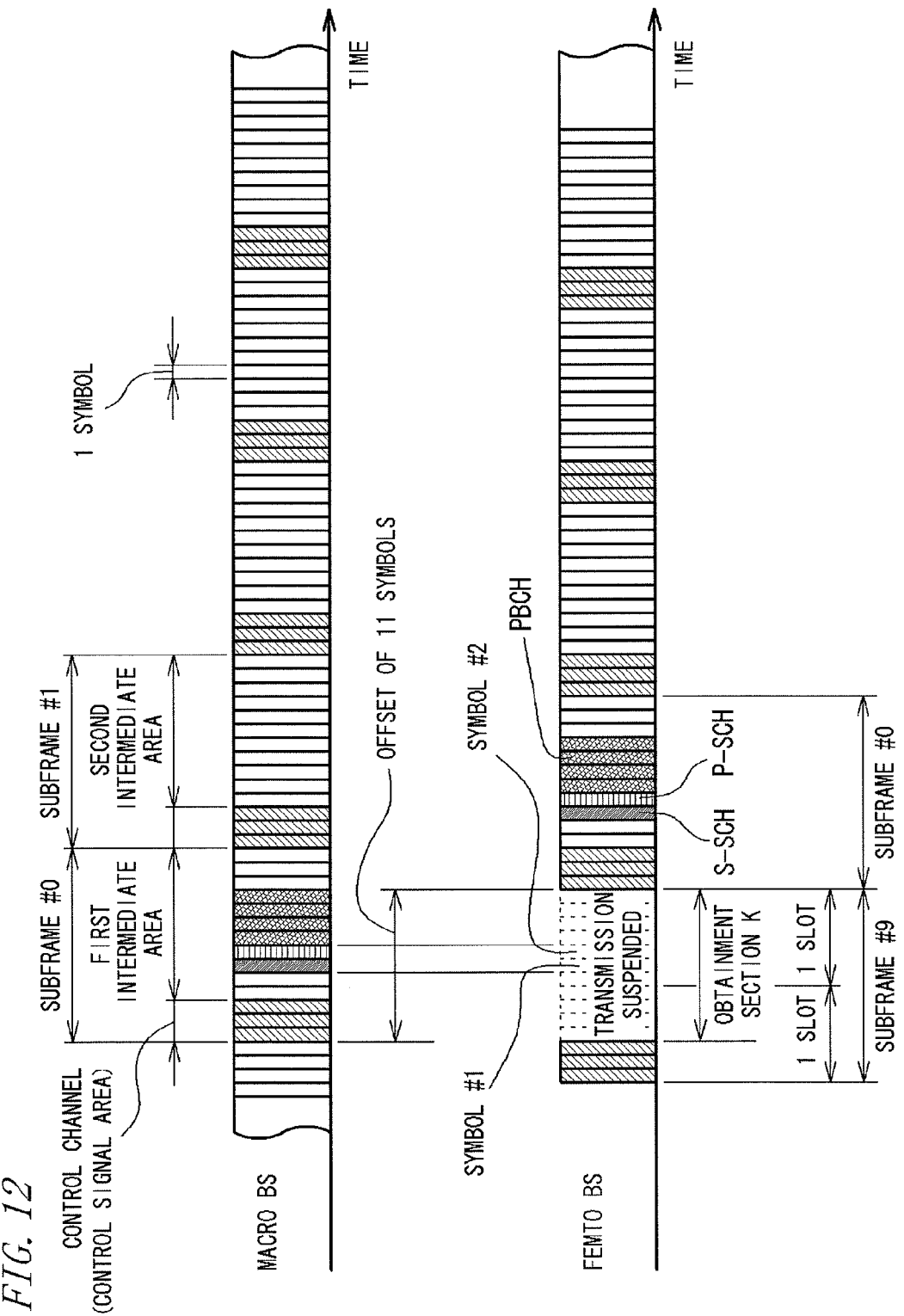
FIG. 12 is a diagram for explaining an example of a synchronization process according to a second embodiment.

FIG. 12 is a diagram for explaining an example of a synchronization process according to a second embodiment. FIG. 12 shows, in units of modulation symbols, a radio frame transmitted by a macro BS1a serving as another base station device, and a radio frame transmitted by a femto BS1b serving as the own base station device on the same time axis.

The present embodiment is different from the first embodiment in that when performing a synchronization process with another base station device, the synchronization processing unit 5b sets an obtainment section that corresponds to the timing to receive and obtain a downlink signal of the another base station device, in units of modulation symbols, and in that the synchronization processing unit 5b performs inter-base-station synchronization by causing the transmission timing of the own downlink signal to coincide with that of the another base station device, in units of modulation symbols.

More specifically, the frame position adjustment unit 19 of the synchronization processing unit 5b adjusts the own radio frame to achieve synchronization such that: the timings of the own synchronization signals are offset, by a time period corresponding to a predetermined number of symbols, from the timings at which the timings of the own synchronization signals coincide with the timings of the primary and the secondary synchronization channels of the another base station device, whereby the transmission timings of the synchronization signals of the own base station device are different from the transmission timings of the synchronization signals of the another base station device; and then the transmission timings of the own modulation symbols (hereinafter also referred to simply as symbols) coincide with the transmission timings of modulation symbols of the another base station device.

FIG. 12 shows a state in which the transmission timing (the beginning) of a radio frame of the femto BS1b is delayed by eleven symbols from that of the macro BS1a.

As described above, a radio frame of the base station device 1 consists of ten subframes, and each subframe consists of two slots which each consist of seven symbols and thus, each subframe consists of fourteen symbols.

As shown in FIG. 12 and FIG. 3, a control channel is allocated to three symbols, at the maximum, at the beginning of each subframe, and user data is mainly allocated to the area thereafter.

As described above, the control channel is used for transmission of a control signal containing information necessary for controlling communication with an MS 2, such as DL control information and resource allocation information of the subframe (for example, PDCCH: physical downlink control channel, PCFICH: physical control format indicator channel, and PHICH: physical hybrid-ARQ indicator channel).

Note that the control signal for controlling communication transmitted in the control channel, the primary and the secondary synchronization channels described above, and a reference signal, which is a known signal used by an MS 2 to estimate transmission path characteristics of a downlink signal from a base station device, constitute a specification signal used for controlling communication with an MS 2.

The control channels are arranged continually in the time axis direction with an interval of a predetermined number of symbols (area to which user data is mainly allocated) therebetween, are each composed of communication unit areas (symbols) containing control signals used for communication control, and form respective control signal areas arranged in the time axis direction with a predetermined interval therebetween.

As shown in FIG. 12, the area to which user data is mainly allocated forms an intermediate area composed of a plurality of communication unit areas located between adjacent control channels arranged in the time axis direction. Hereinafter, this area may be referred to as an intermediate area.

The intermediate area includes a first intermediate area containing the primary and the secondary synchronization channels and a second intermediate area not containing the primary and the secondary synchronization channels. That is, the intermediate areas belonging to the first subframe #0 (FIG. 3) and the sixth subframe #5 (FIG. 3), respectively, each include symbols containing the primary and the secondary synchronization channels, and thus, are the first intermediate areas. On the other hand, the intermediate areas belonging to subframes other than the first subframe #0 and the sixth subframe #5 do not contain the primary and the secondary synchronization channels, and thus, are the second intermediate areas.

The synchronization processing unit 5b of the present embodiment has a function of adjusting the timing of the own radio frame (position in the time axis direction) when receiving, at the time of activation of the femto BS1b and the time of synchronization process, a downlink signal of a macro BS1a serving as another base station device, such that: the transmission timings of the primary and the secondary synchronization channels in the radio frame of the downlink signal from the macro BS1a serving as the synchronization source is located within the range of a second intermediate area, in the own radio frame, which does not contain the primary and the secondary synchronization channels.

More specifically, the synchronization processing unit 5b adjusts the timing of the own radio frame such that the transmission timings of the primary and the secondary synchronization channels in the radio frame of the downlink signal from the macro BS1a are located substantially in the middle of a second intermediate area in the own radio frame.

By adjusting in this manner, the synchronization processing unit 5b can cause the transmission timings of the primary and the secondary synchronization channels in the own downlink signal to be different from the transmission timings of the primary and the secondary synchronization channels in the downlink signal of the another base station device.

For example, it is assumed that at the time of activation of the femto BS1b, the synchronization processing unit 5b has adjusted the timing of the own radio frame such that the transmission timings of the primary and the secondary synchronization channels of the macro BS1a which is the another base station device serving as the synchronization source are located substantially in the middle of a second intermediate area belonging to the tenth subframe #9 of the own radio frame.

More specifically, as shown in FIG. 12, it is assumed that the synchronization processing unit 5b has adjusted the timing of the own radio frame, by causing the transmission timings of the second symbol #1 and the third symbol #2 in the rear-side slot of the own tenth subframe #9 to coincide with the transmission timings of (the symbols containing) the primary and the secondary synchronization channels of the macro BS1a, respectively, thereby locating the transmission timings of the primary and the secondary synchronization channels of the macro BS1a substantially in the middle of the second intermediate area of the own radio frame.

Further, also in the synchronization process performed between the base stations as appropriate thereafter, the synchronization processing unit 5b performs the synchronization process such that the transmission timings of the above described symbols in the tenth subframe #9 of the own radio frame coincide with the transmission timings of the primary and the secondary synchronization channels of the macro BS1a serving as the another base station device.

In this manner, as shown in FIG. 12, the relationship between the radio frame of the macro BS1a and the radio frame of the femto BS becomes the relationship in which the transmission timing of the radio frame of the femto BS1b is delayed by eleven symbols from that of the macro BS1a. Thus, the transmission timings of the primary and the secondary synchronization channels in the own downlink signal are caused to be different from the transmission timings of the primary and the secondary synchronization channels in the downlink signal of the another base station device.

In a case where the synchronization processing unit 5b of the femto BS1b has set an obtainment section K in which a downlink signal of a macro BS1a is obtained for performing the synchronization process, to the whole of a second intermediate area that belongs to the tenth subframe #9 of the own radio frame and that overlaps the transmission timings of the primary and the secondary synchronization channels of the macro BS1a, the synchronization processing unit 5b outputs synchronization timing information containing information for specifying the obtainment section K, to the resource allocation control unit 5d and the measurement processing unit 5c for subsequent processing such as restriction of resource allocation to an MS 2.

In this manner, the synchronization processing unit 5b of the present embodiment sets the timing to obtain the downlink signal for the synchronization process, not in units of subframes but in units of symbols.

At the beginning of the obtainment section K, the synchronization processing unit 5b causes the transmission unit 13 to suspend transmission of the transmission signal and the downlink signal reception unit 12 to receive a downlink signal of the macro BS1a, and obtains the received downlink signal. Then, at the end of the obtainment section K, the synchronization processing unit 5b causes the downlink signal reception unit 12 to end the reception and causes the transmission unit 13 to start transmission of the downlink signal.

The synchronization processing unit 5b detects the frame transmission timing of the macro BS1a by using the primary synchronization channel and the secondary synchronization channel contained in the obtained downlink signal of the macro BS1a, and detects a frame synchronization error between the frame transmission timing of the macro BS1a and the own frame transmission timing.

Then, the synchronization processing unit 5b achieves synchronization by correcting the timing of the beginning of the subsequent radio frame, based on the detected synchronization error.

According to the femto BS1b having the above configuration, the synchronization processing unit 5b performs inter-base-station synchronization by adjusting the position in the time axis direction of the own downlink signal such that the transmission timings of the primary and the secondary synchronization channels in the downlink signal of the macro BS1a are located within the range of a second intermediate area in the own downlink signal, whereby the femto BS1b can reliably cause the transmission timings of the primary and the secondary synchronization channels in the own downlink signal to be different from the transmission timings of those signals in the downlink signal of the macro BS1a. As a result, the femto BS1b can suspend transmission of the obtainment section K (second intermediate area) not containing the primary and the secondary synchronization channels in the own downlink signal and obtain the primary and the secondary synchronization channels of the macro BS1a, and thus, can obtain the primary and the secondary synchronization channels of the macro BS1a, without suspending transmission of the primary and the secondary synchronization channels to an MS 2 connected to the own base station device.

Moreover, since the synchronization processing unit 5b sets the obtainment section K to a second intermediate area which is an area other than the control channel, the synchronization processing unit 5b can obtain the primary and the secondary synchronization channels of the macro BS1a without suspending transmission of the control signal to an MS 2 connected to the own base station device, and thus, can perform inter-base-station synchronization while suppressing an influence on communication by the MS 2.

As described above, according to the present embodiment, it is possible to obtain the primary and the secondary synchronization channels of the macro BS1a without suspending transmission of the control signal to the MS 2 connected to the own base station device and the primary and the secondary synchronization channels.

Moreover, as shown in FIG. 12, in the own downlink signal, a physical broadcast channel (PBCH) is allocated to the first intermediate area. In the present embodiment, it is possible to obtain the primary and the secondary synchronization channels of the another base station device, also without suspending transmission of this physical broadcast channel to an MS 2 connected to the own base station device. Therefore, according to the femto BS1b of the present embodiment, it is possible to perform the inter-base-station synchronization while suppressing influence on the MS 2 caused by suspending transmission of the physical broadcast channel.

The femto BS1b needs to suspend transmission of the own downlink signal at the beginning of the obtainment section K and to start reception of a downlink signal of a macro BS1a in order to obtain the primary and the secondary synchronization channels of the macro BS1a, and further needs to stop the reception at the end of the obtainment section K and to start transmission of the own downlink signal again. Thus, it is necessary to perform switching between the reception and the transmission before and after the reception of the primary and the secondary synchronization channels, within a relatively short time period of the obtainment section K (second intermediate area).

In this regard, in the present embodiment, the synchronization processing unit 5b adjusts the timing of the own radio frame such that the transmission timings of the primary and the secondary synchronization channels in the radio frame of the downlink signal of the macro BS1a are located substantially in the middle of the obtainment section K (second intermediate area) in the own radio frame. Accordingly, it is possible to secure a time margin before and after the timings at which the primary and the secondary synchronization channels of the macro BS1a are received.

That is, the synchronization processing unit 5b adjusts the positions in the time axis direction of the obtainment section K and the own downlink signal such that: a time period is secured that is necessary for processing for obtainment of the downlink signal from the macro BS1a, such as the reception/ transmission switching before and after the transmission timings of the primary and the secondary synchronization channels of the macro BS1a.

As a result, it is possible to secure a time margin before and after the timings at which the primary and the secondary synchronization channels of the macro BS1a are received. Thus, it is possible to reliably obtain the primary and the secondary synchronization channels of the macro BS1a even when the reception/transmission switching is performed before and after the reception of the primary and the secondary synchronization channels.

For example, when compared with a case where inter-base-station synchronization is performed with the transmission timings of subframes coincide with each other, it is possible, in the present embodiment, to secure a longer time period that can be used for performing the above processing.

Figure 13:
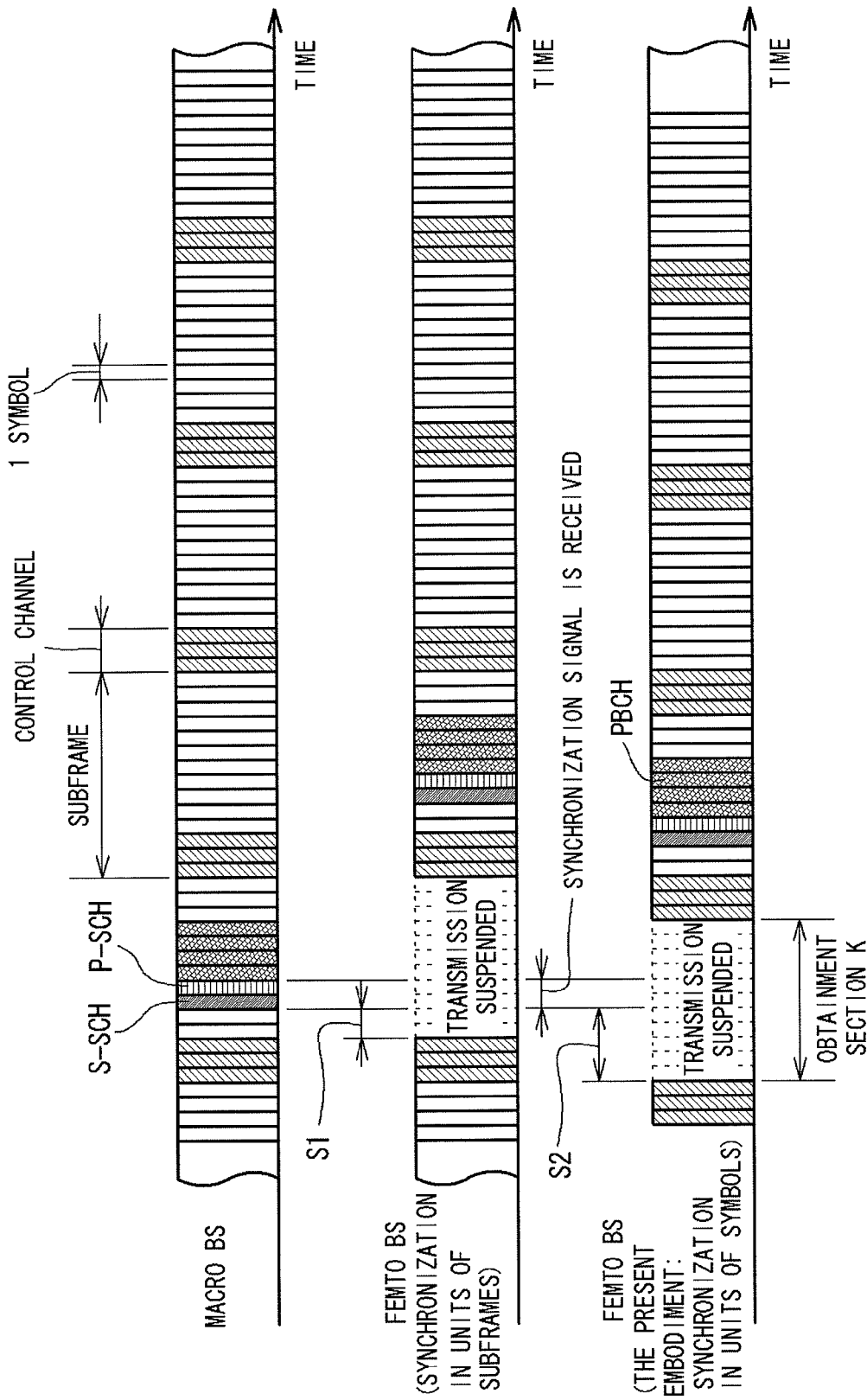
FIG. 13 is a diagram showing an example of a result of comparison of the length of a time period from suspension of transmission of a downlink signal till start of reception of the primary and the secondary synchronization channels of a macro base station device performed by a femto base station device in the present embodiment, with that when inter-base-station synchronization is performed in units of subframes.

FIG. 13 is a diagram showing an example of a result of comparison of the length of the time period from suspension of transmission of the downlink signal till start of reception of the primary and the secondary synchronization channels of a macro BS1a performed by a femto BS1b in the present embodiment, with that when inter-base-station synchronization is performed in units of subframes. Note that FIG. 13 shows a case where the obtainment section K is set in the same manner as in FIG. 12.

As shown in FIG. 13, since the femto BS1b suspends transmission of the own downlink signal after transmitting the control channel, when inter-base-station synchronization is performed in units of subframes, a time period S1 from the timing of the transmission suspension till the timing to start the reception of the primary and the secondary synchronization channels of the downlink signal of the macro BS1a corresponds to two symbols.

On the other hand, the femto BS of the present embodiment performs inter-base-station synchronization by adjusting the timing of the own radio frame such that the transmission timings of the primary and the secondary synchronization channels of the downlink signal of the macro BS1a are located substantially in the middle of the obtainment section K in the own radio frame. Therefore, even when the femto BS1b suspends transmission of the own downlink signal after transmitting the control channel, it is possible, as shown in FIG. 13, to secure a time period S2 from the timing of the transmission suspension till the timing to start the reception of the primary and the secondary synchronization channels of the downlink signal of the macro BS1a, by five symbols.

As described above, when compared with a case where inter-base-station synchronization is performed with transmission timings of subframes coincide with each other, the femto BS1b of the present embodiment can secure a longer time period from the suspension of the transmission of the downlink signal till the start of the reception of the primary and the secondary synchronization channels of the downlink signal of the macro BS, and thus, can secure a longer time period that can be used for processing for obtaining the downlink signal from the macro BS1a, such as the reception/ transmission switching.

In FIG. 12, a case has been described in which the obtainment section K during which the downlink signal for the synchronization process is obtained is set to the whole of the second intermediate area belonging to the tenth subframe #9 of the own radio frame that overlaps the transmission timings of the primary and the secondary synchronization channels of the macro BS1a. However, in the present embodiment, the obtainment section K during which the downlink signal of the another base station device is obtained can be set in units of symbols. Therefore, a higher degree of freedom can be realized in setting the obtainment section K, and for example, as shown in FIG. 14, a part of a second intermediate area may be set as the obtainment section K.

Figure 14:
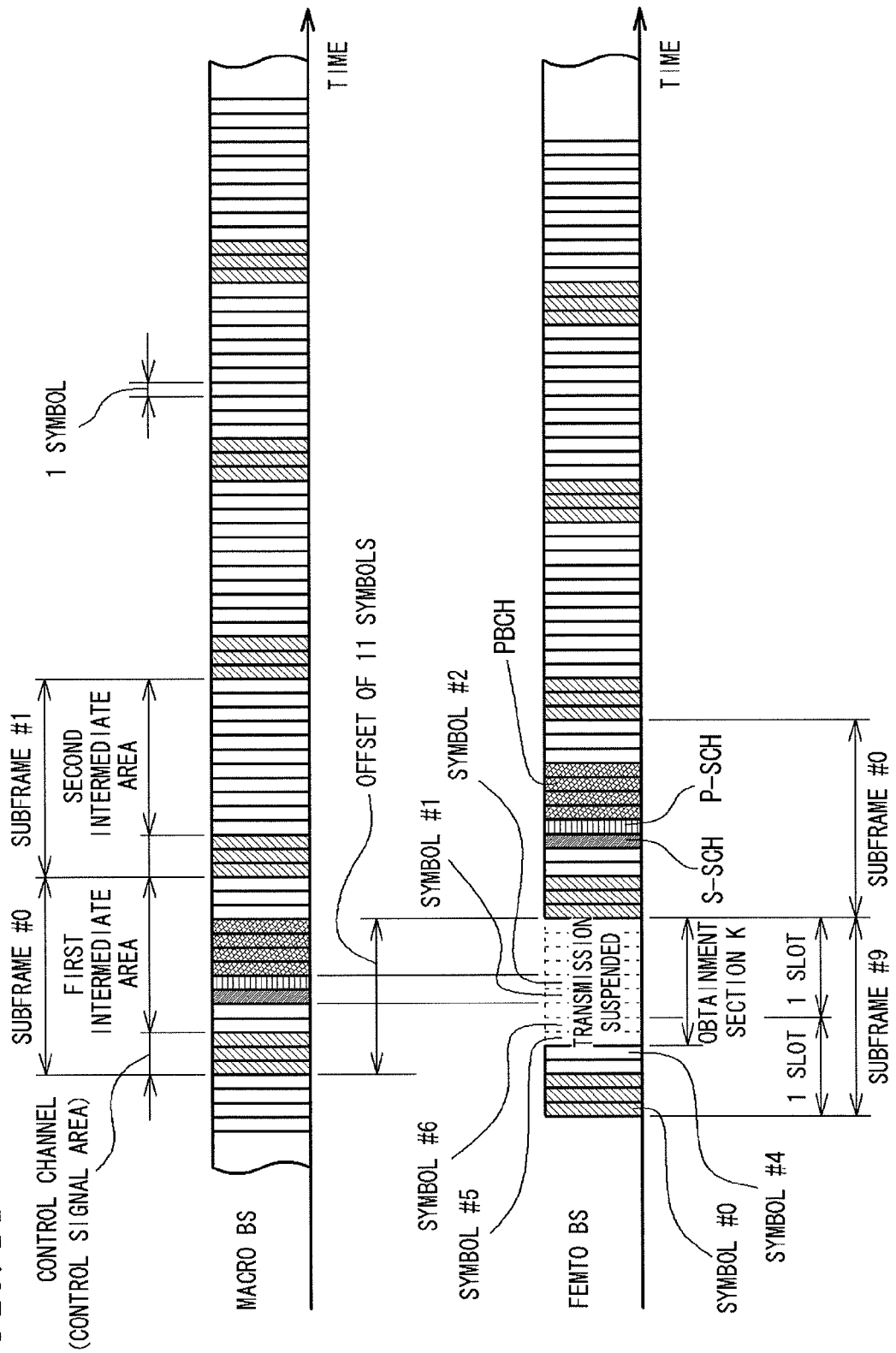
FIG. 14 is a diagram for explaining a modification of a synchronization process according to the second embodiment.

In FIG. 14, the obtainment section K consists of the sixth symbol #5 and the seventh symbol #6 of the front-side slot and the whole of the rear-side slot of the subframe #9, such that the range of the obtainment section K includes the transmission timings of the primary and the secondary synchronization channels of the macro BS1a.

The synchronization processing unit 5b suspends transmission of the own downlink signal in the range of this obtainment section K, receives and obtains the primary and the secondary synchronization channels of the macro BS1a.

In this case, for the first symbol #0 to the fifth symbol #4 of the front-side slot, the femto BS1b can transmit the own downlink signal.

Figure 15:
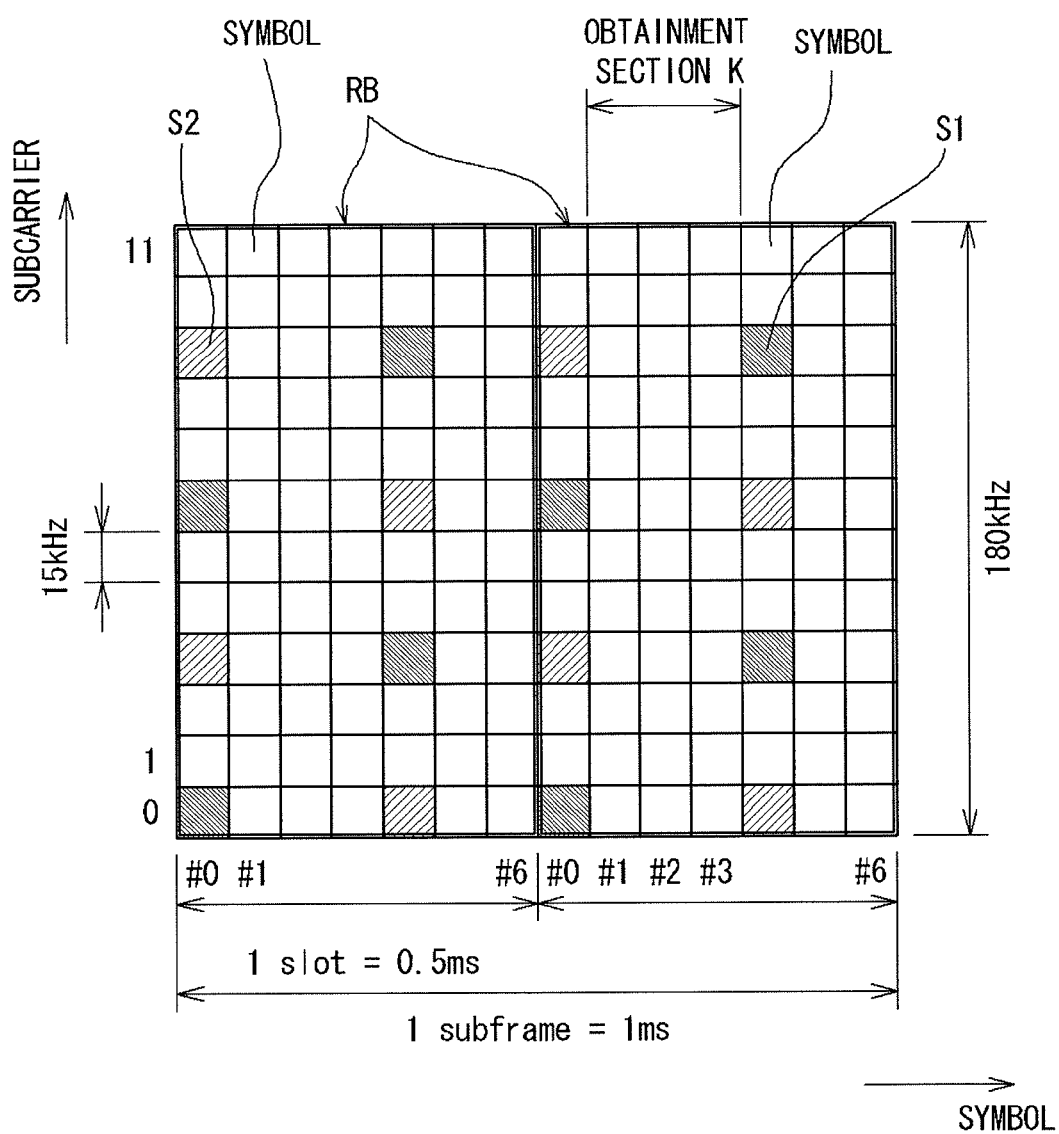
FIG. 15 is a schematic diagram showing in detail configurations of resource blocks.
Figure 16:
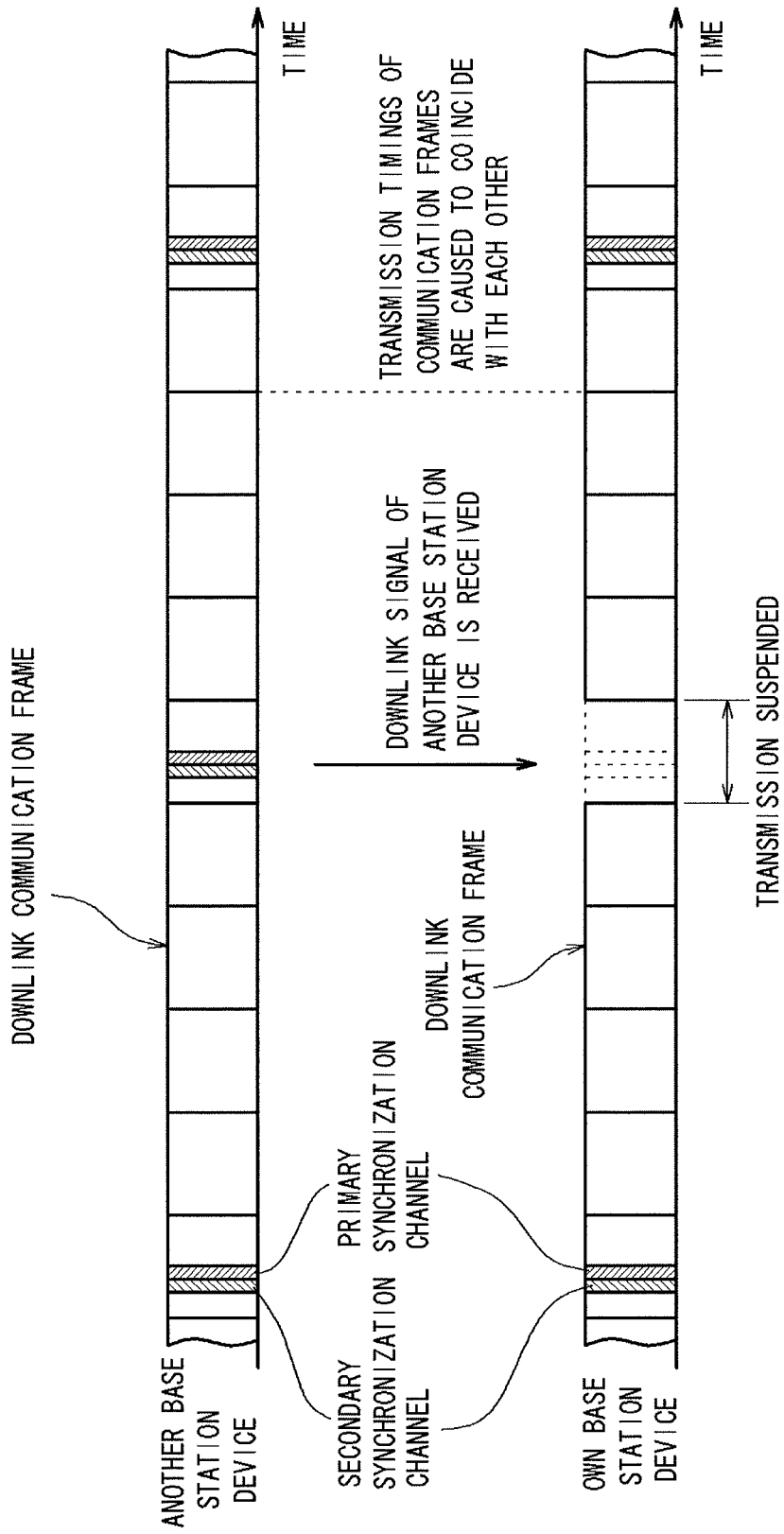
FIG. 16 is a diagram for explaining an example of a synchronization process performed by a base station device.

FIG. 15 is a schematic diagram showing in detail configurations of resource blocks. In FIG. 15, the horizontal axis represents the symbols and the vertical axis represents the subcarriers. FIG. 15 schematically shows symbols arranged in the range of one subframe in the symbol direction (two resource blocks) and one resource block in the direction. In FIG. 15, hatched symbols are reference signals, which are known signals used by an MS 2 to estimate transmission path characteristics of a downlink signal from a base station device. FIG. 15 shows a case in which downlink signals are transmitted from two antennas, and two types of reference signals S1 and S2 are arranged at predetermined positions. The arrangement of these reference signals S1 and S2 are the same in other resource blocks.

The reference signals S1 and S2 are arranged only in the first symbol #0 and the fifth symbol #4 in each slot. That is, in the case of FIG. 15, the first symbols #0 and the fifth symbols #4 in each slot include the reference signals S1 and S2, and other symbols do not include the reference signals S1 and S2.

Therefore, when the obtainment section K is set as shown in FIG. 14, the femto 1351b can transmit the own downlink signal for the period from the first symbol #0 of the fifth symbol #4 of the front-side slot as described above, and thus, can transmit the reference signals S1s and S2 arranged in the front-side slot. An MS 2 connected to the femto BS1b can receive the reference signals S1 and S2, and can perform processing using the reference signals S1 and S2. Therefore, compared with the case where the reference signals S1 and S2 arranged in one subframe are not transmitted at all, influence on communication of the MS 2 can be suppressed as much as possible.

Further, in FIG. 12 and FIG. 14, the synchronization process is performed such that the transmission timings of the primary and the secondary synchronization channels of the macro BS1a coincide with the transmission timings of the second symbol #1 and the third symbol #2 of the rear-side slot. Accordingly, if the obtainment section K is set to a range from the second symbol #1 to the fourth symbol #3 of the rear-side slot as shown in FIG. 15, it is possible to obtain the primary and the secondary synchronization channels of the macro BS1a without suspending transmission of all the reference signals S1 and S2.

That is, in this case, since the obtainment section K during which transmission needs to be suspended is set to a range that does not include symbols containing the reference signals S1 and S2, it is possible to obtain the primary and the secondary synchronization channels of the macro BS1a without suspending transmission of the reference signals S1 and S2 to the MS 2 connected to the own base station device, and it is possible to perform the inter-base-station synchronization while suppressing influence on communication with the MS 2.

In the above embodiment, the obtainment section K is set within the second intermediate area of the tenth subframe #9 in the radio frame of the femto BS1b. However, the obtainment section K may be set within a second intermediate area of a subframe other than the first subframe #0 which contains the primary and the secondary synchronization channels. Note that in this case, the radio frame of the femto BS1b is adjusted such that the transmission timings of the primary and the secondary synchronization channels of the macro BS1a are located within the range of the set obtainment section K.

3. Third Embodiment

Figure 17:
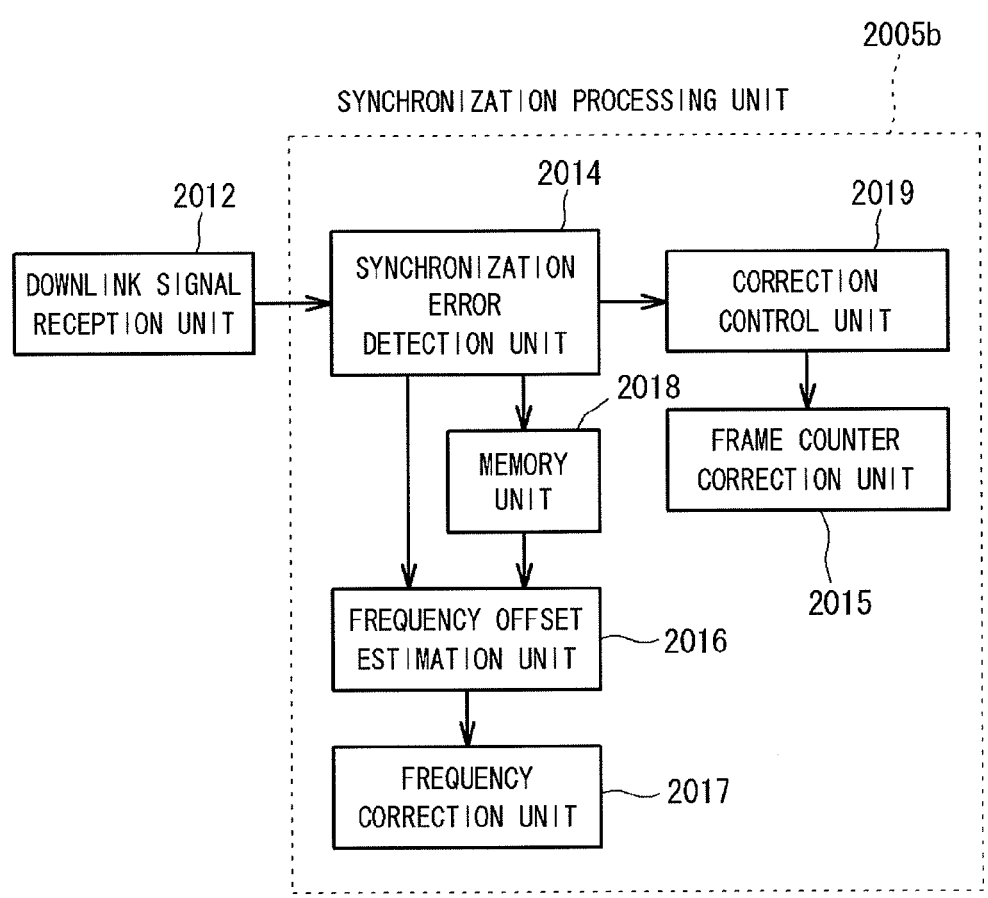
FIG. 17 is a block diagram showing a configuration of a synchronization processing unit of a femto base station device according to a third embodiment.

FIG. 17 is a block diagram showing a configuration of a synchronization processing unit of a femto BS1b according to a third embodiment.

The configuration of the communication system and the frame structure for LTE in the present embodiment are similar to those described in [1.1 Configuration of communication system] and [1.2. Frame structure for LTE] in the first embodiment.

Moreover, the configuration of a femto base station device in the present embodiment is similar to that described in a part other than [1.3.3.2 Configuration of synchronization processing unit] in [1.3 Configuration of femto base station device].

Hereinafter, a configuration, of a synchronization processing unit of the present embodiment, that is different from that in the first embodiment will be described.

[3.1 Configuration of Synchronization Processing Unit]

In FIG. 17, a synchronization processing unit 2005b includes a synchronization error detection unit 2014, a frame counter correction unit 2015, a frequency offset estimation unit 2016, a frequency correction unit 2017, a memory unit 2018, and a correction control unit 2019, and has a function of performing synchronization of frame transmission timings and correcting a carrier frequency.

The synchronization error detection unit 2014 detects a frame transmission timing of another base station device by using the known signals included in a downlink signal, and detects an error (frame synchronization error; communication timing offset) between the detected frame transmission timing and a frame transmission timing of the own base station device 1.

Note that detection of a transmission timing can be performed by detecting timings of the primary synchronization channel and the secondary synchronization channel, which are known signals (waveforms thereof are also known) each existing in a predetermined position in the frame of the received downlink signal.

The synchronization error detection unit 2014 provides the detected frame synchronization error to the correction control unit 2019 and further to the memory unit 2018 each time a frame synchronization error is detected. These detected frame synchronization errors are accumulated in the memory unit 2018.

Upon receiving a frame synchronization error from the synchronization error detection unit 2014, the correction control unit 2019 generates control information regarding a frame timing for correcting the frame synchronization error and provides the generated control information to the frame counter correction unit 2015.

The frame counter correction unit 2015 adjusts the value of the frame counter in accordance with the control information regarding the frame timing provided by the correction control unit 2019, and corrects the frame timing in accordance with the synchronization error.

The correction control unit 2019 grasps the transmission timing of a subframe (first subframe #0 or sixth subframe #5) containing the primary and the secondary synchronization channels in the own downlink signal. Then, in order to cancel the synchronization error, the correction control unit 2019 causes the frame counter correction unit 2015 to correct the frame timing in the subframe #0 or #6 containing the primary and the secondary synchronization channels, which are known signals.

Specifically, based on the control information from the correction control unit 2019, the frame counter correction unit 2015 corrects the transmission timing of the first subframe #0 or the sixth subframe #5 containing the primary and the secondary synchronization channels in the own downlink signal so as to coincide with the frame transmission timing of the another base station device.

Then, the frame counter correction unit 2015 sequentially arranges subsequent subframes in accordance with the corrected timing of the first subframe #0 or the sixth subframe #5.

As a result, the transmission timings of the first subframe #0 or the sixth subframe #5 and of the subframes arranged thereafter are corrected so as to coincide with the frame transmission timings of the another base station device.

In this manner, the synchronization processing unit 2005b performs the synchronization process on the frame transmission timing of the own downlink signal, relative to the another base station device.

[3.2 Synchronization Process]

Figure 18:
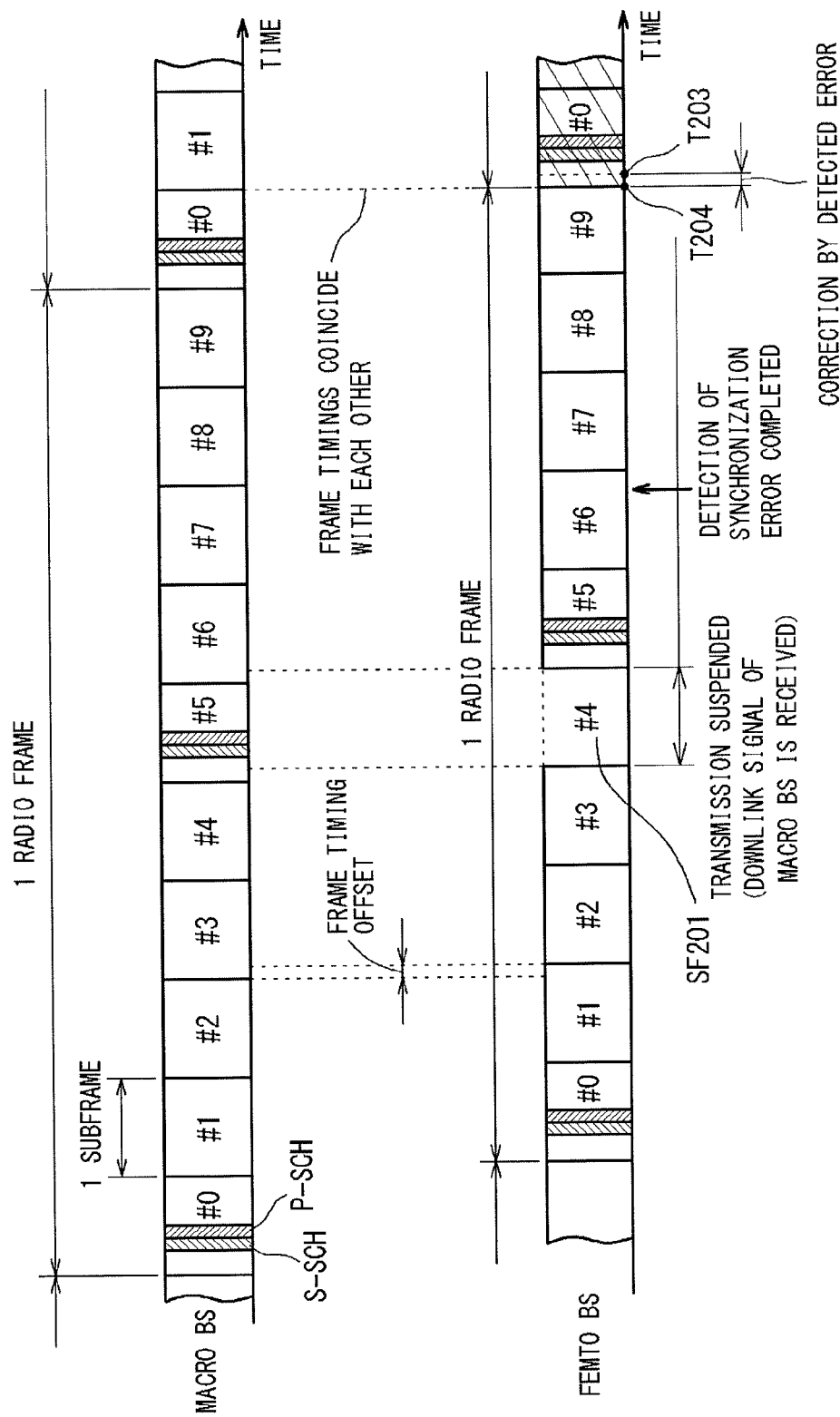
FIG. 18 is a diagram for explaining an example of a synchronization process performed by a synchronization processing unit.

FIG. 18 is a diagram for explaining an example of a synchronization process performed by a synchronization processing unit. FIG. 18 shows a frame transmitted by a macro BS1a serving as another base station device and a frame transmitted by a femto BS serving as the own base station device, and shows an example in which the femto BS1b performs synchronization relative to a downlink signal of the macro BS1a serving as a synchronization source on the same time axis.

FIG. 18 shows a state in which an offset in the frame transmission timings has occurred: that is, in each section before a timing T204, a timing offset has occurred between the beginning of each subframe of the femto BS1b and the beginning of a corresponding subframe of the macro BS1a.

Here, in a case where the synchronization processing unit 2005b of the femto BS1b has set the timing to obtain a downlink signal for performing the synchronization process to a subframe SF201 which corresponds to the fifth subframe #4, the synchronization processing unit 2005b outputs synchronization timing information containing information for specifying the subframe SF201 to the resource allocation control unit 5d and the measurement processing unit 5c. Note that the example in the drawing shows a case where the section during which transmission of a transmission signal is suspended is set to only the section of the subframe SF201 which corresponds to the timing at which the synchronization process is started.

When this radio frame is transmitted, the synchronization processing unit 2005b causes, at the transmission timing corresponding to the subframe SF201, the transmission unit 13 to suspend transmission of the transmission signal and the downlink signal reception unit 12 to receive a downlink signal of the macro BS1a, and obtains the received downlink signal.

Then, the synchronization processing unit 2005b detects the frame transmission timing of the macro BS1a by using the primary synchronization channel and the secondary synchronization channel contained in the obtained downlink signal of the macro BS1a, and detects a frame synchronization error between the frame transmission timing of the macro BS1a and the own frame transmission timing.

Note that the synchronization processing unit 2005b can grasp, from synchronization errors obtained at previous synchronization processes accumulated in the memory unit 2018, the transmission timing of the subframe (#0 or #5) containing the primary synchronization channel and the secondary synchronization channel in the downlink signal of the macro BS1a serving as the another base station device. Accordingly, the synchronization processing unit 2005b can set the transmission signal so as to be suspended in the section of the own subframe that corresponds to that transmission timing.

Meanwhile, the resource allocation control unit 5d, provided with the synchronization timing information, restricts allocation of user data of the terminal device 2 to the section of the subframe SF201. Accordingly, even if the terminal device 2 connected to the femto BS1b cannot communicate with the femto BS1b as a result of the transmission suspension of the transmission signal in this section, the terminal device 2 does not scan a base station in vain or determine that some abnormality has occurred, and thus can maintain smooth communication.

After obtaining the downlink signal of the macro BS1a, the synchronization processing unit 2005b needs time to detect (determine) a synchronization error based on the synchronization signals contained in the downlink signal. Therefore, after obtaining the downlink signal of the macro BS1a and determining the synchronization error, the synchronization processing unit 2005b corrects the frame timing in a subframe that contains the primary and the secondary synchronization channels, the subframe coming first after the determination.

In the case of FIG. 18, for example, if it is assumed that the synchronization processing unit 2005b has ended detection of the synchronization error in a section indicated by the arrow in FIG. 18 after having suspended the own transmission and having obtained the downlink signal of the macro BS1a, the synchronization processing unit 2005b waits without performing correction until the subframe #0 which is a subframe that contains the primary and the secondary synchronization channels, the subframe coming first after the detection, and then corrects the frame timing in the subframe #0. In this case, after determining the synchronization error, the synchronization processing unit 2005b promptly corrects the frame timing in the subframe containing the primary and the secondary synchronization channels, and thus, can perform inter-base-station synchronization more accurately.

If it is assumed that the beginning of the subframe #0 before correction is a timing T203, the synchronization processing unit 2005b firstly adjusts the value of the frame counter such that the beginning of the subframe #0 coincides with the timing T204, which is a timing shifted from the timing T203 by an amount of the error. Accordingly, it is possible to cause the transmission timing of the subframe #0 in the own downlink signal to coincide with the transmission timing of the subframe #1 in the downlink signal of the macro BS1a.

Then, the positions in the time axis direction of the subsequent subframes (radio frames) located after the corrected subframe #0 are adjusted in accordance with the timing of the corrected subframe #0, and thus the subsequent subframes are sequentially arranged.

Accordingly, the synchronization processing unit 2005b can cause the frame timing of the own femto BS1b to coincide with the frame timing of the macro BS1a, and thus, can achieve synchronization.

With respect to the subframe whose frame timing is to be corrected, it is preferable that the transmission timing thereof is corrected in the first subframe #0, which is located at a most front position in a radio frame, among subframes containing the primary and the secondary synchronization channels.

This is because, as shown in FIG. 3, the first subframe #0 is allocated with a PBCH which contains main system information to be transmitted to an MS 2, in addition to the primary and the secondary synchronization channels.

Therefore, for example, the synchronization processing unit 2005b may be configured to specify the first subframe #0 and to perform the correction of the frame timing always in the first subframe #0.

Although only the synchronization of the frame timing has been described in the above, correction of the carrier frequency is also performed in a similar manner.

According to the femto BS1b having the above configuration, the synchronization processing unit 2005b corrects the transmission timing of a subframe in the first subframe #0 which contains the primary and the secondary synchronization channels. Accordingly, the subframe whose transmission timing has been corrected by the inter-base-station synchronization always contains the primary and the secondary synchronization channels. Therefore, even when the transmission timing of the own downlink signal is corrected and the transmission timing is changed as a result of the inter-base-station synchronization having been performed, the femto BS1b can allow an MS 2 connected to itself to promptly receive the primary and the secondary synchronization channels, and can allow the MS 2 to achieve synchronization with the femto BS1b. As a result, it is possible to prevent the MS 2 from misidentifying the femto BS1b, or from becoming unable to receive the downlink signal as a result of the shift of the transmission timing of the downlink signal of the femto BS1b. Therefore, it is possible to perform the inter-base-station synchronization while suppressing influence on communication between the femto BS1b and the MS 2.

[3.3 Measurement Process]

Figure 19:
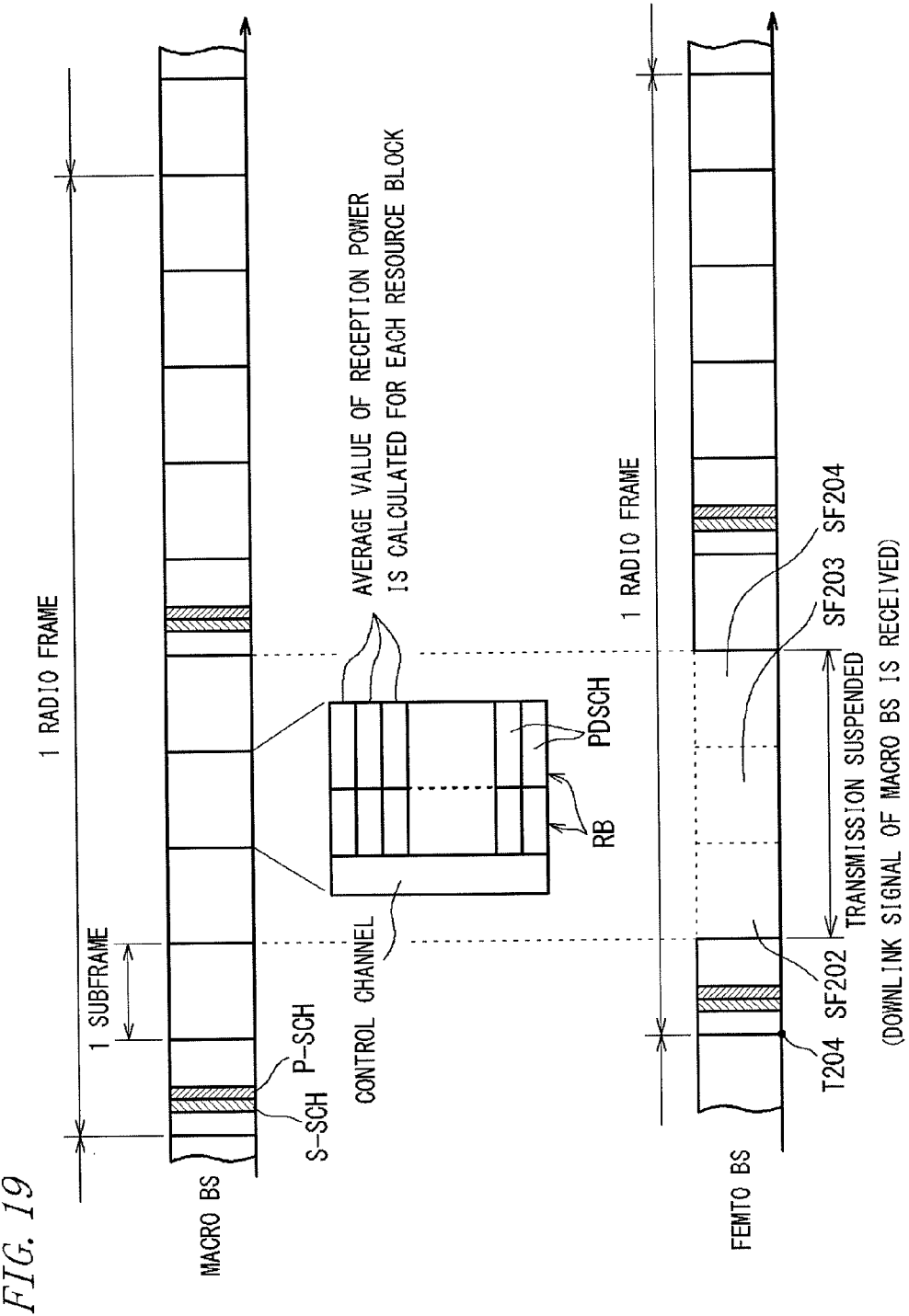
FIG. 19 is a diagram for explaining an example of a measurement process performed by a measurement processing unit.
Figure 20:
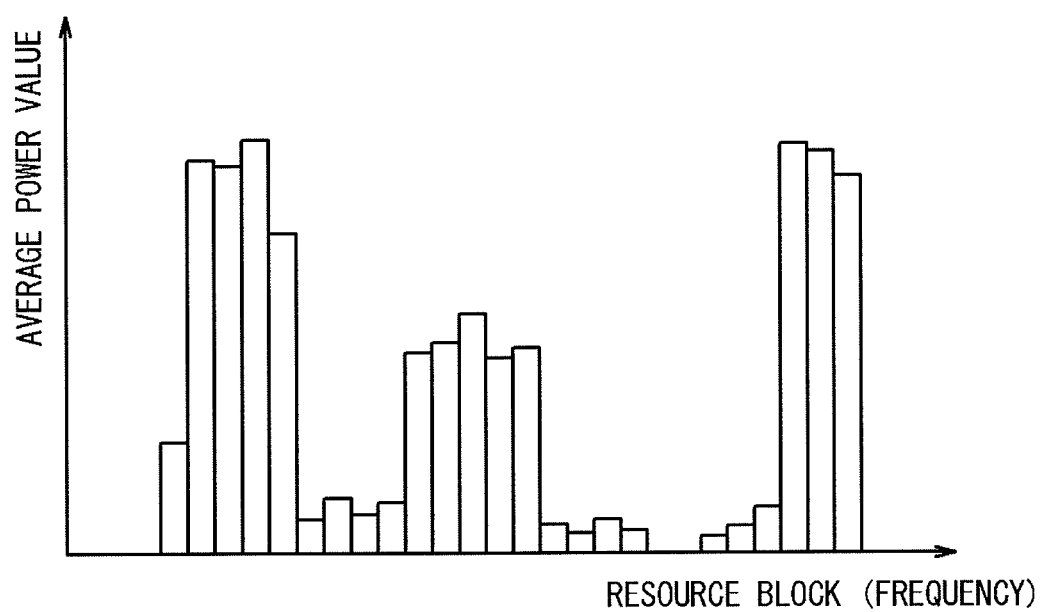
FIG. 20 is a diagram showing an example of a result of determination of an average power value for each resource block obtained by a measurement processing unit.

FIG. 19 is a diagram for explaining an example of a measurement process performed by the measurement processing unit 5c. FIG. 20 is a diagram showing an example of a result of determination of an average power value for each resource block obtained by the measurement processing unit 5c.

Description regarding FIG. 19 and FIG. 20 will be omitted since it is the same as that in [1.5 Measurement process] in the first embodiment, except that corresponding reference numerals in the drawing are different.

[3.4 Timings of Synchronization Process and Measurement Process]

Figure 21:
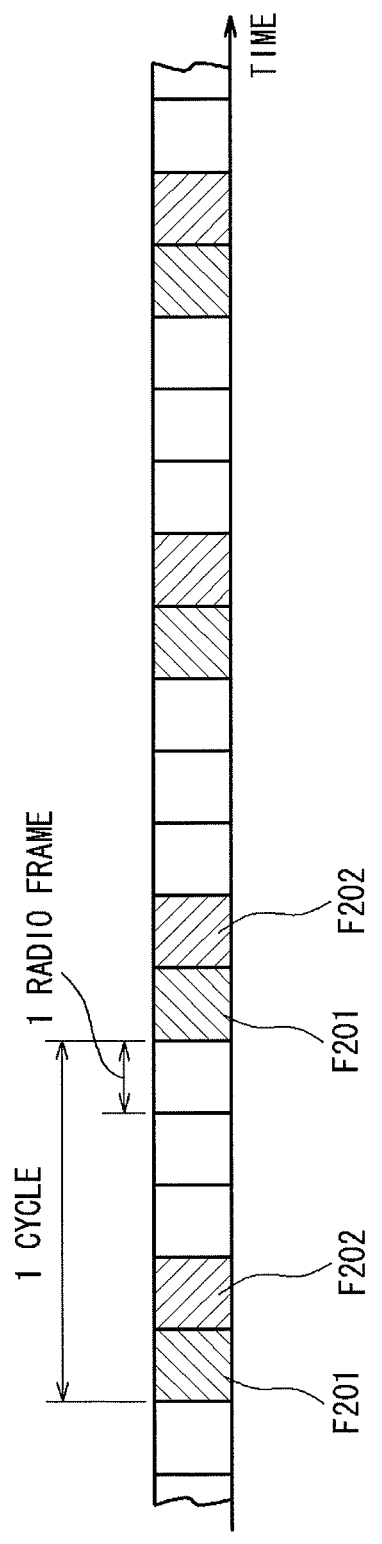
FIG. 21 is a diagram showing timings at which a synchronization process and a measurement process are performed.

FIG. 21 is a diagram showing timings at which a synchronization process and a measurement process are performed. Description regarding FIG. 21 will be omitted since it is the same as that in [1.6 Timings of synchronization process and measurement process] in the first embodiment, except that the corresponding reference numerals in the drawing are different.

[3.5 Modification of the Third Embodiment]

Note that the present invention is not limited to the above embodiment.

In the above embodiment, an exemplary case has been described in which the frame timing is corrected in the first subframe #0 located at the beginning of a radio frame. However, as long as a subframe for which correction is to be performed contains the known signals, influence on communication with an MS 2 can be suppressed. Therefore, for example, as shown in FIG. 22, the frame timing may be corrected in the sixth subframe #5 located substantially the middle of a radio frame.

Figure 22:
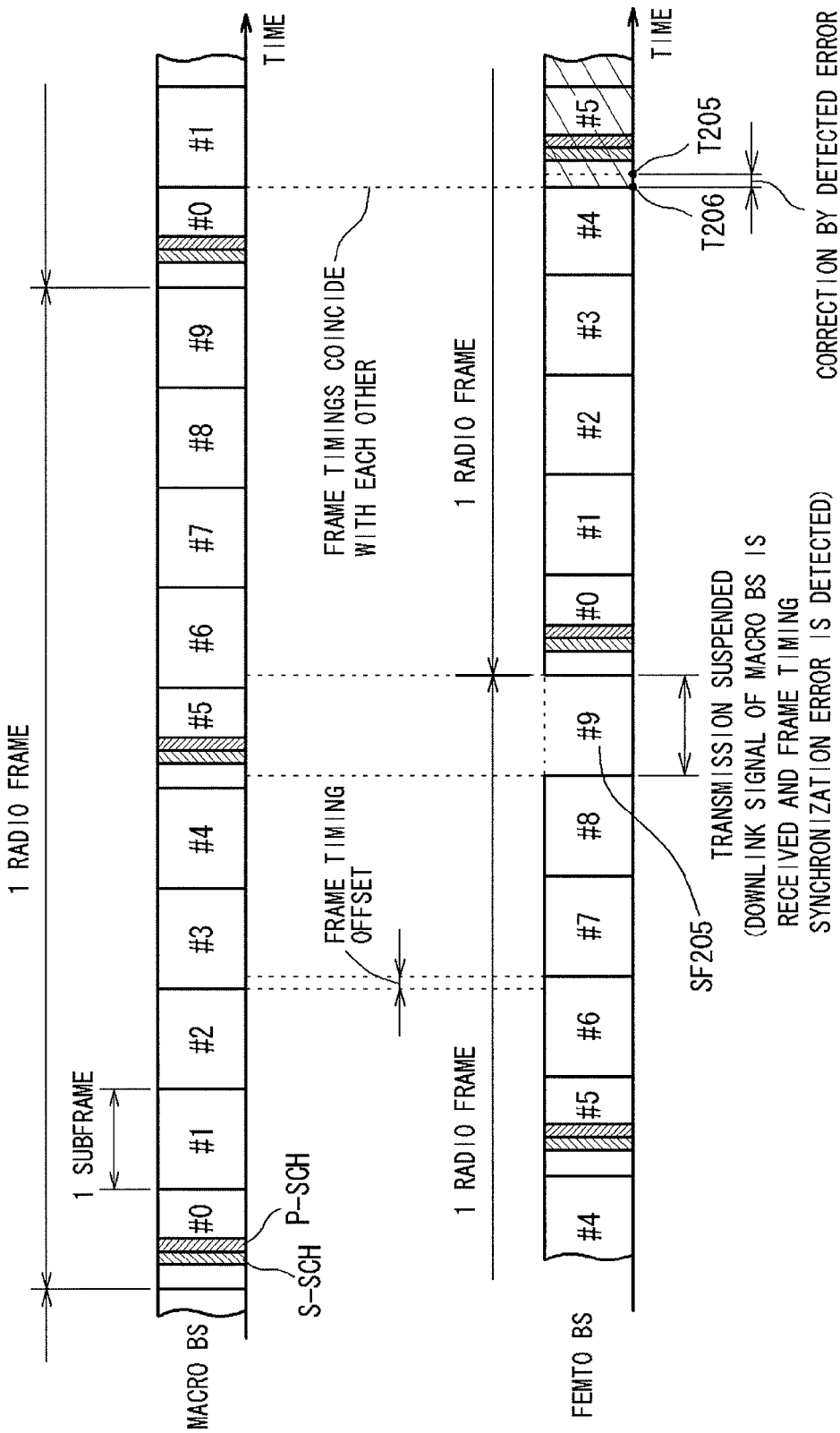
FIG. 22 is a diagram showing another example in which inter-base-station synchronization is performed between a macro base station device and a femto base station device.
Figure 23:
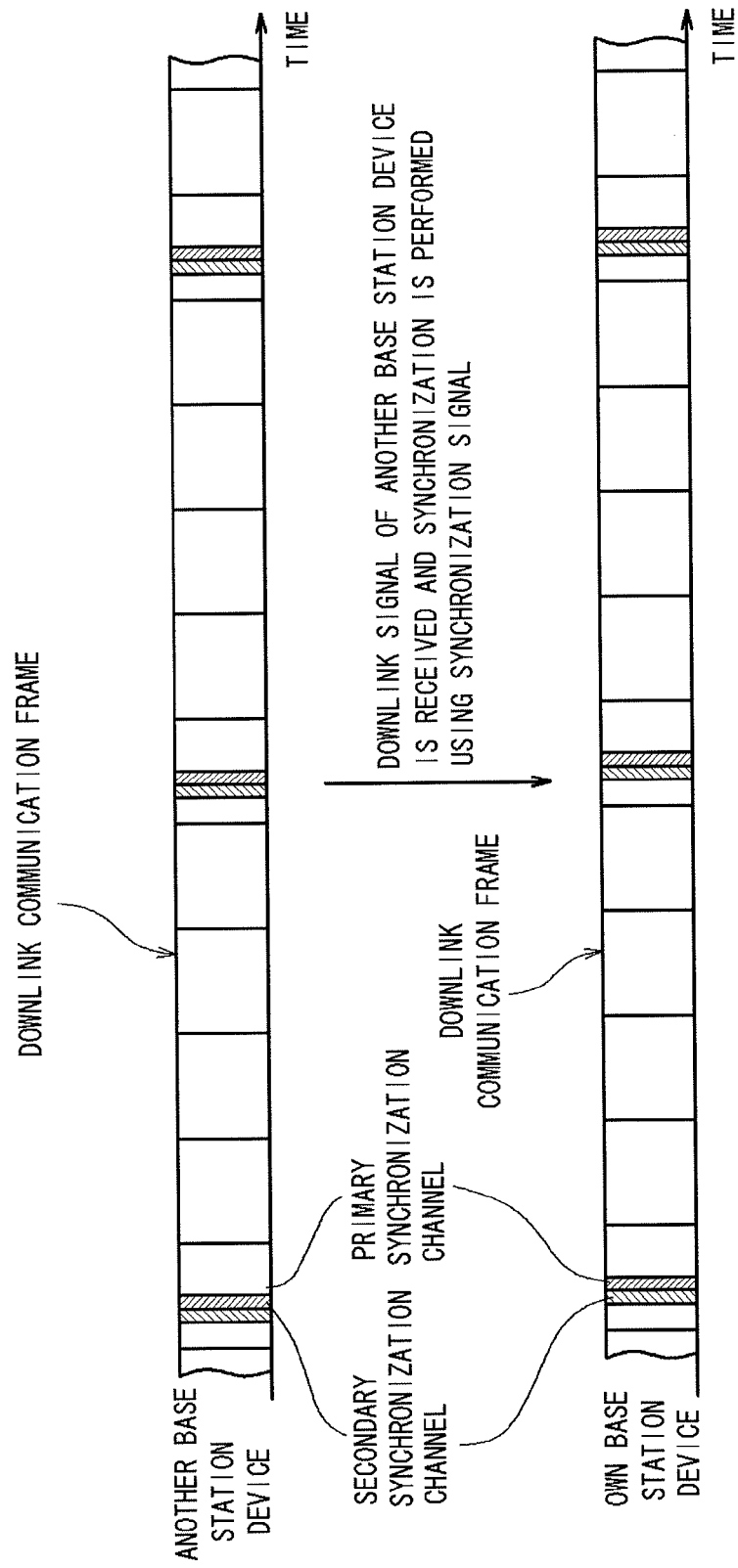
FIG. 23 is a diagram for explaining an example of a synchronization process that can be adopted in a base station device.

Note that, in the case of FIG. 22, if it is assumed that the synchronization processing unit 2005b sets the timing to obtain the downlink signal for performing the synchronization process to a subframe SF205, which corresponds to the tenth subframe #9 being the last subframe of the radio frame, and it is assumed that the beginning of the subframe #0 before correction is a timing T205, the synchronization processing unit 2005b adjusts the value of the frame counter such that the beginning of the subframe #5 coincides with a timing T206 which is a timing shifted from the timing T205 by an amount of the detected error. Accordingly, synchronization processing unit 2005b can cause the transmission timing of the own subframe #5 to coincide with the transmission timing of the subframe #1 in the downlink signal of the macro BS1a.

Moreover, in the above embodiment, an exemplary case has been described in which the inter-base-station synchronization is performed such that the subframe #0 or the subframe #5 containing the primary and the secondary synchronization channels in the own downlink signal coincides with the transmission timing of the subframe #1 in the downlink signal of the macro BS1a. However, the inter-base-station synchronization may be performed such that the subframe #0 or the subframe #5 in the own downlink signal coincides with the transmission timing of one of the other subframes #0, #2 to 9 in the downlink signal of the macro BS1a.

Moreover, the above embodiment is configured such that after obtaining the downlink signal of the macro BS1a, the synchronization processing unit 2005b corrects the frame timing in a subframe that contains the primary and the secondary synchronization channels, the subframe coming first after a section corresponding to five subframes as a predetermined time period has elapsed. However this predetermined time period that is secured after obtaining the downlink signal of the macro BS1a until performing the correction may be set to any time period that allows the synchronization processing unit 2005b to determine a synchronization error based on the obtained downlink signal, and thus, is adjusted as appropriate in accordance with the own processing capacity and the like.

Moreover, in the above embodiment, a subframe is used as a basic communication unit having a certain time length, which serves as a target of the synchronization process. However, another unit forming a downlink signal, such as a radio frame, a section defined by resource blocks, or a section defined by symbols, may be used as the basic communication unit.

In the above embodiment, an exemplary case has been described in which the synchronization process is performed periodically. However, the timing of the synchronization process may be set in accordance with a detection result by the terminal detection unit 5e each time the detection result is obtained.

Moreover, in the above embodiment, an exemplary case has been described in which the synchronization processing unit 2005b sets the cycle of the synchronization process in accordance with the number of MSs 2 connected to the own base station device and the another base station device. However, the synchronization processing unit 2005b may set the cycle in accordance only with the number of MSs 2 connected to the own base station device, or only with the number of MSs 2 connected to the another base station device. Further, taking into consideration only the total number of MSs 2 connected to the own and the another base station devices, the synchronization processing unit 2005b may set the cycle of the synchronization process in accordance with the total number.

According to the above embodiment, in the synchronization process, a synchronization offset is corrected at the beginning of a radio frame located immediately after the radio frame in which transmission of a transmission signal has been suspended to receive a downlink signal of another base station device. However, for example, the synchronization offset may be corrected at the beginning of a subframe other than the beginning of a radio frame. Moreover, in the synchronization process and the measurement process, the section during which the transmission signal is suspended may be set as necessary.

4. Fourth Embodiment

Figure 33:
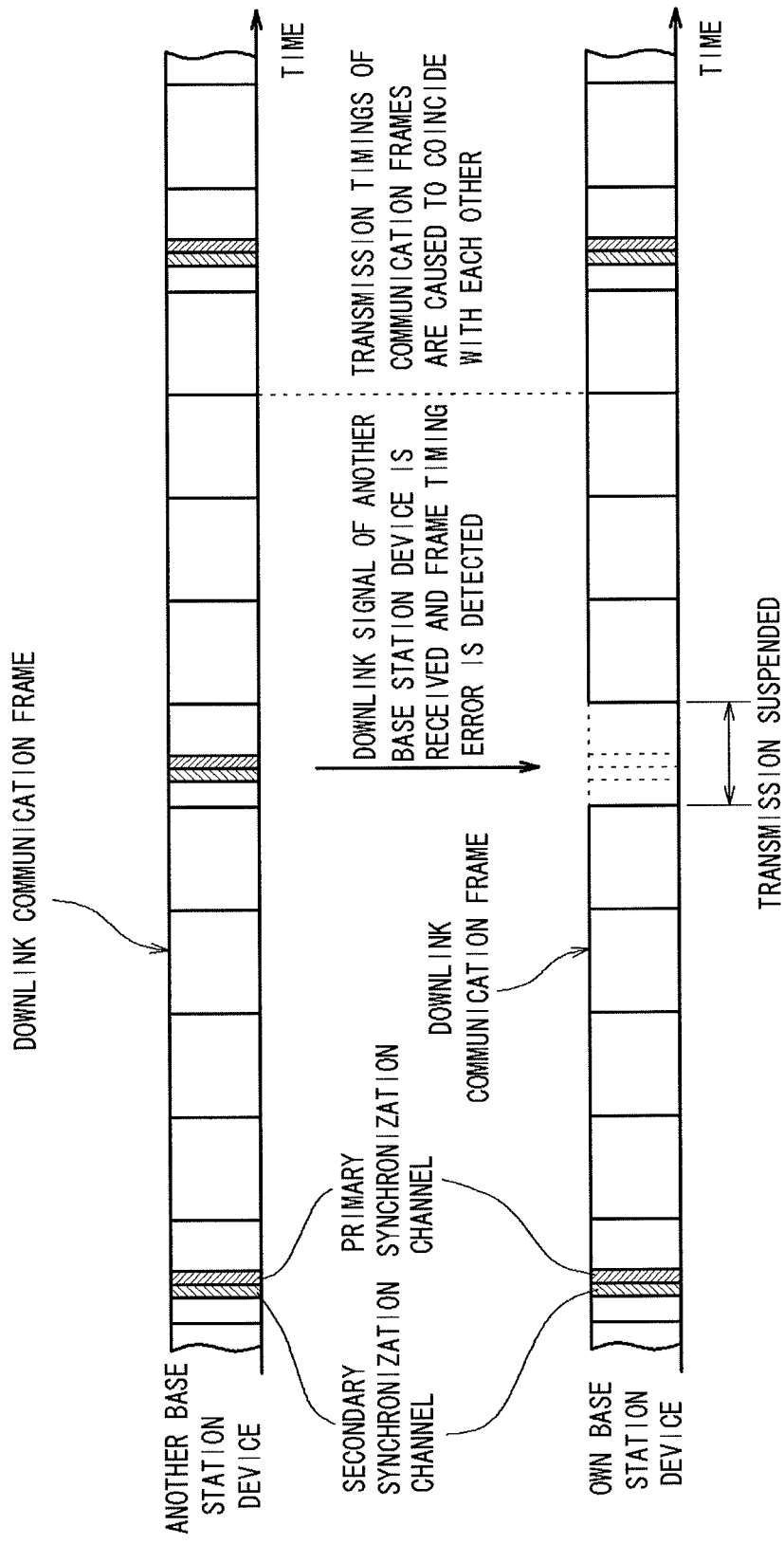
FIG. 33 is a diagram showing an example of a synchronization process that can be adopted in a base station device.

Moreover, in a communication frame of a downlink signal in a frequency division duplex system, as shown in FIG. 33, a primary synchronization channel and a secondary synchronization channel used by a terminal device to scan a base station device, to identify the base station device, to achieve synchronization with the base station device, and the like, are arranged in a constant cycle. Since these synchronization signals are known signals, it is conceivable to cause a base station device attempting to achieve inter-base-station synchronization with another base station device that will serve as a synchronization source to utilize both synchronization signals contained in a downlink signal transmitted by the another base station device, thereby achieving inter-base-station synchronization.

As shown in FIG. 33, a downlink signal of a base station device adopting the FDD is composed of a plurality of subframes arranged in the time axis direction. Inter-base-station synchronization performed on the transmission timings of the own and the another base station devices is realized by detecting a synchronization error between the transmission timings of both subframes, and by canceling the synchronization error, thereby causing the transmission timings of both subframes to coincide with each other.

In order to cause the own downlink signal to synchronize with the downlink signal of the another base station device, it is necessary to correct the transmission timing of a subframe, among the plurality of subframes forming the own downlink signal, so as to coincide with the timing of a subframe in the downlink signal of the another base station device.

Here, in a case where the transmission timing of the own downlink signal is advanced relative to the transmission timing of the another base station device, synchronization can be achieved by delaying the transmission timing of the subframe to be corrected.

On the other hand, in a case where the transmission timing of the own downlink signal is delayed relative to the transmission timing of the another base station device, it is necessary to advance the transmission timing of the subframe to be corrected in order to cancel the synchronization error.

Since the subframes in the downlink signal in FDD are arranged in the time axis direction as described above, if correction is attempted so as to advance the transmission timing of a subframe to be corrected, the subframe to be corrected overlaps the subframe located therebefore. This may cause interference between symbols, resulting in a higher error rate and the like at the time of demodulation on the terminal device.

Between adjacent subframes, an area such as a guard interval or a cyclic prefix is usually provided so as to be able to endure interference between symbols caused by a delayed signal due to multipath and the like. Therefore, even when the transmission timing of a subframe is advanced, if the amount of correction of the transmission timing is small because the amount of synchronization error is relatively small, these areas can avoid influence of the interference between symbols.

However, for example, when it is necessary to correct the transmission timing exceeding the extent that the above areas can manage because the amount of synchronization error relative to the transmission timing of the another base station device is relatively large, there will be an enhanced possibility that influence of interference between symbols cannot be avoided.

Moreover, the above also applies to the case where synchronization is achieved on the error of the carrier frequency between the own and the another base station devices. When correcting the carrier frequency, there are cases where influence of interference between subcarriers cannot be avoided, depending on the magnitude of the synchronization error.

Thus, there is a possibility that inter-base-station synchronization cannot be performed appropriately depending on the amount of the synchronization error.

Therefore, a technology that can perform inter-base-station synchronization appropriately in accordance with the amount of the synchronization error is desired.

Hereinafter, in the fourth embodiment, a base station device that can appropriately perform inter-base-station synchronization in accordance with the amount of the synchronization error will be described.

Note that the configuration of the communication system and the frame structure for LTE in the present embodiment are similar to those described in [1.1 Configuration of communication system] and [1.2. Frame structure for LTE] in the first embodiment.

[4.1 Configuration of Slot]

Figure 24:
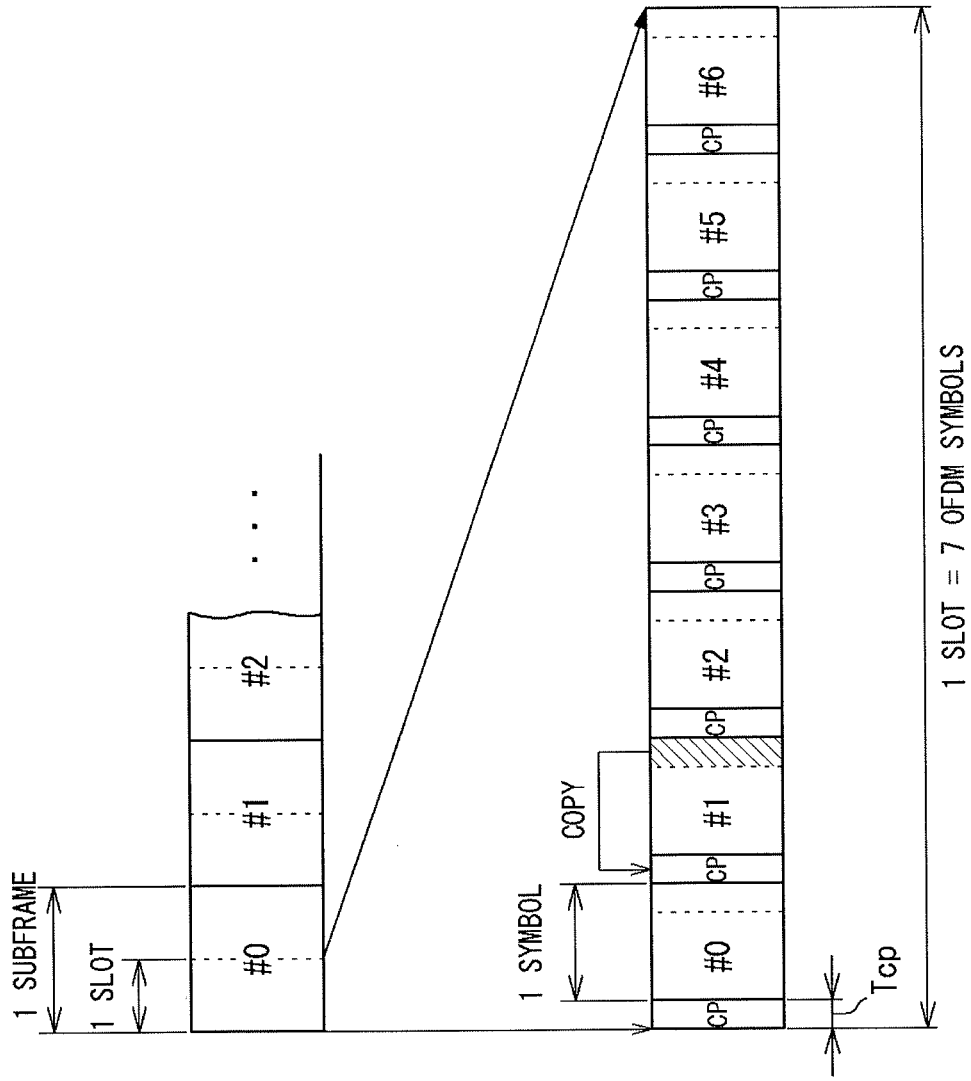
FIG. 24 is a diagram for explaining in detail a configuration of slots forming a subframe.

FIG. 24 is a diagram for explaining in detail a configuration of slots forming a subframe. Note that FIG. 24 shows a configuration of slots when a normal cyclic prefix is adopted.

Each slot is composed of seven (#0 to #6) OFDM symbols. A cyclic prefix (hereinafter also referred to as CP) having a similar function to that of a guard interval is located at the beginning of each symbol, and the CP is interposed between adjacent symbols.

As shown in FIG. 24, each CP is generated by copying a portion of the latter half of each symbol, and is located at the beginning of the symbol. By interposing the CP, even when a delayed signal due to multipath whose delay is less than or equal to the time length $T_{cp}$ of the CP is received and interference between symbols occurs, it is possible to maintain the orthogonality between the subcarriers, and to prevent influence, such as a higher error rate at the time of demodulation in the terminal device, from appearing.

Moreover, in the case of the normal cyclic prefix, the time length $T_{cp}$ of a CP is set to about 5.21 microseconds (CP for symbol #0) or about 4.69 microseconds (CP for other symbols).

Therefore, between adjacent subframes, the CP having a time length of about 5.21 microseconds is interposed.

[4.2 Configuration of Femto Base Station Device]

Figure 25:
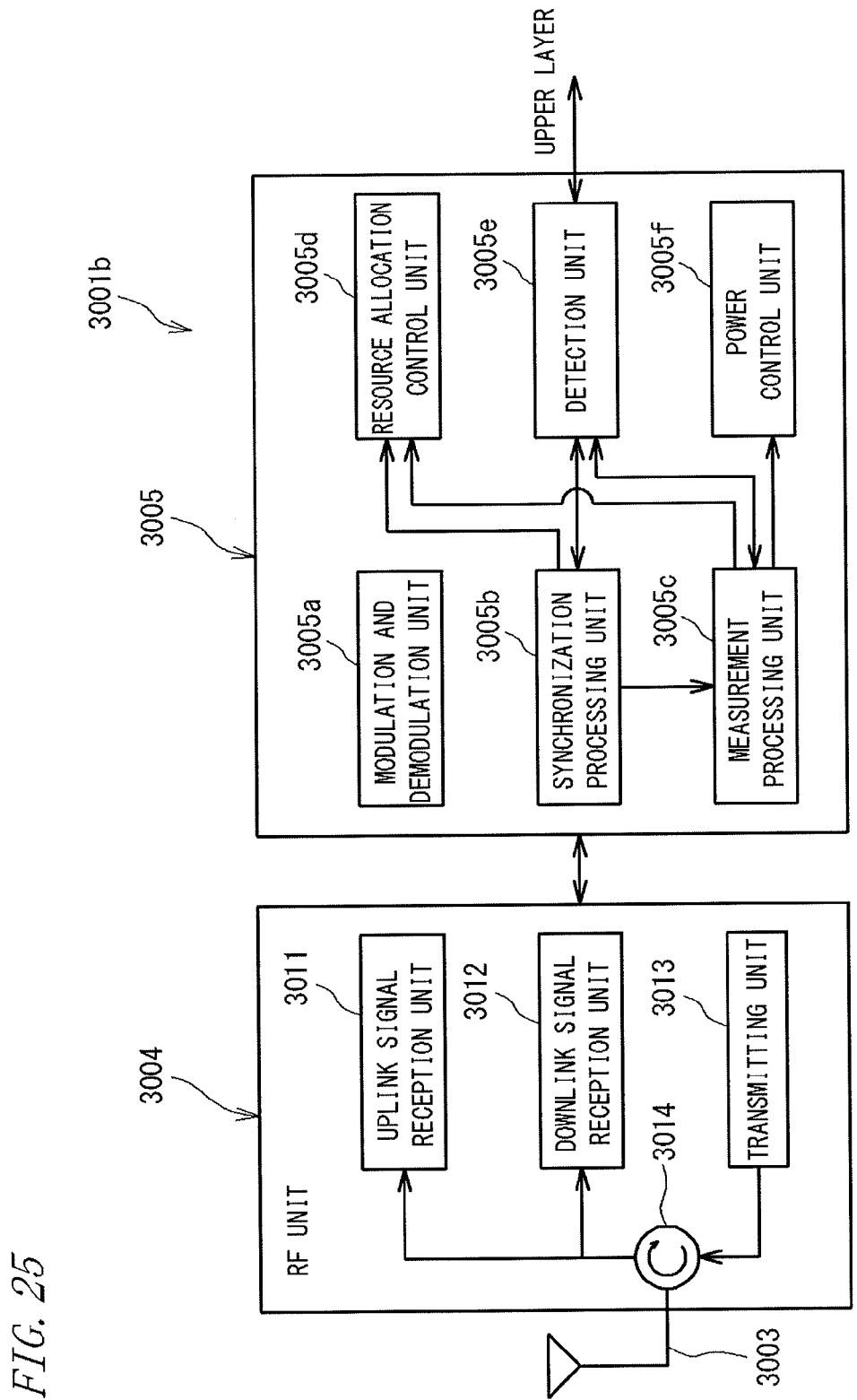
FIG. 25 is a block diagram showing a configuration of a femto base station device according to a fourth embodiment.

FIG. 25 is a block diagram showing a configuration of a femto BS1*b* according to the fourth embodiment. Although the configuration of the femto BS1*b* will be described here, the configuration of a macro BS1*a* is substantially the same as that of the femto BS1*b*.

A femto BS1*b*1 includes an antenna 3003, a transmission/reception unit (RF unit) 3004 to which the antenna 3003 is connected, and a signal processing unit 3005 which performs signal processing of transmission and reception signals transmitted to and received from the RF unit 3004, processing regarding inter-base-station synchronization, measurement, and the like.

[4.2.1 RF Unit]

Figure 26:
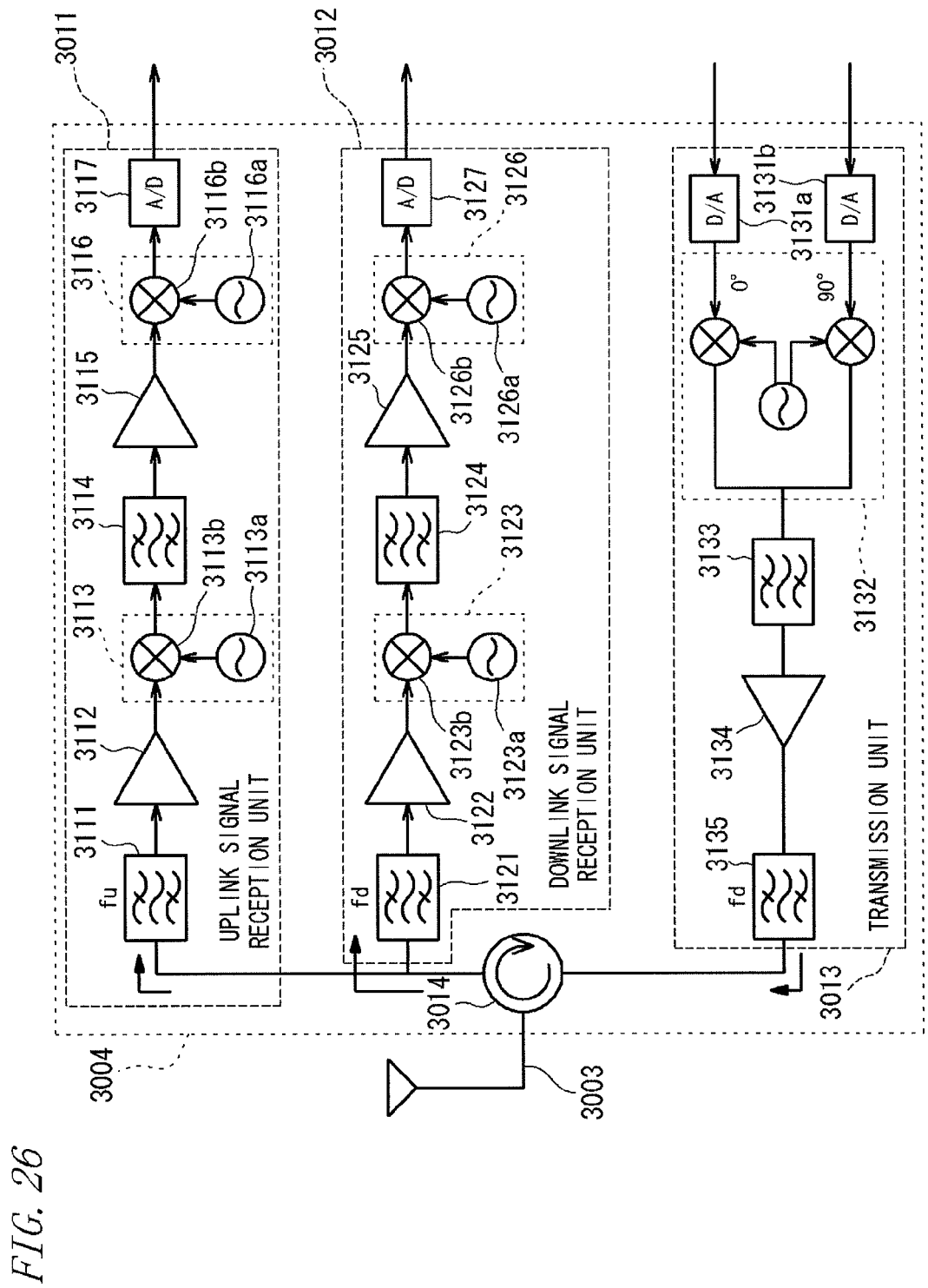
FIG. 26 is a block diagram showing in detail an RF unit.

FIG. 26 is a block diagram showing in detail the RF unit 3004. The RF unit 3004 includes an uplink signal reception unit 3011, a downlink signal reception unit 3012, and a transmission unit 3013. The uplink signal reception unit 3011 receives an uplink signal from the terminal device 2, and the downlink signal reception unit 3012 receives a downlink signal from another macro BS1*a* or another femto BS1*b*. The transmission unit 3013 transmits a downlink signal to the terminal device 2.

Description regarding FIG. 26 will be omitted since it is the same as that in [1.3.1 RF unit] in the first embodiment, except that the corresponding reference numerals in FIG. 26 are different.

[4.2.2 Signal Processing Unit]

With reference to FIG. 25, the signal processing unit 3005 has a function of performing signal processing on transmission and reception signals transmitted to and received from the RF unit 3004, and includes a modulation/demodulation unit 3005*a* which modulates various transmission data provided by an upper layer of the signal processing unit 3005 into a transmission signal and demodulates a reception signal provided by the RF unit 3004 into reception data. The modulation/demodulation unit 3005*a* performs processes of modulation and demodulation, with a synchronization error corrected based on a synchronization error (timing offset, frequency offset) calculated by the synchronization processing unit 3005*b* described below.

Further, the signal processing unit 3005 includes a frame counter (not shown) for determining a transmission timing of each radio frame of a transmission signal to be provided to the RF unit 3004.

Further, the signal processing unit 3005 includes a resource allocation control unit 3005*d*, and a detection unit 3005*e* for detecting a communication state of a terminal device connected to the own base station device and to another base station device, in addition to the synchronization processing unit 3005*b* for performing a synchronization process in which inter-base-station synchronization is achieved with another base station device, and a measurement processing unit 3005*c* for performing measurement.

Hereinafter, a configuration of the synchronization processing unit 3005*b* will be described.

[4.2.3 Synchronization Processing Unit]

[4.2.3.1 Function and Configuration of Synchronization Processing Unit]

Figure 27:
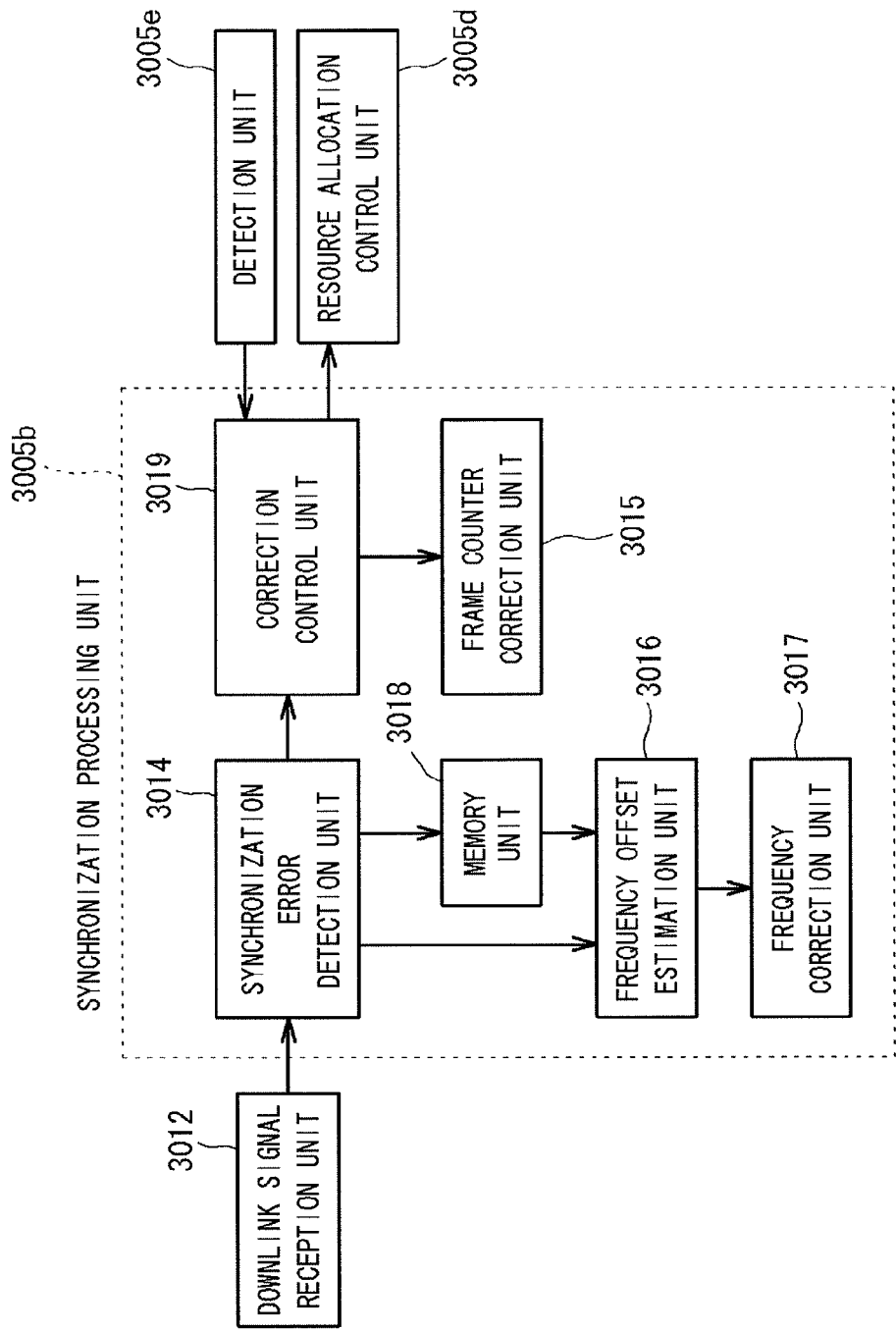
FIG. 27 is a block diagram showing a configuration of a synchronization processing unit for performing a synchronization process in which inter-base-station synchronization is achieved with another base station device.

FIG. 27 is a block diagram showing a configuration of the synchronization processing unit 3005*b* for performing a synchronization process in which inter-base-station synchronization is achieved with another base station device.

Such inter-base-station synchronization may be performed by providing each of the base station devices with a GPS receiver so that the base station device can achieve synchronization by using GPS signals, or by connecting the base station devices via a cable. However, the present embodiment adopts inter-base-station synchronization based on "over-the-air synchronization" in which synchronization is achieved by using radio signals (downlink signals).

Specifically, the synchronization processing unit 3005b obtains a downlink signal from another base station device received by the downlink signal reception unit 3012, and performs a synchronization process of synchronizing the communication timing and the communication frequency of the own base station device 1 with those of another base station device, based on a primary synchronization channel (P-SCH) and a secondary synchronization channel (S-SCH) which are known signals included in a radio frame of the downlink signal.

The synchronization processing unit 3005b sets, in units of subframes, a timing to obtain a downlink signal from another base station device provided by the downlink signal reception unit 3012 such that the above synchronization process is performed in a predetermined cycle. Moreover, the synchronization processing unit 3005b has a function of adjusting the timing to perform a synchronization process, by adjusting the cycle of the timing to obtain the downlink signal for the synchronization process, in accordance with a detection result from the detection unit 3005e.

The synchronization processing unit 3005b starts the synchronization process by causing the transmission unit 3013 to suspend transmission of a transmission signal, in a section of a subframe corresponding to the timing to obtain a downlink signal (synchronization process start timing), which timing has been set by the synchronization processing unit 3005b itself. While the transmission of the transmission signal is suspended, the synchronization processing unit 3005b causes the downlink signal reception unit 3012 to receive a downlink signal of another base station device, and obtains the received downlink signal. Then, using the downlink signal, the synchronization processing unit 3005b corrects its own frame timing (e.g., transmission timings of subframes) and communication frequency, and ends the synchronization process. Note that the section for which the transmission of the transmission signal is suspended may be set to a subframe corresponding to the timing to obtain the downlink signal for performing the synchronization process and to subsequent one or more subframes.

In addition to the suspension of the transmission of the transmission signal described above, suspension of reception of an uplink signal from a terminal device may be performed.

The synchronization processing unit 3005b outputs, to the resource allocation control unit 3005d and the measurement processing unit 3005c, synchronization timing information for specifying a subframe corresponding to the section for which transmission of the transmission signal is suspended.

The synchronization processing unit 3005b includes a synchronization error detection unit 3014, a frame counter correction unit 3015, a frequency offset estimation unit 3016, a frequency correction unit 3017, a memory unit 3018, and a correction control unit 3019, and has a function of performing synchronization of frame transmission timings and correcting a carrier frequency.

The synchronization error detection unit 3014 detects a frame transmission timing of another base station device by using the known signals included in a downlink signal, and detects an error (frame synchronization error; communication timing offset) between the detected frame transmission timing and a frame transmission timing of the own base station device 1.

Note that detection of a transmission timing can be performed by detecting timings of the primary synchronization channel and the secondary synchronization channel, which are known signals (waveforms thereof are also known) each existing in a predetermined position in the frame of the received downlink signal.

The synchronization error detection unit 3014 provides the detected frame synchronization error to the correction control unit 3019 and further to the memory unit 3018 each time a frame synchronization error is detected. These detected frame synchronization errors are accumulated in the memory unit 3018.

Upon obtaining a frame synchronization error from the synchronization error detection unit 3014, and an amount of data (described later) to be transmitted to an MS 2 connected to the own base station device from the detection unit 3005e, the correction control unit 3019 generates control information regarding a frame timing for correcting the frame synchronization error and provides the generated control information to the frame counter correction unit 3015. The frame counter correction unit 3015 adjusts the value of the frame counter in accordance with the control information regarding the frame timing provided by the correction control unit 3019, and corrects the frame timing in accordance with the synchronization error.

Upon obtaining the frame synchronization error and the amount of data to be transmitted to the MS 2 connected to the own base station device, the correction control unit 3019 selects, based on these, one correction method from among a plurality of types of correction methods, as a correction method of the frame timing to be performed by the frame counter correction unit 3015. Then, the correction control unit 3019 controls the frame counter correction unit 3015 to correct the frame timing in order to cancel the synchronization error using the selected correction method.

In accordance with the control information from the correction control unit 3019, the frame counter correction unit 3015 corrects the transmission timing of a subframe in the own downlink signal so as to coincide with the transmission timing of a subframe in the downlink signal of the another base station device. The correction method will be described in detail later.

[4.2.3.2 Function of Frequency Offset Estimation Unit]

Description regarding the function of the frequency offset estimation unit 3016 will be omitted since it is the same as that in [1.3.3.3 Function of frequency offset estimation unit] in the first embodiment.

[4.2.4 Measurement Processing Unit]

Description regarding the function of the measurement processing unit 3005c will be omitted since it is the same as that in [1.3.4 Measurement processing unit] in the first embodiment. In the above description, the detection unit 3005e of the present embodiment corresponds to the terminal detection unit 5e in the first embodiment.

[4.2.5 Detection Unit]

The detection unit 3005e has a function of detecting communication states of MSs 2 connected to the own base station and to another base station device.

More specifically, the detection unit 3005e detects the number of MSs 2 that are currently connected to the own base station device and to another base station device.

Note that the MSs 2 connected to the another base station device, the MSs 2 being the detection targets by the detection unit 3005e, are MSs 2 which a downlink signal of the own base station device may reach.

The detection unit 3005e obtains information of the number of the MSs 2 connected to the own base station device and an amount of data to be transmitted to these MS 2, from an upper layer of the signal processing unit 3005.

Meanwhile, the number of the MSs 2 connected to the another base station device is estimated based on the measurement result information from the measurement processing unit 3005*c*.

The measurement process is performed by receiving a downlink signal from another base station device. The another base station device, being located near the own base station device, is a base station device located within a range in which a downlink signal from the own base station device can reach the another base station device and a downlink signal from the another base station device can reach the own base station device. Accordingly, the downlink signal of the own base station device may reach an MS 2 connected to the another base station device.

Therefore, the detection unit 3005*e* can detect an MS 2 which a downlink signal of the own base station device may reach, based on the measurement result information regarding the downlink signal of the another base station device as described above.

The detection unit 3005*e* determines whether MSs 2 are connected to the another base station device, based on the average power values of the respective resource blocks included in the measurement result information, and estimates the number of MSs 2 connected to the another base station device. That is, if the another base station device is communicating with an MS 2 in its cell, user data directed to the MS 2 is allocated in its transmission signal, and the power corresponding to the portion to which such data is allocated is relatively increased compared to the power corresponding to the portion to which such data is not allocated. Accordingly, the detection unit 3005*e* can determine whether an MS 2 is connected to the another base station device, based on the reception power of the transmission signal.

When it is determined that an MS 2 is connected, it is possible to determine whether user data is allocated to each of the resource blocks. Therefore, the detection unit 3005*e* can estimate the number of MSs 2 connected to the another base station device, based on the allocation state.

The detection unit 3005*e* outputs, to the synchronization processing unit 3005*b*, the detected information regarding the number of MSs 2 connected to the own base station device and to the another base station device and the detected information regarding the amount of data to be transmitted to the MSs 2 connected to the own base station device.

[4.2.6 Resource Allocation Control Unit and Power Control Unit]

The resource allocation control unit 3005*d* has a function of allocating, in a physical downlink shared channel in a radio frame, user data to be transmitted to each terminal device 2.

When receiving the synchronization timing information and the measurement timing information, and below-described resource allocation restriction information from the correction control unit 3019, from the synchronization processing unit 3005*b* and the measurement processing unit 3005*c*, the resource allocation control unit 3005*d* restricts allocation of user data to subframes specified by these pieces of information. Further, when receiving the measurement result information from the measurement processing unit 3005*c*, the resource allocation control unit 3005*d* determines allocation of user data, based on this information.

The power control unit 3005*f* has a function of controlling transmission power of the transmission unit 3013 included in the RF unit 3004. When receiving average power values of the another base station device determined by the measurement processing unit 3005*c*, the power control unit 3005*f* adjusts the own transmission power based on the average power values, such that the own transmission signal does not interfere with the another base station device and the MSs 2 connected to the another base station device.

[4.3 Synchronization Process]

Figure 28:
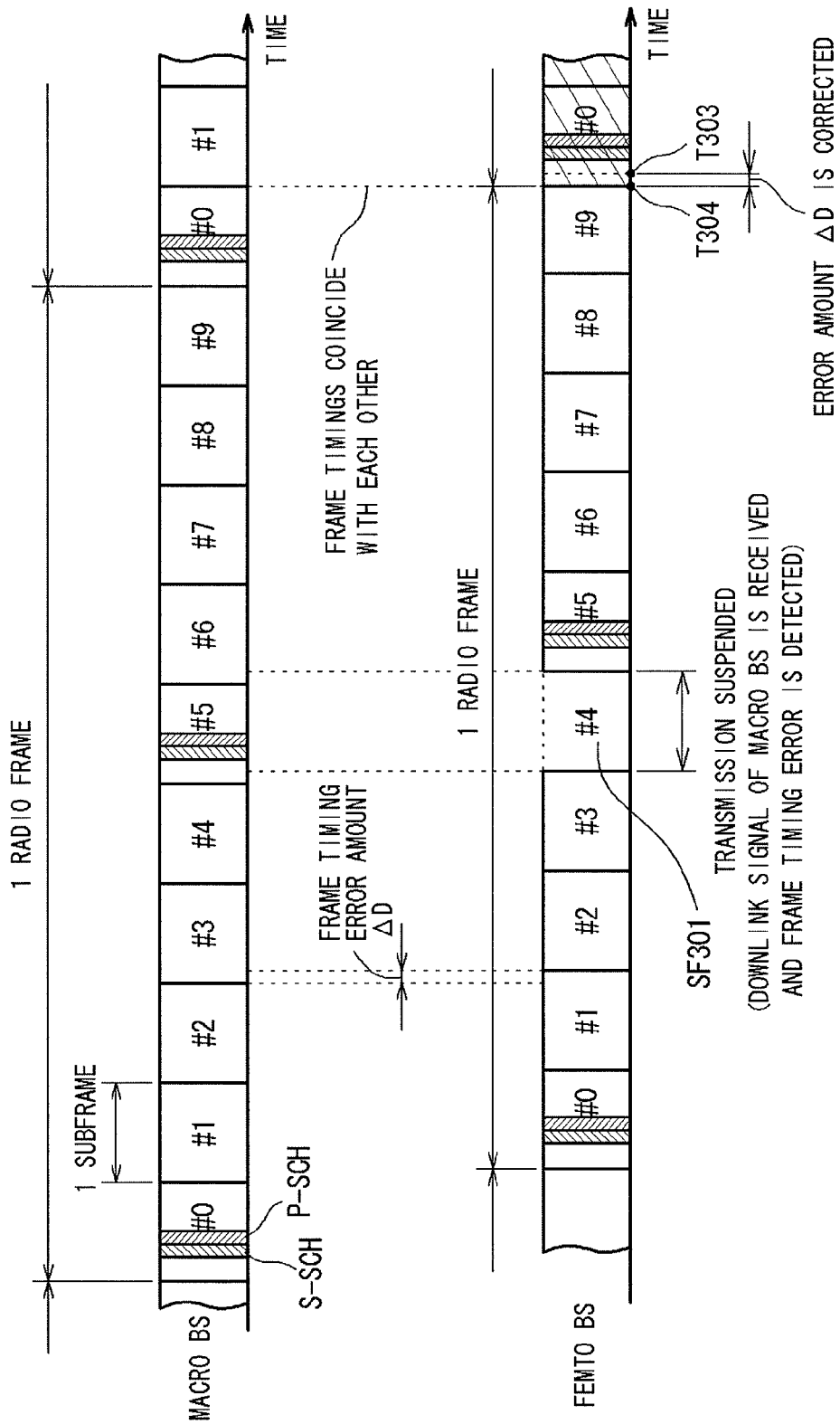
FIG. 28 is a diagram for explaining an example of a synchronization process performed by a synchronization processing unit, showing an example of correction method 1.

FIG. 28 is a diagram for explaining an example of a synchronization process performed by the synchronization processing unit. FIG. 28 shows a frame transmitted by a macro BS1*a* serving as another base station device and a frame transmitted by a femto BS1*b* serving as the own base station device on the same time axis, and shows an example in which the femto BS1*b* performs synchronization based on a downlink signal from the macro BS1*a* serving as a synchronization source.

FIG. 28 shows a state in which a synchronization error has occurred by an error amount $\Delta D$ in the subframe transmission timings of the femto BS1*b* and of the macro BS1*a*: that is, in each section before a timing T304, a timing offset has occurred between the beginning of each subframe of the femto BS1*b* and the beginning of a corresponding subframe of the macro BS1*a*.

Here, in a case where the synchronization processing unit 3005*b* of the femto BS1*b* has set, to a subframe SF301 which corresponds to the fifth subframe #4, a timing to obtain a downlink signal for performing the synchronization process, the synchronization processing unit 3005*b* outputs synchronization timing information containing information for specifying the subframe SF301 to the resource allocation control unit 3005*d* and the measurement processing unit 3005*c*. Note that the example in the drawing shows a case where the section during which transmission of a transmission signal is suspended is set to only the section of the subframe SF301 which corresponds to the timing at which the synchronization process is started.

When the radio frame is transmitted, the synchronization processing unit 3005*b* causes, at the transmission timing corresponding to the subframe SF301, the transmission unit 3013 to suspend transmission of the transmission signal and the downlink signal reception unit 3012 to receive a downlink signal of the macro BS1*a*, and obtains the received downlink signal.

Then, the synchronization processing unit 3005*b* detects the frame transmission timing of the macro BS1*a*, using the primary synchronization channel and the secondary synchronization channel contained in the obtained downlink signal of the macro BS1*a*, and detects an error amount $\Delta D$ of a frame synchronization error between the own frame transmission timing and the frame transmission timing of the macro BS1*a*.

Note that the synchronization processing unit 3005*b* can grasp, from synchronization errors obtained at previous synchronization processes accumulated in the memory unit 3018, the transmission timing of the subframe (#0 or #5) containing the primary synchronization channel and the secondary synchronization channel in the downlink signal of the macro BS1*a* serving as the another base station device. Accordingly, the synchronization processing unit 3005*b* can set the transmission signal so as to be suspended in the section of the own subframe that corresponds to that transmission timing.

Meanwhile, the resource allocation control unit 3005*d*, provided with the synchronization timing information, restricts allocation of user data of the terminal device 2 to the section of the subframe SF301. Accordingly, even if the terminal device 2 connected to the femto BS1*b* cannot communicate with the femto BS1*b* as a result of the transmission suspension of the transmission signal in this section, the terminal device 2 does not scan a base station in vain or determine that some abnormality has occurred, and thus can maintain smooth communication.

After obtaining the downlink signal of the macro BS1a as described above, the synchronization processing unit 3005b detects an error amount ΔD based on the synchronization signal contained in this downlink signal, and then corrects the frame timing of a subframe.

Here, when correcting the frame timing of a subframe, the correction control unit 3019 of the synchronization processing unit 3005b selects a correction method.

The correction control unit 3019 has stored therein three correction methods 1 to 3 as a plurality of correction methods, selects one of these three correction methods, and controls the frame counter correction unit 3015 to correct the frame timing using the selected correction method.

Hereinafter, the three correction methods will be described.

[4.4 Correction Method 1]

As shown in FIG. 28, in correction method 1, the detected error amount ΔD is corrected in one subframe. That is, after selecting correction method 1, the correction control unit 3019 first specifies a subframe whose frame timing is to be corrected, that is, a correction-target-subframe. Note that FIG. 28 shows a case in which the subframe #0 located at the beginning of a radio frame located subsequently to the radio frame in which the downlink signal has been received is specified as a correction-target-subframe.

Next, the correction control unit 3019 causes the frame counter correction unit 3015 to correct the frame timing in the correction-target-subframe.

If it is assumed that the beginning of the subframe #0 before correction is a timing T303, the frame counter correction unit 3015 adjusts the value of the frame counter such that the beginning of the subframe #0 coincides with the timing T304, which is a timing shifted from the timing T303 by the error amount ΔD in a time-advancing direction. In this manner, the transmission timing of the subframe #0 in the own downlink signal is corrected and is caused to coincide with the transmission timing of the subframe #1 in the downlink signal of the macro BS1a.

Then, the positions in the time axis direction of the subframes (radio frame) located subsequently to the corrected subframe #0 are adjusted in accordance with the timing of the corrected subframe #0, and these subframes are sequentially arranged.

In this manner, when the correction control unit 3019 has selected correction method 1, the synchronization processing unit 3005b corrects the detected error amount ΔD in one subframe, causes the frame timing of the own femto BS1b to coincide with the frame timing of the macro BS1a, and then ends the synchronization process.

Next, correction method 2 (first method) will be described.

[4.5 Correction Method 2]

Figure 29:
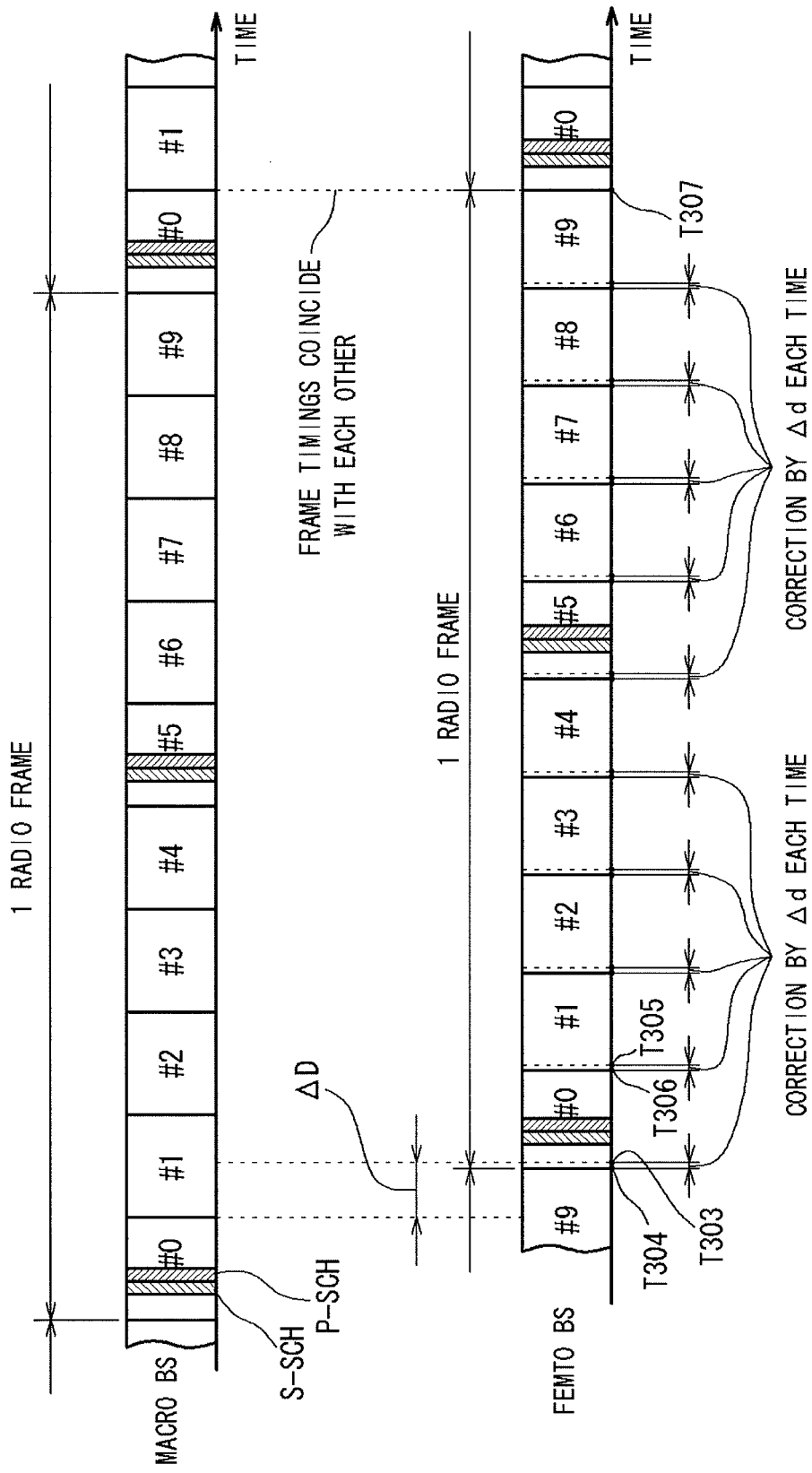
FIG. 29 is a diagram for explaining an example of correction method 2.

FIG. 29 is a diagram for explaining an example of correction method 2. Note that steps from receiving the downlink signal of the macro BS1a to obtaining an error amount ΔD of a synchronization error is the same between the correction methods 1 and 2, and is as shown in FIG. 28. FIG. 29 shows subframes after the timing T304, which are different from those in correction method 1.

As shown in FIG. 29, in correction method 2, the detected error amount ΔD is corrected by performing a plurality of times of corrections. That is, upon selecting correction method 2, the correction control unit 3019 specifies a subframe in which correction is to be started, and causes the frame counter correction unit 3015 to correct the frame timing, starting at the specified subframe. Note that FIG. 29 shows a case in which the subframe #0 located at the beginning of a radio frame located subsequently to the radio frame in which the downlink signal has been received is specified as a subframe in which the correction is to be started.

If it is assumed that the beginning of the subframe #0 before correction in which subframe correction is to be started is the timing T303, the frame counter correction unit 3015 adjusts the value of the frame counter such that the beginning of the subframe #0 coincides with the timing T304, which is a timing shifted from the timing T303 by a correction amount Δd (correction amount Δd=error amount ΔD/10) in the time-advancing direction.

Then, the frame counter correction unit 3015 adjusts the value of the frame counter such that the beginning of the subframe #1 coincides with a timing T306, which is a timing shifted by a correction amount Δd from a timing T305 which is the beginning of the subframe #1 arranged in accordance with the corrected subframe #0.

Thereafter, the frame counter correction unit 3015 corrects each subframe in the same manner, thereby performs correction of the frame timings of the subframes #0 to #9, which forms one radio frame.

That is, in order to correct the error amount AD, the frame counter correction unit 3015 divides the error amount ΔD into ten correction amounts Δd and performs correction ten times for the correction amounts Δd, and thereby causes a timing T307, which is the timing of the beginning of the next radio frame, to coincide with the transmission timing of the subframe #1 in the downlink signal of the macro BS1a.

In this manner, when the correction control unit 3019 has selected correction method 2, the synchronization processing unit 3005b divides the detected error amount ΔD into ten correction amounts and performs correction ten times for the divided correction amounts, causes the frame timing of the own femto BS1b to coincide with the frame timing of the macro BS1a, and ends the synchronization process.

In correction method 2, one error amount ΔD is divided into ten correction amounts, and correction is performed ten times for the divided correction amounts. Therefore, it is possible to reduce the correction amount for each correction, and thus, it is possible to prevent adjacent subframes from greatly overlapping each other due to the correction of the frame timing.

Next, correction method 3 (second method) will be described.

[4.6 Correction Method 3]

Figure 30:
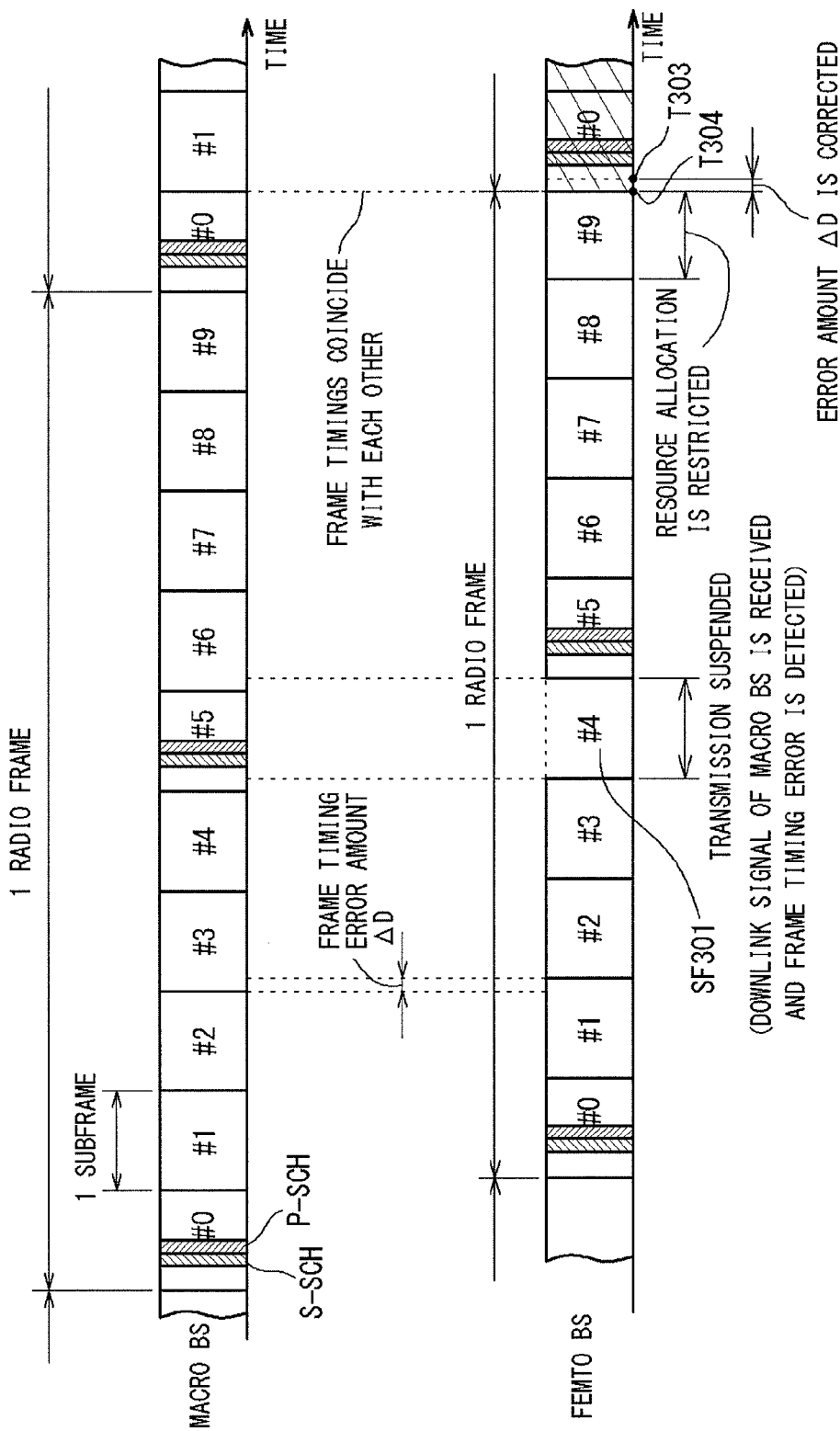
FIG. 30 is a diagram for explaining an example of correction method 3.

FIG. 30 is a diagram for explaining an example of correction method 3. Note that in correction method 3, steps from selecting a correction method to specifying a correction-target-subframe, which is a subframe whose frame timing is to be corrected, are the same as those in correction method 1. FIG. 30 shows a case in which the subframe #0 located at the beginning of a radio frame located subsequently to the radio frame in which the downlink signal has been received is specified as a correction-target-subframe.

As shown in FIG. 30, in correction method 3, the detected error amount ΔD is corrected in one subframe as in correction method 1. However, correction method 3 is different form correction method 1 in that resource allocation to the subframe #9 located before the subframe #0 serving as a correction-target-subframe is restricted, and then the frame timing is corrected in the correction-target-subframe.

Upon specifying the correction-target-subframe #0, the correction control unit 3019 further specifies the subframe #9 located before the correction-target-subframe #0, and notifies the resource allocation control unit 3005d of information for specifying the subframe #9 as resource allocation restriction information. As a result, resource allocation to the subframe #9 is restricted.

Subsequently, as in correction method 1, the frame counter correction unit 3015 corrects the error amount ΔD in the subframe #0 serving as the correction-target-subframe, causes the frame timing of the own femto BS1b to coincide with the frame timing of the macro BS1a, and then ends the synchronization process.

In correction method 3, resource allocation to the subframe located before the correction-target-subframe is restricted. Therefore, even if interference between symbols occurs by the correction-target-subframe greatly overlapping the subframe located therebefore, it is possible to prevent the MS from being influenced.

In the description of correction methods 1 to 3 above, only the synchronization of the frame timing has been described. However, correction of the carrier frequency is also performed along with the synchronization of the frame timing. The frequency correction unit 3017 performs correction of the amount of the carrier frequency error estimated by the frequency offset estimation unit 3016, in the same manner as correction methods 1 to 3.

Next, a process for selecting a correction method performed by the correction control unit 3019 will be described.

[4.7 Selection of Correction Method]

Figure 31:
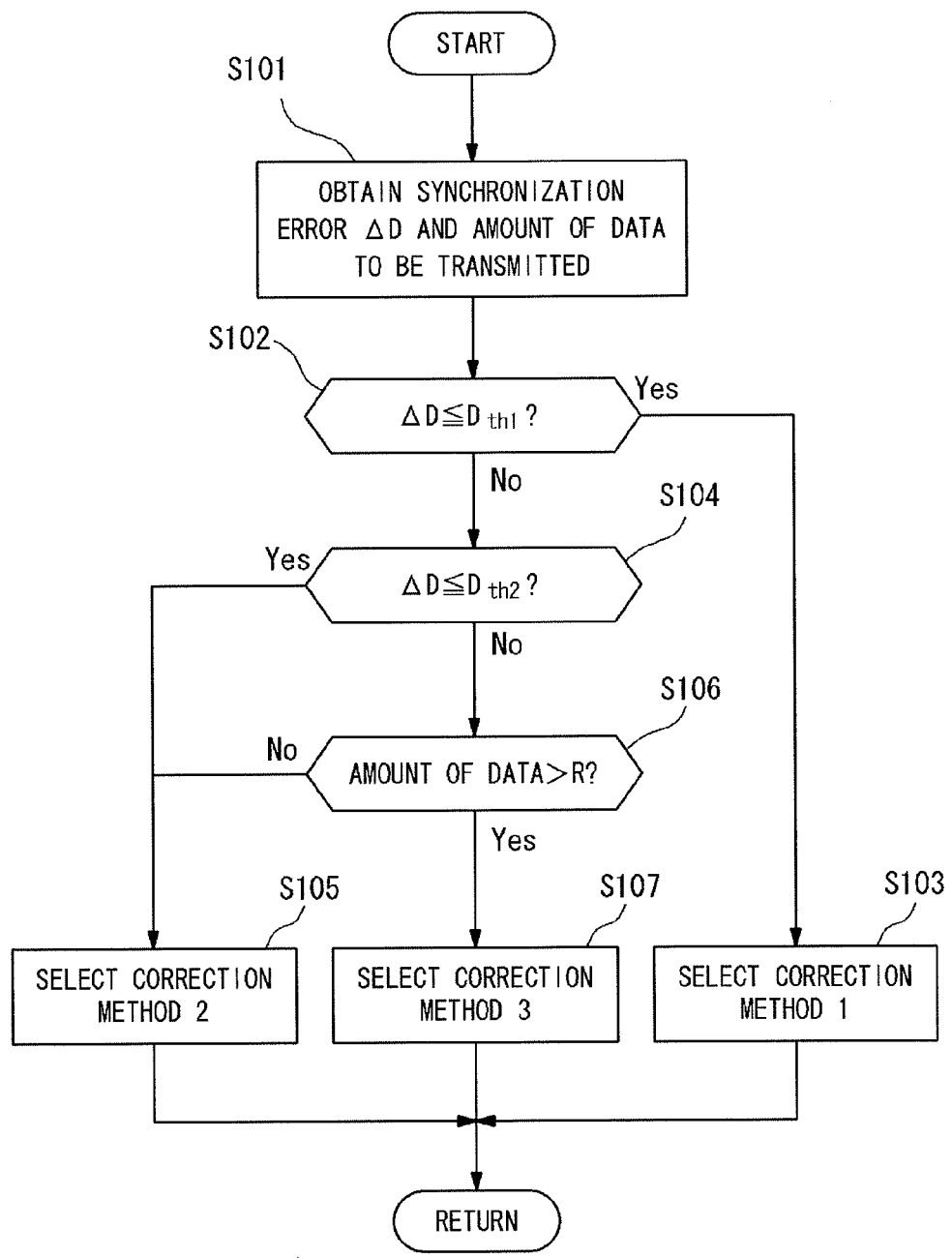
FIG. 31 is a flowchart showing an example of a process of selecting a correction method performed by a correction control unit.

FIG. 31 is a flowchart showing an example of a process of selecting a correction method performed by a correction control unit.

As shown in FIG. 31, first, the correction control unit 3019 obtains an error amount AD of a synchronization error detected by the synchronization error detection unit 3014, obtains from the detection unit 3005e an amount of data to be transmitted to an MS 2 connected to the own base station device (step S101), and then determines whether the obtained error amount AD is less than or equal to a preset threshold $D_{th1}$ (step S102).

Upon determining that the error amount ΔD is less than or equal to the threshold $D_{th1}$ in step S102, the correction control unit 3019 selects correction method 1 which corrects the error amount ΔD in one subframe (step S103), and ends the process.

Here, the threshold $D_{th1}$ is set to the time length of the CP (see FIG. 24) to be interposed between subframes. The reason is as follows. Since correction method 1 corrects the error amount ΔD in one subframe, if the error amount ΔD becomes greater than the time length $T_{cp}$ of the CP, the corrected subframe overlaps a subframe located therebefore, exceeding the CP, which may cause interference between symbols. That is, the threshold $D_{th1}$ is set to a value that allows determination of whether it is necessary to perform correction for the time length $T_{cp}$ of the CP or more in one subframe when correction method 1 has been selected.

Upon determining that the obtained error amount ΔD is not less than or equal to the threshold $D_{th1}$ in step S102, the correction control unit 3019 further determines whether the error amount ΔD is less than or equal to a preset threshold $D_{th2}$ (step S104).

Upon determining that the error amount ΔD is less than or equal to the threshold $D_{th2}$ in step S104, the correction control unit 3019 selects correction method 2 in which the error amount ΔD is corrected by performing correction for the correction amounts into which the error amount ΔD is divided (step S105), and ends the process.

Here, the threshold $D_{th2}$ is set to a time length having ten times of the time length of the CP (see FIG. 24) which is interposed between subframes. The reason is as follows. In correction method 2, the error amount ΔD is divided into ten correction amounts and correction is performed ten times for the divided correction amounts. Therefore, if the error amount AD becomes greater than the time length having ten times of the time length $T_{cp}$ of the CP, each corrected subframe overlaps the subframe located therebefore, exceeding the CP, which may cause interference between symbols. That is, the threshold $D_{th2}$ is set to a value that allows determination of whether it is necessary to perform correction for the time length $T_{cp}$ of the CP or more in one subframe when correction method 2 has been selected.

Upon determining that the error amount ΔD is not less than or equal to the threshold $D_{th2}$ in step S104, the correction control unit 3019 determines whether an amount of data to be transmitted to the MS 2 connected to the own base station device is greater than a preset threshold R (step S106).

Upon determining that the amount of data is not greater than the threshold R in step S106, the correction control unit 3019 advances to step S105, selects correction method 2 (step S105), and ends the process.

In this case, if correction by correction method 2 is performed, each corrected subframe may overlap the subframe located therebefore, exceeding the CP, which may cause interference between symbols.

Here, the threshold R is set to an amount of data that will not cause a problem even if a little overlapping occurs between adjacent subframes and interference between symbols occurs. Such interference between symbols is allowed to some extent.

On the other hand, upon determining that the amount of data is greater than the threshold R in step S106, the correction control unit 3019 selects correction method 3 (step S107) and ends the process.

When the frame timing is corrected by correction method 3, it becomes possible to correct the transmission timing of the own subframe in the range of the subframe which is located before the correction-target-subframe and in which resource allocation is restricted. Accordingly, a relatively wide correction width can be secured when performing correction of the transmission timing. Therefore, when the error amount ΔD is greater than the threshold $D_{th2}$, the correction control unit 3019 can select correction method 3.

Note that the threshold $D_{th2}$ is set in accordance with the time length $T_{cp}$ of the CP serving as a guard interval and interposed between adjacent subframes. That is, the threshold $D_{th2}$ is set to an error amount that allows determination that it is necessary to perform correction for the time length $T_{cp}$ of the CP or more in one subframe when correction method 2 has been selected. Therefore, when it is determined that it is necessary to perform correction for the time length $T_{cp}$ of the CP or more in one subframe, correction method 3 which can secure a relatively wide correction width is selected. Accordingly, the correction control unit 3019 can select an appropriate correction method depending on the error amount AD.

When selecting correction method 3, the error amount ΔD is considered in step S102, and in addition, the amount of data to be transmitted to the MS 2 is considered in step S106. That is, when it is possible to determine that the error amount ΔD of the synchronization error is relatively large because it is greater than the threshold $D_{th2}$, and that the amount of data is relatively large because it is greater than the threshold R, the correction control unit selects correction method 3 and restricts resource allocation, which can prevent interference between symbols from influencing the MS 2.

On the other hand, even in a case where the error amount ΔD of the synchronization error is greater than the threshold $D_{th2}$, when it is possible to determine that the amount of data is relatively small because it is less than or equal to the threshold R, even if interference between symbols occurs, influence on the terminal device is small. Therefore, the correction control unit 3019 can select correction method 2, which is a correction method other than correction method 3.

In this manner, in the present embodiment, the correction control unit 3019 determines whether to select correction method 3 in accordance with the amount of data to be transmitted to the MS 2, which amount of data is a detection result by the detection unit, in addition to the error amount ΔD of the synchronization error. Therefore, it is possible to perform the inter-base-station synchronization more appropriately while taking into consideration influence of the interference between symbols on the MS 2.

As described above, according to the base station device having the above configuration, the frame counter correction unit 3015 corrects the frame timing of the own downlink signal so as to coincide with the frame timing of the downlink signal of the macro BS1a, based on the synchronization error detected by the synchronization error detection unit 3014, whereby the base station device can perform the inter-base-station synchronization with the another base station device.

Moreover, since the correction control unit 3019 selects a correction method to be performed by the frame counter correction unit 3015 in accordance with the error amount ΔD of the synchronization error, it is possible to correct the frame timing of the own downlink signal using an appropriate correction method that suits the situation. Accordingly, when a correction method may cause influence of interference between symbols due to a large overlap between adjacent subframes, it is possible to select another correction method that can avoid influence of the interference between symbols. As a result, it is possible to avoid influence of interference between symbols irrespective of the magnitude of the error amount ΔD of the synchronization error, and to perform inter-base-station synchronization appropriately.

As described above, according to the base station device of the present embodiment, it is possible to perform the inter-base-station synchronization appropriately in accordance with the amount of the synchronization error.

[4.8 Timings of Synchronization Process and Measurement Process]

Figure 32:
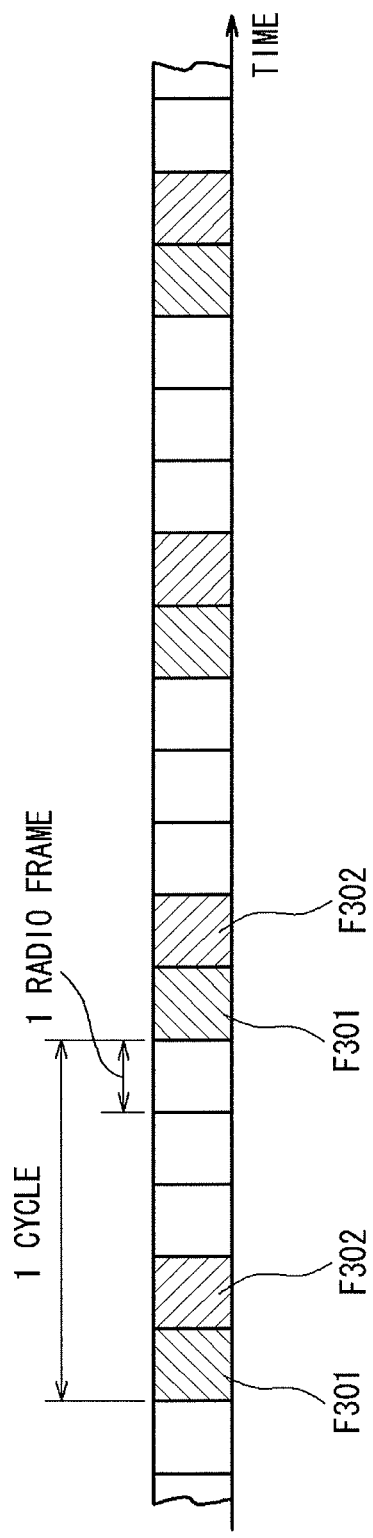
FIG. 32 is a diagram showing timings at which a synchronization process and a measurement process are performed.

FIG. 32 is a diagram showing timings at which a synchronization process and a measurement process are performed. Description regarding FIG. 32 will be omitted because it is the same as that in [1.6 Timings of synchronization process and measurement process] in the first embodiment, except that the corresponding reference numerals in the drawing are different. For the description of FIG. 32, the detection unit 3005e of the present embodiment corresponds to the terminal detection unit 5e in the first embodiment.

[4.9 Modification of the Fourth Embodiment]

In the above embodiment, an exemplary case has been described in which the normal cyclic prefix is adopted for the CP interposed between slots constituting a radio frame of a downlink signal of a base station device. However, the above embodiment can be applied also to the case where an extended cyclic prefix is adopted. In this case, the throughput is slightly reduced due to a reduction of the number of symbols constituting a slot. However, since the time length $T_{cp}$ of the CP is set to a longer time length, a correction amount for the frame timing in each correction method can be set to a greater value, which allows correction of a greater synchronization error.

In correction method 2 of the above embodiment, an exemplary case has been described in which an error amount ΔD of the synchronization error is divided into ten correction amounts and correction is performed ten times for the divided correction amounts. However, it is sufficient that the number of times of corrections to be performed is more than one, and for example, the number of times of corrections may be set to two, or a greater number. Further, the number of times of corrections needs not to be a fixed value, and the number of times of corrections may be set as appropriate in accordance with the error amount ΔD.

However, if the number of times of corrections is increased, since correction of the transmission timing of the subframe is performed in accordance with the increased number of times, the time from the detection of the synchronization error till the end of the correction is extended, which may result in reduced synchronization accuracy. Therefore, it is preferable that the upper limit of the number of times of corrections is such as the number of times of corrections that can be performed within one radio frame (about ten times when correction is performed in units of subframes).

In correction method 3 of the above embodiment, resource allocation is restricted for the subframe located before the correction-target-subframe. The transmission of the downlink signal may be suspended at the timing of this subframe for which the resource allocation is restricted.

In this case, even if the correction-target-subframe is corrected in the range of the section corresponding to the time length of the subframe located before the correction-target-subframe, since the transmission of the downlink signal is suspended for that section, interference between symbols does not occur. Moreover, since resource allocation is restricted in this section, it is possible to suppress influence on the MS 2 due to the suspension of the transmission.

In the above embodiment, an exemplary case has been described in which, in each correction method, correction of the frame timing is performed or started in the first subframe #0 located at the beginning of a radio frame. However, correction of the frame timing may be performed or started in another subframe.

In the above embodiment, an exemplary case has been described in which inter-base-station synchronization is performed such that the subframe #0 or the subframe #5 containing the primary and the secondary synchronization channels in the own downlink signal coincides with the transmission timing of the subframe #1 in the downlink signal of the macro BS1a. However, inter-base-station synchronization may be performed such that the subframe #0 or the subframe #5 of the own downlink signal coincides with the transmission timing of one of the other subframes #0, #2 to 9 in the downlink signal of the macro BS1a.

In the above embodiment, an exemplary case has been described in which a subframe is used as a communication unit area having a certain time length, which serves as a target of the synchronization process. However, another unit forming a downlink signal, such as a radio frame or a slot, or a section defined by symbols, may be used as the communication unit area serving as a target of the synchronization process.

5. Fifth Embodiment

Figure 41:
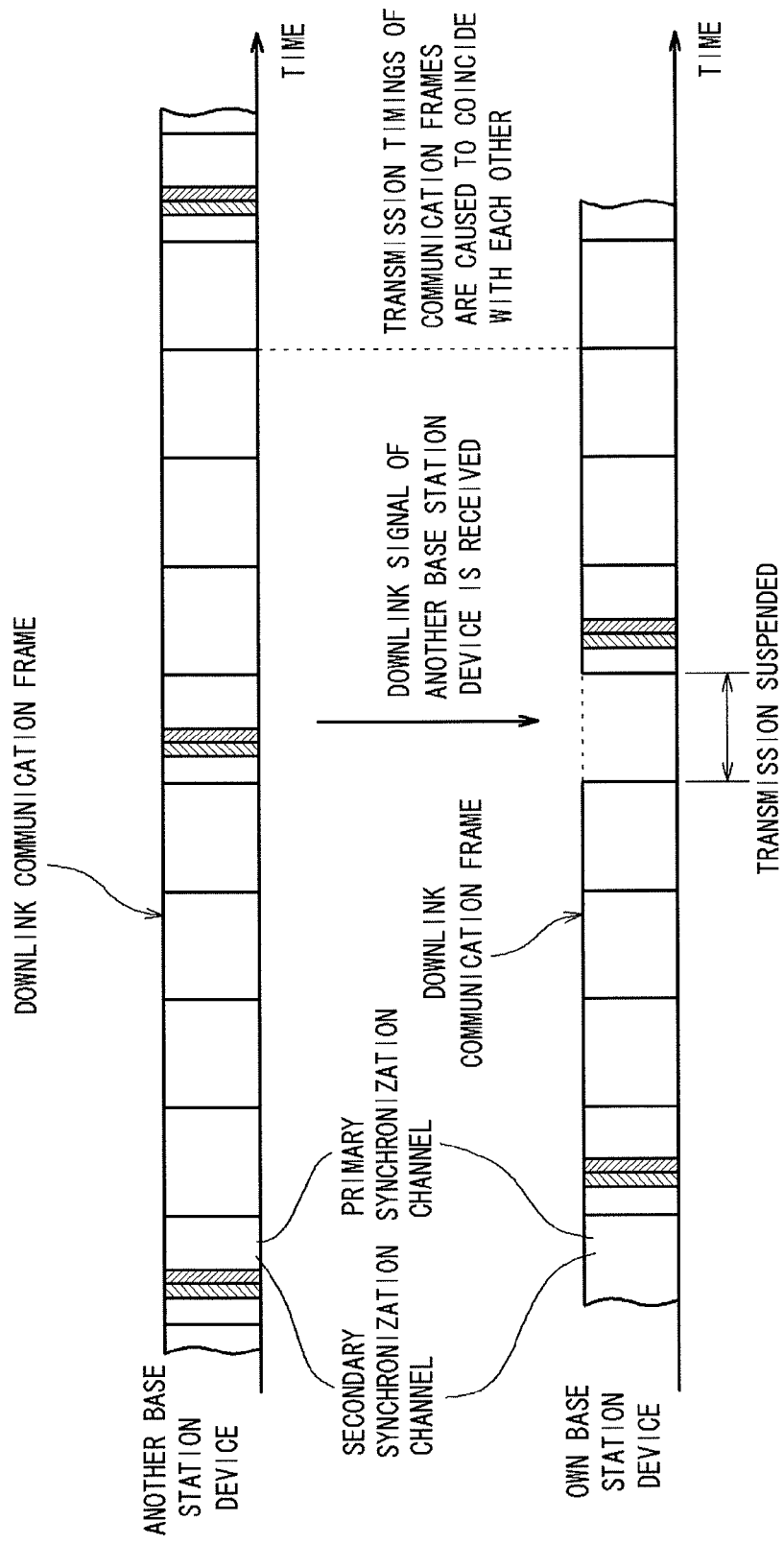
FIG. 41 is a diagram for explaining an example of a synchronization process that can be adopted in a base station device.

In a communication frame of a downlink signal in the frequency division duplex system, as shown in FIG. 41, a primary synchronization channel and a secondary synchronization channel used by a terminal device to scan a base station device, to identify the base station device, and the like, are arranged in a constant cycle. Since these synchronization signals are known signals, it is conceivable to cause a base station device attempting to achieve inter-base-station synchronization with another base station device that will serve as a synchronization source to utilize the synchronization signals contained in a downlink signal transmitted by the another base station device and thus to cause the transmission timings of the communication frames to coincide with each other, thereby achieving inter-base-station synchronization.

Here, there are cases in which a base station device adopting the frequency division duplex system performs cooperative transmission in which the base station device simultaneously transmits identical information to terminal devices, with a plurality of base station devices such as other base station devices. The cooperative transmission from a plurality of locations is performed in order to, for example, reduce interference between cells, at the peripheries of the communication areas (peripheries of cells), or to secure the strength of signals transmitted to terminal devices located at the peripheries of cells.

When the above cooperative transmission is performed, if the transmission timings of the communication frames between the plurality of base station devices are shifted from each other, interference between the identical signals transmitted by the plurality of base station devices becomes large for a terminal device receiving them, and thus, the signals cannot be transmitted appropriately to the terminal device.

In contrast, if the above inter-base-station synchronization is performed, it is possible to cause the transmission timings of the communication frames to coincide with each other among the plurality of base station devices.

Meanwhile, as shown in FIG. 41, even in a case where synchronization has been achieved in terms of the transmission timings of communication frames, if the positions in the time axis direction of communication frames that each contain both synchronization signals are shifted from each other, the transmission timings of the synchronization signals may be shifted between the base station devices.

There are cases where both synchronization signals are used as a reference for specifying the position of a communication frame when allocating transmission data to the communication frame. Therefore, if base station devices attempt to simultaneously transmit identical information in a state in which the transmission timings of communication frames coincide with each other but the positions of communication frames each containing both synchronization signals are shifted from each other, each base station device may have to individually adjust allocation of the information to be transmitted to its communication frame. This may results in troublesome processes of the cooperative transmission.

Hereinafter, in a fifth embodiment, description will be given of a base station device that performs communication in the frequency division duplex and that can perform inter-base-station synchronization while making cooperative transmission easily available.

Note that the configuration of the communication system and the frame structure for LTE in the present embodiment are similar to those described in [1.1 Configuration of communication system] and [1.2. Frame structure for LTE] in the first embodiment.

[5.1 Configuration of Femto Base Station Device]

Figure 34:
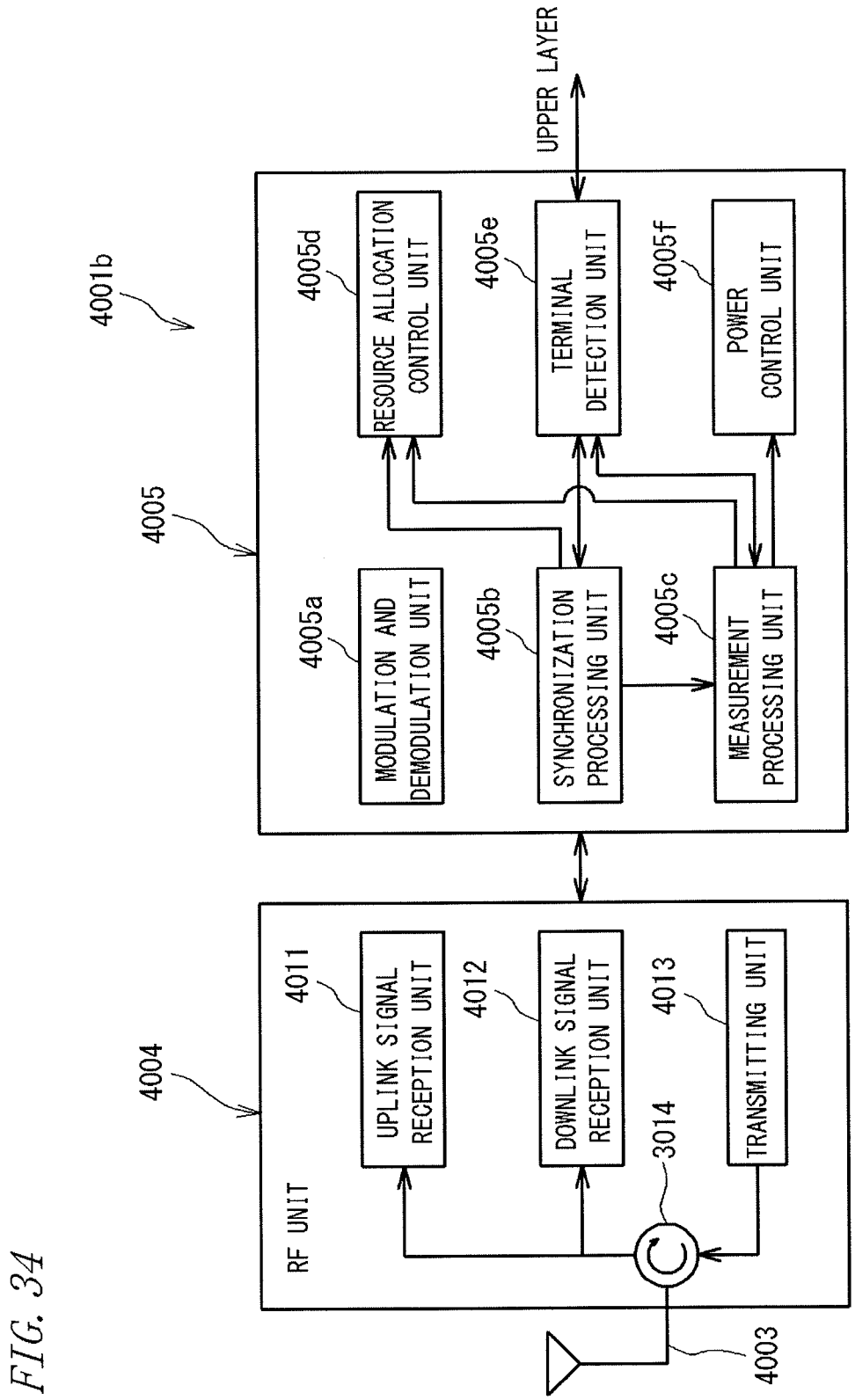
FIG. 34 is a block diagram showing a configuration of a femto base station device according to a fifth embodiment.

FIG. 34 is a block diagram showing a configuration of a femto base station device according to the fifth embodiment. Although the configuration of the femto BS1*b* will be described here, the configuration of a macro BS1*a* is substantially the same as that of the femto BS1*b*.

A femto BS1*b*1 includes an antenna 4003, a transmission/reception unit (RF unit) 4004 to which the antenna 4003 is connected, and a signal processing unit 4005 which performs signal processing of transmission and reception signals transmitted to and received from the RF unit 4004, processing regarding inter-base-station synchronization, measurement, and the like.

[5.1.1 RF Unit]

Figure 35:
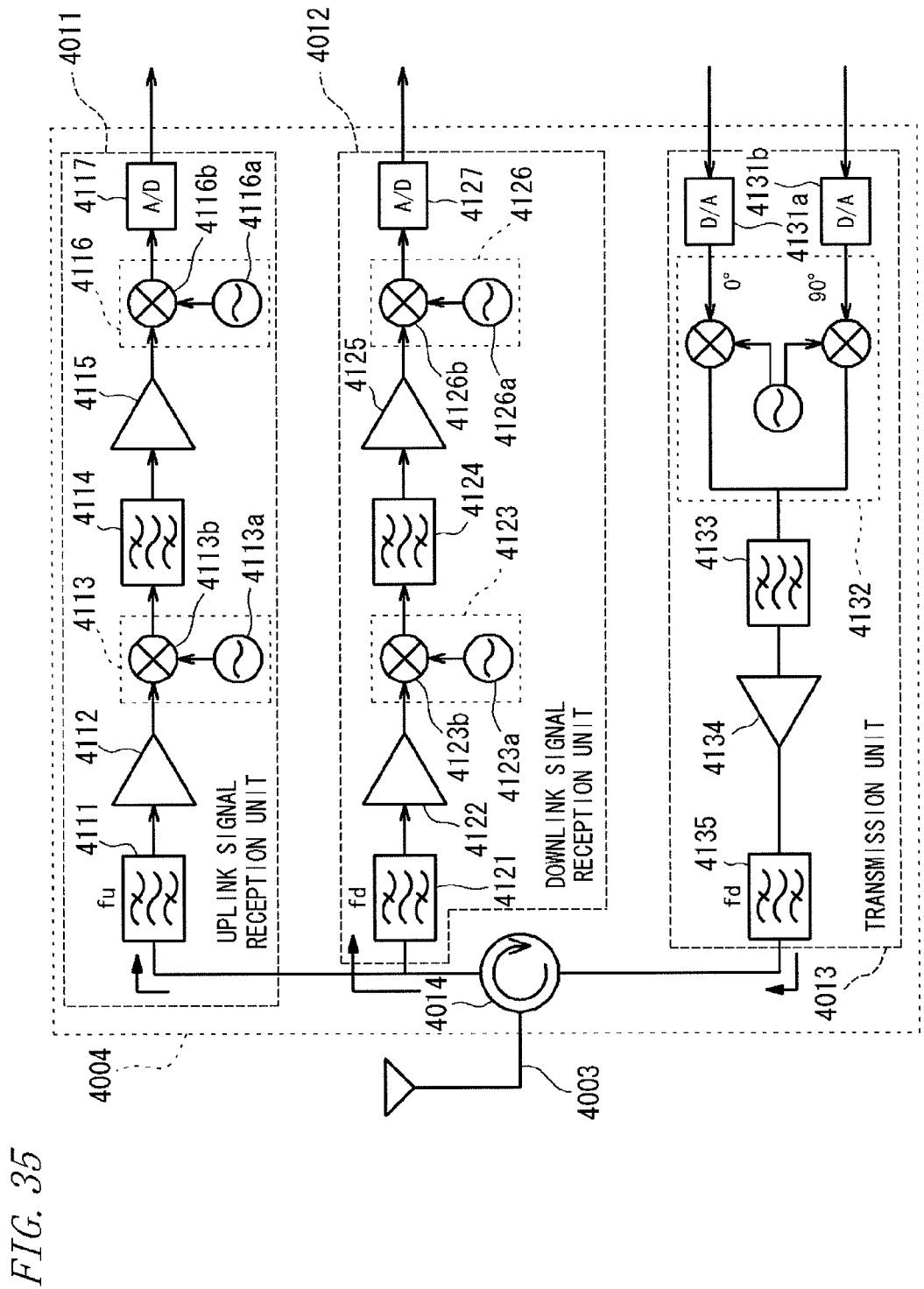
FIG. 35 is a block diagram showing in detail an RF unit.

FIG. 35 is a block diagram showing in detail the RF unit 4004. The RF unit 4004 includes an uplink signal reception unit 4011, a downlink signal reception unit 4012, and a transmission unit 4013. The uplink signal reception unit 4011 receives an uplink signal from the terminal device 2, and the downlink signal reception unit 4012 receives a downlink signal from another macro BS1*a* or another femto BS1*b*. The transmission unit 4013 transmits a downlink signal to the terminal device 2.

Description regarding FIG. 35 will be omitted since it is the same as that in [1.3.1 RF unit] in the first embodiment, except that the corresponding reference numerals in FIG. 35 are different.

[5.1.2 Signal Processing Unit]

With reference to FIG. 34, the signal processing unit 4005 has a function of performing signal processing on transmission and reception signals transmitted to and received from the RF unit 4004, and includes a modulation/demodulation unit 4005*a* which modulates various transmission data provided by an upper layer of the signal processing unit 4005 into a transmission signal and demodulates a reception signal provided by the RF unit 4004 into reception data. The modulation/demodulation unit 4005*a* performs processes of modulation and demodulation, with a synchronization error corrected based on a synchronization error (timing offset, frequency offset) calculated by the synchronization processing unit 4005*b* described below.

Further, the signal processing unit 4005 includes a frame counter (not shown) for determining a transmission timing of each radio frame of a transmission signal to be provided to the RF unit 4004.

Further, the signal processing unit 4005 includes a resource allocation control unit 4005*d*, and a terminal detection unit 4005*e* for detecting a communication state of a terminal device connected to the own base station device and to another base station device, in addition to the synchronization processing unit 4005*b* for performing a synchronization process in which inter-base-station synchronization is achieved with another base station device, and the measurement processing unit 4005*c* for performing measurement.

Hereinafter, a configuration of the synchronization processing unit 4005*b* will be described.

[5.1.3 Synchronization Processing Unit]

[5.1.3.1 Function and configuration of synchronization processing unit]

Figure 36:
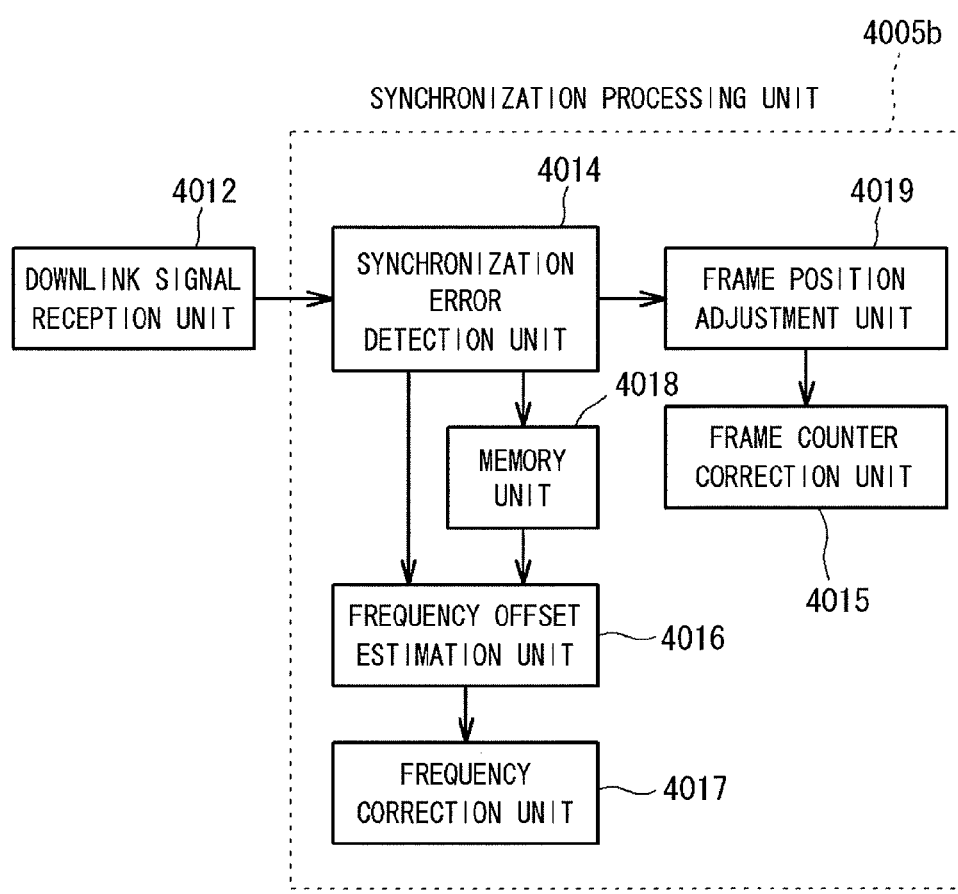
FIG. 36 is a block diagram showing a configuration of a synchronization processing unit for performing a synchronization process in which inter-base-station synchronization is achieved with another base station device.

FIG. 36 is a block diagram showing a configuration of the synchronization processing unit 4005*b* for performing a synchronization process in which inter-base-station synchronization is achieved with another base station device.

Such inter-base-station synchronization may be performed by providing each of the base station devices with a GPS receiver so that the base station device can achieve synchronization by using GPS signals, or by connecting the base station devices via a cable. However, the present embodiment adopts inter-base-station synchronization based on "over-the-air synchronization" in which synchronization is achieved by using radio signals (downlink signals).

Specifically, the synchronization processing unit 4005*b* obtains a downlink signal from another base station device received by the downlink signal reception unit 4012, and performs a synchronization process of synchronizing the communication timing and the communication frequency of the own base station device 1 with those of another base station device, based on a primary synchronization channel (P-SCH) and a secondary synchronization channel (S-SCH) which are known signals included in a radio frame of the downlink signal.

The synchronization processing unit 4005b sets, in units of subframes, a timing to obtain a downlink signal from another base station device provided by the downlink signal reception unit 4012 such that the above synchronization process is performed in a predetermined cycle.

Moreover, the synchronization processing unit 4005b has a function of adjusting the timing to perform a synchronization process, by adjusting the cycle of the timing to obtain the downlink signal for the synchronization process, in accordance with a detection result from the terminal detection unit 4005e.

The synchronization processing unit 4005b starts the synchronization process by causing the transmission unit 4013 to suspend transmission of a transmission signal, in a section of a subframe corresponding to the timing to obtain a downlink signal (synchronization process start timing), which timing has been set by the synchronization processing unit 4005b itself. While the transmission of the transmission signal is suspended, the synchronization processing unit 4005b causes the downlink signal reception unit 4012 to receive a downlink signal of another base station device, and obtains the received downlink signal. Then, using the downlink signal, the synchronization processing unit 4005b corrects its own frame timing and communication frequency, and ends the synchronization process. Note that the section for which the transmission of the transmission signal is suspended may be set to a subframe corresponding to the timing to obtain the downlink signal for performing the synchronization process and to subsequent one or more subframes.

In addition to the suspension of the transmission of the transmission signal described above, suspension of reception of an uplink signal from a terminal device may be performed.

The synchronization processing unit 4005b outputs, to the resource allocation control unit 4005d and the measurement processing unit 4005c, synchronization timing information for specifying a subframe corresponding to the section for which transmission of the transmission signal is suspended.

The synchronization processing unit 4005b includes a synchronization error detection unit 4014, a frame counter correction unit 4015, a frequency offset estimation unit 4016, a frequency correction unit 4017, a memory unit 4018, and a frame position adjustment unit 4019, and has a function of performing synchronization of frame transmission timings and correcting a carrier frequency.

The synchronization error detection unit 4014 detects a frame transmission timing of another base station device by using the known signals included in a downlink signal, and detects an error (frame synchronization error; communication timing offset) between the detected frame transmission timing and a frame transmission timing of the own base station device 1.

Note that detection of a transmission timing can be performed by detecting timings of the primary synchronization channel and the secondary synchronization channel, which are known signals (waveforms thereof are also known) each existing in a predetermined position in the frame of the received downlink signal.

The synchronization error detection unit 4014 provides the detected frame synchronization error to the frame position adjustment unit 4019 and further to the memory unit 4018 each time a frame synchronization error is detected. These detected frame synchronization errors are accumulated in the memory unit 4018.

Upon receiving a frame synchronization error from the synchronization error detection unit 4014, the frame position adjustment unit 4019 generates control information regarding a frame timing for correcting the frame synchronization error and adjusting the position of the own radio frame in the time axis direction, and provides the generated control information to the frame counter correction unit 4015.

The frame counter correction unit 4015 adjusts the value of the frame counter in accordance with the control information regarding the frame timing provided by the frame position adjustment unit 4019, and corrects the frame timing in accordance with the synchronization error.

The frame position adjustment unit 4019 can know (the transmission timing of) the subframe containing the primary synchronization channel and the secondary synchronization channel of the downlink signal from the another base station device, based on the synchronization error detected by the synchronization error detection unit 4014.

The frame position adjustment unit 4019 causes the frame counter correction unit 4015 to perform correction such that the timings of the own synchronization signals coincide with the timings of the primary and the secondary synchronization channels of the another base station device, and thereby performs adjustment such that transmission timings of the first subframe #0 and the sixth subframe #5, in the own radio frame, to each of which subframes the primary and the secondary synchronization channels are allocated, coincide with transmission timings of the first subframe #0 or the sixth subframe #5, in the radio frame of the downlink signal from the another base station device serving as a synchronization source, to each of which subframes the primary and the secondary synchronization channels are allocated.

Specifically, the frame position adjustment unit 4019 causes the frame counter correction unit 4015 to perform correction such that the synchronization error detected by the synchronization error detection unit 4014 is canceled.

Since the synchronization error detection unit 4014 has detected the synchronization error based on the primary and the secondary synchronization channels, the timings of the primary and the secondary synchronization channels of the own radio frame are corrected so as to coincide with those of the primary and the secondary synchronization channels of the another base station device. In addition, the transmission timings of the first subframe #0 and the sixth subframe #5, in the own radio frame, to each of which subframes the primary and the secondary synchronization channels are allocated, are corrected so as to coincide with the transmission timings of the first subframe #0 or the sixth subframe #5 in the radio frame of the downlink signal from the another base station device.

As described above, the frame position adjustment unit 4019 and the frame counter correction unit 4015 perform inter-base-station synchronization by causing the transmission timing of a subframe, as a transmission timing of the own downlink signal, to coincide with that of another base station device, such that the transmission timings of both synchronization signals in the own downlink signal coincide with the transmission timings of both synchronization signals in a downlink signal of the another base station device.

Further, by controlling the frame counter correction unit 4015 as described above, the frame position adjustment unit 4019 has a function of adjusting the position of the own radio frame in the time axis direction, relative to a radio frame of the downlink signal from the another base station device.

Further, also at the time of activating the own femto BS1b and starting transmission of the own downlink signal, the frame position adjustment unit 4019 causes the frame counter correction unit 4015 to perform correction such that: the transmission timings of the first subframe #0 and the sixth subframe #5, in the own radio frame, to each of which subframes the primary and the secondary synchronization channels are allocated, coincide with the transmission timings of the first subframe #0 or the sixth subframe #5 in a radio frame of the downlink signal from the another base station device serving as a synchronization source, to each of which subframes the primary and the secondary synchronization channels are allocated, whereby the frame position adjustment unit 4019 adjusts the position of the own radio frame.

That is, when a downlink signal of the another base station device is received by the downlink signal reception unit 4012 at the activation of the own femto BS1*b*, the frame position adjustment unit 4019 adjusts the position of the own radio frame relative to the radio frame of the downlink signal of the another base station device as described above.

Accordingly, the own femto BS1*b* can transmit the own downlink signal in the radio frame adjusted in accordance with the radio frame of the downlink signal of the another base station device, from the time of activation of the own femto BS1*b* and of the start of transmission of the own downlink signal.

[5.1.3.2 Function of Frequency Offset Estimation Unit]

Description regarding the function of the frequency offset estimation unit 4016 will be omitted because it is the same as that in [1.3.3.3 Function of frequency offset estimation unit] in the first embodiment.

[5.1.4 Measurement Processing Unit]

Description regarding the function of the measurement processing unit 4005*c* will be omitted because it is the same as that in [1.3.4 Measurement processing unit] in the first embodiment.

[5.1.5 Terminal Detection Unit]

Description regarding the function of the terminal detection unit 4005*e* will be omitted because it is the same as that in [1.3.5 Terminal detection unit] in the first embodiment.

[5.1.6 Resource Allocation Control Unit and Power Control Unit]

The resource allocation control unit 4005*d* has a function of allocating, in a physical downlink shared channel in a radio frame, user data to be transmitted to each terminal device 2.

When receiving the synchronization timing information and the measurement timing information from the synchronization processing unit 4005*b* and the measurement processing unit 4005*c*, respectively, the resource allocation control unit 4005*d* restricts allocation of user data to subframes specified by these pieces of information. Further, when receiving the measurement result information from the measurement processing unit 4005*c*, the resource allocation control unit 4005*d* determines allocation of user data, based on this information.

Further, the resource allocation control unit 4005*d* also has a function regarding a process of resource allocation for performing cooperative transmission with another base station device.

The power control unit 4005*f* has a function of controlling transmission power of the transmission unit 4013 included in the RF unit 4004. When receiving average power values of the another base station device determined by the measurement processing unit 4005*c*, the power control unit 4005*f* adjusts the own transmission power based on the average power values, such that the own transmission signal does not interfere with the another base station device and the MSs 2 connected to the another base station device.

[5.2 Synchronization Process]

Figure 37:
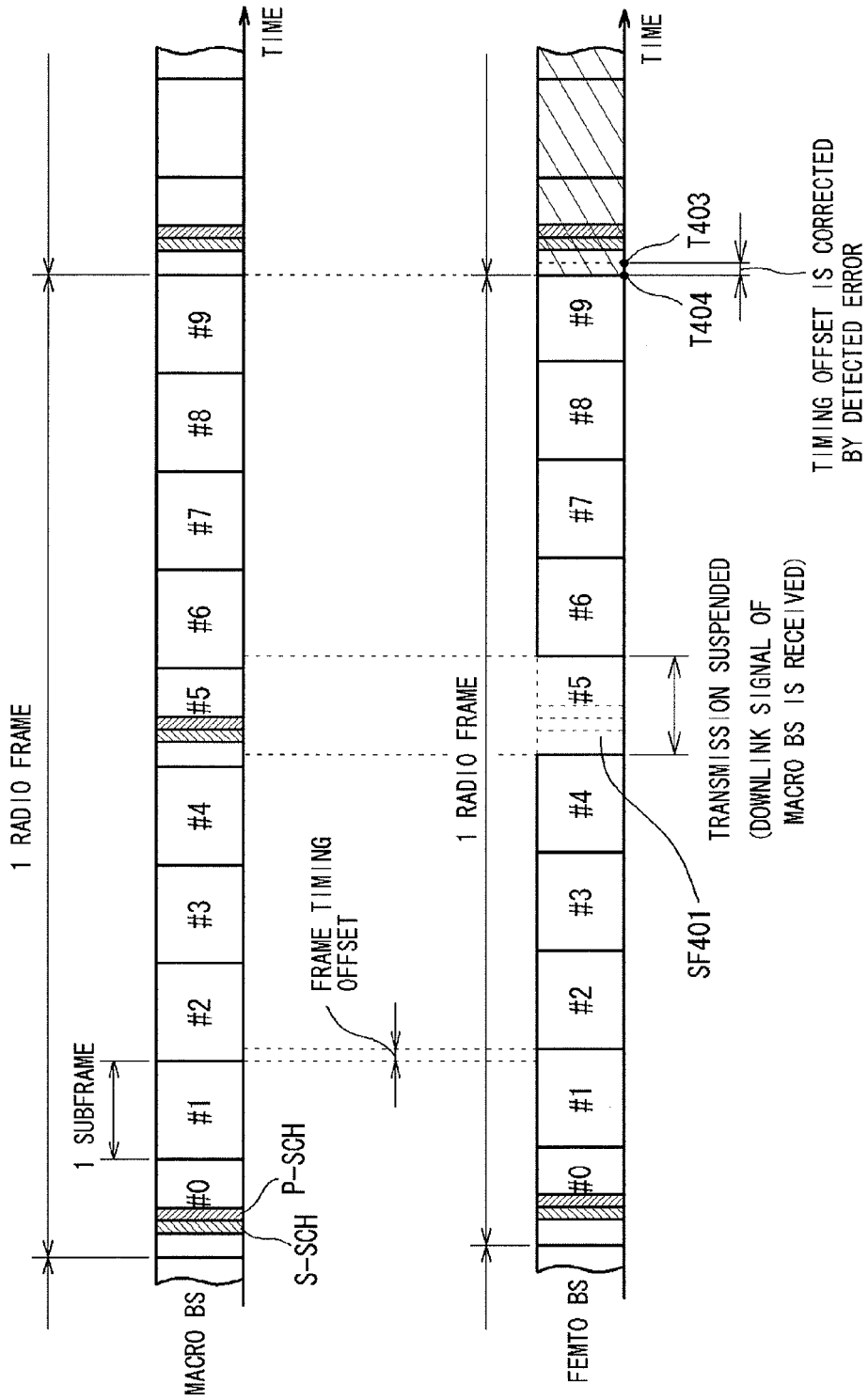
FIG. 37 is a diagram for explaining an example of a synchronization process performed by a synchronization processing unit.

FIG. 37 is a diagram for explaining an example of a synchronization process performed by the synchronization processing unit. FIG. 37 shows a frame transmitted by a macro BS1*a* serving as another base station device and a frame transmitted by a femto BS1*b* serving as the own base station device on the same time axis, and shows an example in which the femto BS1*b* performs synchronization based on a downlink signal from the macro BS1*a* serving as a synchronization source.

FIG. 37 shows a state in which an offset in the frame transmission timings has occurred: that is, in each section before a timing T404, the transmission timing of the radio frame of the femto BS1*b* substantially coincides with the corresponding transmission timing of the radio frame of the macro BS1*a*, and a timing offset has occurred between the beginning of each subframe of the femto BS1*b* and the beginning of a corresponding subframe of the macro BS1*a*.

As described above, the synchronization processing unit 4005*b* of the femto BS1*b* of the present embodiment has a function of adjusting the position of the own radio frame when receiving, at the time of activation of the femto BS1*b*, a downlink signal of a macro BS1*a* serving as another base station device, such that: the transmission timings of the primary and the secondary synchronization channels in the own downlink signal coincide with the transmission timings of the primary and the secondary synchronization channels in the downlink signal of the another base station device; and the transmission timings of the first subframe #0 and the sixth subframe #5, in the own radio frame, to each of which subframes the primary and the secondary synchronization channels are allocated, coincide with the transmission timings of the first subframe #0 or the sixth subframe #5, in the radio frame of the downlink signal from the another base station device serving as a synchronization source, to each of which subframes the primary and the secondary synchronization channels are allocated.

For example, it is assumed that at the time of activation of the femto BS1*b*, the synchronization processing unit 4005*b* has adjusted the position of the own radio frame, such that the transmission timing of the own radio frame (transmission timing of the first subframe #0) coincides with the transmission timing of the first subframe #0 of the macro BS1*a* which is the another base station device serving as the synchronization source.

Further, also in the synchronization process performed between the base stations as appropriate thereafter, the synchronization processing unit 4005*b* performs the synchronization process such that the transmission timing of the own radio frame (transmission timing of the first subframe #0) coincides with the transmission timing of the first subframe #0 of the macro BS1*a* serving as the another base station device.

In this manner, as shown in FIG. 37, the transmission timings of the primary and the secondary synchronization channels in the downlink signal in the own base station device coincide with the transmission timings of the primary and the secondary synchronization channels in the downlink signal of the another base station device, and the transmission timing of the radio frame of the femto BS1*b* substantially coincides with the transmission timing of the corresponding radio frame of the macro BS1*a*.

Here, in a case where the synchronization processing unit 4005*b* of the femto BS1*b* has set, to a subframe SF401, a timing to obtain a downlink signal for the synchronization process, the synchronization processing unit 4005*b* outputs synchronization timing information containing information for specifying the subframe SF401, to the resource allocation control unit 4005*d* and the measurement processing unit 4005*c*. Note that the example in the drawing shows a case where the section during which transmission of a transmission signal is suspended is set to only the section of the subframe SF401 which corresponds to the timing at which the synchronization process is started.

When the radio frame is transmitted, the synchronization processing unit 4005*b* causes, at the transmission timing corresponding to the subframe SF401, the transmission unit 4013 to suspend transmission of the transmission signal and the downlink signal reception unit 4012 to receive a downlink signal of the macro BS1*a*, and obtains the received downlink signal.

Then, the synchronization processing unit 4005*b* detects the frame transmission timing of the macro BS1*a*, using the primary synchronization channel and the secondary synchronization channel contained in the received downlink signal of the macro BS1*a*, and detects a frame synchronization error between the own frame transmission timing and the frame transmission timing of the macro BS1*a*.

Note that the synchronization processing unit 4005*b* can grasp, from synchronization errors obtained at previous synchronization processes accumulated in the memory unit 4018, the transmission timing of the subframe (#0 or #5) containing the primary synchronization channel and the secondary synchronization channel in the downlink signal of the macro BS1*a* serving as the another base station device. Accordingly, the synchronization processing unit 4005*b* can set the transmission signal so as to be suspended in the section of the own subframe that corresponds to that transmission timing.

Based on the detected frame synchronization error, the synchronization processing unit 4005*b* achieves synchronization by correcting the timing of the beginning of a radio frame subsequent to the radio frame to which the subframe SF401 belongs. For example, if it is assumed that the beginning of the radio frame before synchronization is performed is a timing T403, the synchronization processing unit 4005*b* corrects the value of the frame counter such that the beginning of the radio frame coincides with the timing T404, which is a timing shifted from the timing T403 by an amount of the above error. Accordingly, it is possible to cause the frame timing of the own femto BS1*b* to coincide with the frame timing of the macro BS1*a*, whereby synchronization can be achieved.

Note that, in the above case, since the timing of the radio frame of the femto BS1*b* has already substantially coincided with that of the corresponding radio frame of the macro BS1*a*, the synchronization processing unit 4005*b* achieves synchronization with reference to the current frame position.

Although only the synchronization of the frame timing has been described in the above, correction of the carrier frequency is also performed in a similar manner.

In the above configuration, the synchronization processing unit 4005*b* performs the synchronization process with the another base station device, by causing the transmission timing of the own radio frame to coincide with the transmission timing of the radio frame of the another base station device such that the transmission timings of the primary and the secondary signals of the own downlink signal coincide with the transmission timings of the primary and the secondary signals in the downlink signal of the another base station device. Accordingly, also in the case where the cooperative transmission is performed with the another base station device, it becomes easy for each base station device to allocate, to a radio frame at an identical timing, information that should be simultaneously transmitted. As a result, inter-base-station synchronization can be performed while making the cooperative transmission easily available.

[5.3 Measurement Process]

Figure 38:
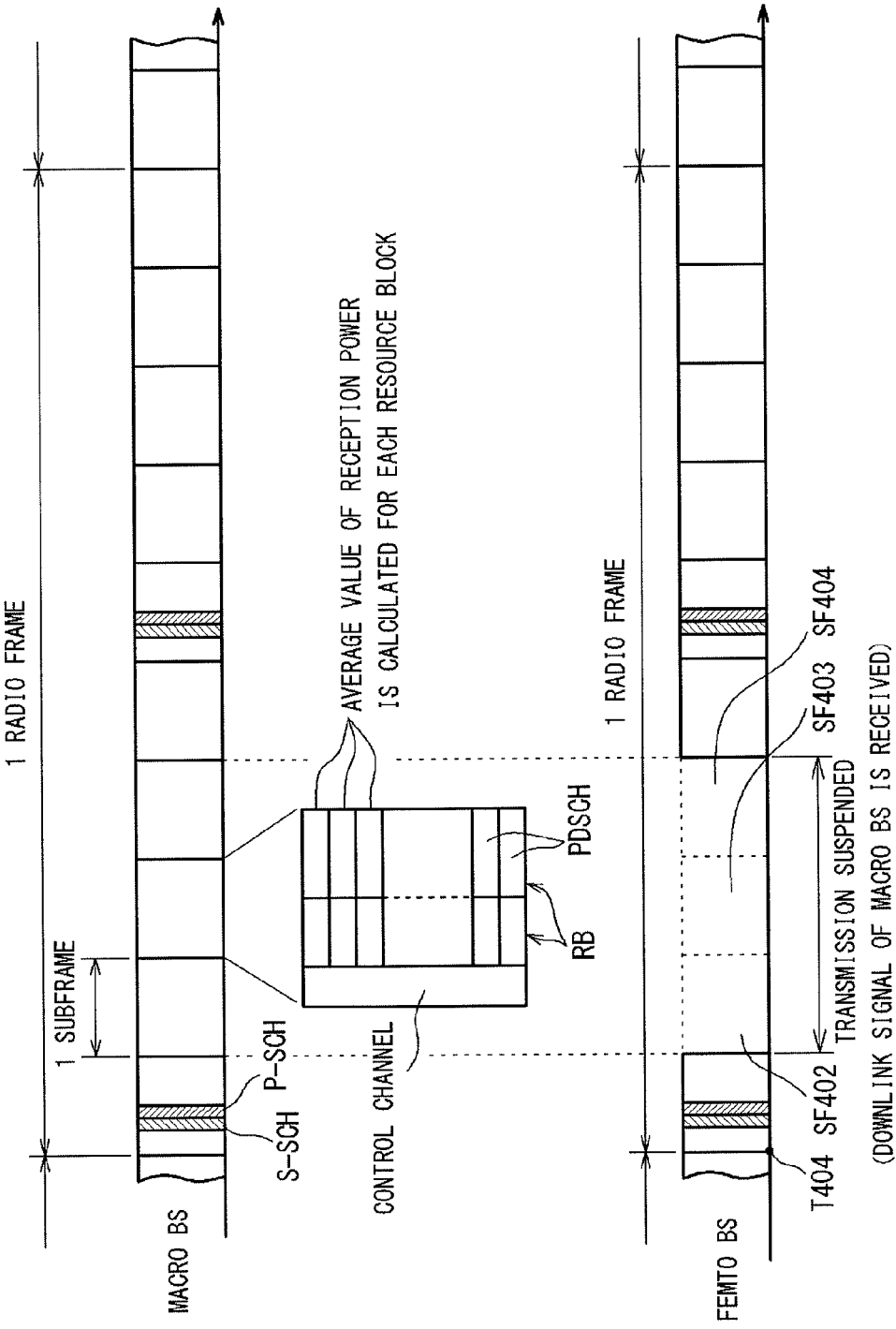
FIG. 38 is a diagram for explaining an example of a measurement process performed by a measurement processing unit.
Figure 39:
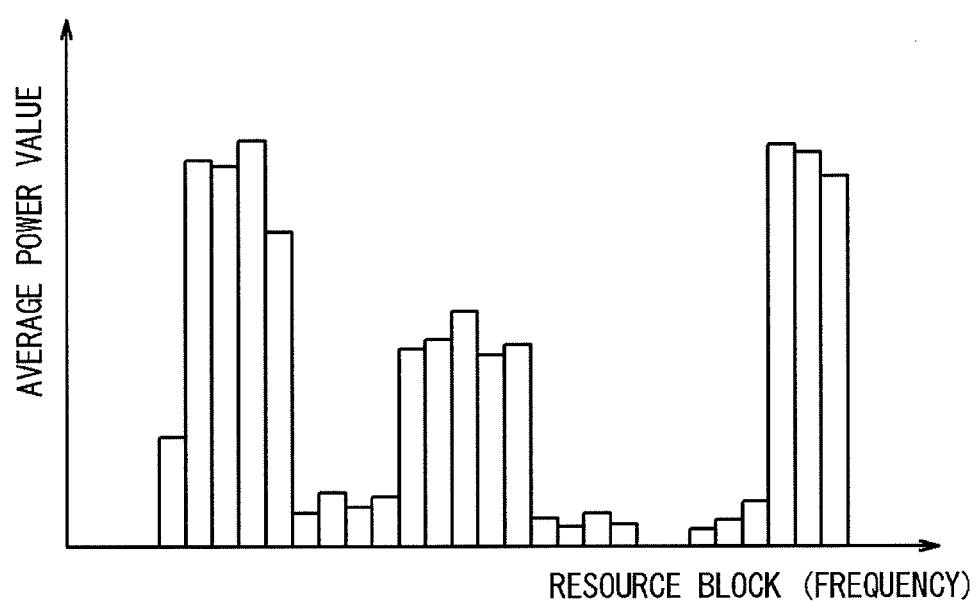
FIG. 39 is a diagram showing an example of a result of determination of an average power value for each resource block obtained by a measurement processing unit.

FIG. 38 is a diagram for explaining an example of a measurement process performed by the measurement processing unit 4005*c*. FIG. 39 is a diagram showing an example of a result of determination of an average power value for each resource block obtained by the measurement processing unit 4005*c*.

Description regarding FIG. 38 and FIG. 39 will be omitted because it is the same as that in [1.5 Measurement process] in the first embodiment, except that the timings of the primary and the secondary synchronization channels of the macro BS1*a* coincide with those of the femto BS1*b*, and that the corresponding reference numerals are different.

[5.4 Timings of Synchronization Process and Measurement Process]

Figure 40:
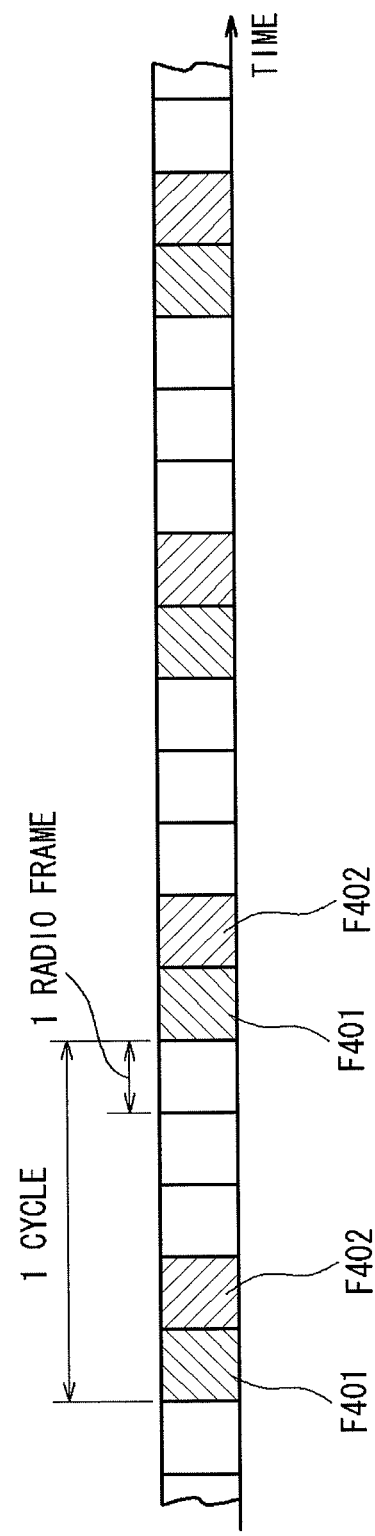
FIG. 40 is a diagram showing timings at which a synchronization process and a measurement process are performed.

FIG. 40 is a diagram showing timings at which a synchronization process and a measurement process are performed. Description regarding FIG. 40 will be omitted because it is the same as that in [1.6 Timings of synchronization process and measurement process] in the first embodiment, except that the corresponding reference numerals in the drawing are different.

[5.5 Modification of the Fifth Embodiment]

In the above embodiment, a subframe is used as a basic communication unit having a certain time length, which serves as a target of the synchronization process. However, another unit forming a downlink signal, such as a radio frame, a section defined by resource blocks, or a section defined by predetermined symbols, may be used as the basic communication unit.

In the above embodiment, an exemplary case has been described in which the synchronization process is performed periodically. However, the timing of the synchronization process may be set in accordance with a detection result by the terminal detection unit 4005*e* each time the detection result is obtained.

Moreover, in the above embodiment, an exemplary case has been described in which the synchronization processing unit 4005*b* sets the cycle of the synchronization process in accordance with the number of MSs 2 connected to the own base station device and the another base station device. However, the synchronization processing unit 4005*b* may set the cycle in accordance only with the number of MSs 2 connected to the own base station device, or only with the number of MSs 2 connected to the another base station device. Further, taking into consideration only the total number of MSs 2 connected to the own and the another base station devices, the synchronization processing unit 4005*b* may set the cycle of the synchronization process in accordance with the total number.

According to the above embodiment, in the synchronization process, a synchronization offset is corrected at the beginning of a radio frame located immediately after the radio frame in which transmission of a transmission signal has been suspended to receive a downlink signal of another base station device. However, for example, the synchronization offset may be corrected at the beginning of a subframe other than the beginning of a radio frame. Moreover, in the synchronization process and the measurement process, the section during which the transmission signal is suspended may be set as necessary.

Note that the embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

The invention claimed is:

1. A base station device that performs communication using a downlink signal composed of a plurality of communication unit areas arranged along a time axis, each communication unit area having a certain time length, the plurality of communication unit areas including a communication unit area containing a specification signal used for communication control and a communication unit area not containing the specification signal, the base station device comprising:
   a reception unit that receives a downlink signal from another base station device; and
   a synchronization processing unit that performs inter-base-station synchronization, by obtaining the downlink signal from the another base station device received by the reception unit and by causing a transmission timing of the communication unit area in the downlink signal of the base station device to coincide with that of the another base station device, wherein
   the synchronization processing unit performs the inter-base-station synchronization such that a transmission timing of the specification signal in the downlink signal of the base station device is different from a transmission timing of the specification signal in the downlink signal of the another base station device, and
   the transmission timing of the specification signal in the downlink signal of the base station device are offset, by a time period corresponding to a predetermined number of the communication unit areas, from the transmission timing of the specification signal in the downlink signal of the another base station device.

2. The base station device according to claim 1, wherein
the downlink signal includes a base frame composed of a plurality of subframes, and
the communication unit area is one of the plurality of subframes.

3. The base station device according to claim 2, wherein
the specification signal includes a known signal for synchronization, and
the synchronization processing unit obtains the known signal contained in the downlink signal from the another base station device received by the reception unit, and performs the inter-base-station synchronization based on the known signal.

4. The base station device according to claim 3, wherein
the specification signal further includes a physical broadcast channel (PBCH), and
the synchronization processing unit performs the inter-base-station synchronization such that a transmission timing of the known signal in the downlink signal of the another base station device is different from a transmission timing of the physical broadcast channel in the downlink signal of the base station device.

5. The base station device according to claim 1, wherein
the communication unit area is a modulation symbol.

6. The base station device according to claim 5, wherein
the specification signal includes a known signal for synchronization, and
the synchronization processing unit obtains the known signal contained in the downlink signal from the another base station device received by the reception unit, and performs the inter-base-station synchronization based on the known signal.

7. The base station device according to claim 6, wherein
the specification signal further includes a control signal for the communication control, and
the synchronization processing unit performs the inter-base-station synchronization such that a transmission timing of the known signal in the downlink signal of the another base station device is different from a transmission timing of the control signal in the downlink signal of the base station device.

8. The base station device according to claim 6, wherein
the specification signal further includes a reference signal for estimating a transmission path characteristic of the downlink signal, and
the synchronization processing unit performs the inter-base-station synchronization such that a transmission timing of the known signal in the downlink signal of the another base station device is different from a transmission timing of the reference signal in the downlink signal of the base station device.

9. A base station device that performs communication using a downlink signal composed of a plurality of communication unit areas arranged along a time axis, each communication unit area having a certain time length, the plurality of communication unit areas including a communication unit area containing a specification signal used for communication control and a communication unit area not containing the specification signal, the base station device comprising:
   a reception unit that receives a downlink signal from another base station device; and
   a synchronization processing unit that performs inter-base-station synchronization, by obtaining the downlink signal from the another base station device received by the reception unit and by causing a transmission timing of the communication unit area in the downlink signal of the base station device to coincide with that of the another base station device, wherein
   the synchronization processing unit performs the inter-base-station synchronization such that a transmission timing of the specification signal in the downlink signal of the base station device is different from a transmission timing of the specification signal in the downlink signal of the another base station device,
   the communication unit area is a modulation symbol,
   the specification signal includes a known signal for synchronization,
   the synchronization processing unit obtains the known signal contained in the downlink signal from the another base station device received by the reception unit, and performs the inter-base-station synchronization based on the known signal,
   the specification signal further includes a control signal for the communication control,
   the downlink signal is composed of control signal areas each composed of a communication unit area containing the control signal, the control signal areas being arranged in a direction of the time axis with a predetermined interval therebetween, and intermediate areas each composed of a plurality of communication unit areas located between adjacent control signal areas,
   the intermediate area includes a first intermediate area containing the known signal and a second intermediate area not containing the known signal, and
   the synchronization processing unit performs the inter-base-station synchronization by adjusting a position in the time axis direction of the downlink signal of the base station device such that a transmission timing of the known signal contained in the first intermediate area of the another base station device is located in a range of the second intermediate area in the downlink signal of the base station device.

10. The base station device according to claim 9, wherein the synchronization processing unit sets, within the range of the second intermediate area, an obtainment section in which to obtain the downlink signal of the another base station device for obtaining the known signal of the another base station device.

11. The base station device according to claim 10, wherein the synchronization processing unit adjusts a position in the time axis direction of the obtainment section and the position in the time axis direction of the downlink signal of the base station device such that a predetermined time period necessary for processing for obtaining the downlink signal from the another base station device is secured before and after the transmission timing of the known signal contained in the first intermediate area of the another base station device.

12. The base station device according to claim 10, wherein the synchronization processing unit adjusts the positions in the time axis direction of the obtainment section and of the downlink signal of the base station device such that the transmission timing of the known signal contained in the first intermediate area of the another base station device is located substantially in the middle of the obtainment section.

13. The base station device according to claim 6, wherein the specification signal further includes a reference signal for estimating a transmission path characteristic of the downlink signal,
the communication unit area not containing the known signal includes a communication unit area containing the reference signal and a communication unit area not containing the reference signal, and
the synchronization processing unit sets an obtainment section in which to obtain the downlink signal from the another base station device for obtaining the known signal of the another base station device, in a range that does not include the communication unit area containing the reference signal in the downlink signal of the base station device.

14. A base station device that performs communication using a downlink signal composed of a plurality of communication unit areas arranged along a time axis, each communication unit area having a certain time length, the plurality of communication unit areas including a communication unit area containing a known signal for synchronization and a communication unit area not containing the known signal, the base station device comprising:
a reception unit that receives a downlink signal from another base station device; and
a synchronization processing unit that performs inter-base-station synchronization, by obtaining the known signal contained in the downlink signal from the another base station device received by the reception unit and by causing, based on the known signal, a transmission timing of a communication unit area in the downlink signal of the base station device to coincide with that of the another base station device, wherein
the synchronization processing unit performs the inter-base-station synchronization such that a transmission timing of the known signal in the downlink signal of the base station device is different from a transmission timing of the known signal in the downlink signal of the another base station device, and
the transmission timing of the known signal in the downlink signal of the base station device are offset, by a time period corresponding to a predetermined number of the communication unit areas, from the transmission timing of the known signal in the downlink signal of the another base station device.

15. The base station device according to claim 14, wherein
the downlink signal includes a base frame composed of a plurality of subframes,
the communication unit area is the subframe,
the base frame includes a subframe containing the known signal and a subframe not containing the known signal, and
the synchronization processing unit performs the inter-base-station synchronization by adjusting a position in a direction of the time axis of the base frame in the downlink signal of the base station device such that a transmission timing of a subframe containing the known signal in the downlink signal of the base station device coincides with a transmission timing of a subframe other than the subframe containing the known signal in the downlink signal of the another base station device.

16. The base station device according to claim 1, which performs communication in frequency division duplex.

* * * * *